United States Patent
Mathew et al.

(10) Patent No.: US 7,027,463 B2
(45) Date of Patent: Apr. 11, 2006

(54) SYSTEM AND METHOD FOR MULTI-TIERED RULE FILTERING

(75) Inventors: Boban Mathew, Arlington, VA (US); Thomas John, Austin, TX (US); Dagny Evans, Alexandria, VA (US)

(73) Assignee: Sonolink Communications Systems, LLC, Washington, DC (US)

( * ) Notice: Subject to any disclaimer, the term of this patent is extended or adjusted under 35 U.S.C. 154(b) by 0 days.

(21) Appl. No.: 10/889,992

(22) Filed: Jul. 12, 2004

(65) Prior Publication Data

US 2005/0063365 A1 Mar. 24, 2005

Related U.S. Application Data

(60) Provisional application No. 60/486,166, filed on Jul. 11, 2003.

(51) Int. Cl.
*H04L 12/56* (2006.01)
*G06F 15/16* (2006.01)
*G06F 15/173* (2006.01)

(52) U.S. Cl. ............... 370/463; 370/401; 370/395.32; 379/220.01; 709/226

(58) Field of Classification Search ............... 370/352, 370/401, 463, 468, 522, 395.32; 379/114.14, 379/196, 199, 200, 219, 220.01; 709/223, 709/224, 225, 226
See application file for complete search history.

(56) References Cited

U.S. PATENT DOCUMENTS

| 6,055,505 | A | 4/2000 | Elston |
| 6,271,778 | B1 * | 8/2001 | King et al. ................. 341/111 |
| 6,704,303 | B1 * | 3/2004 | Bowman-Amuah ......... 370/352 |
| 6,760,420 | B1 * | 7/2004 | Heilmann et al. .......... 379/189 |
| 2005/0022114 | A1 * | 1/2005 | Shanahan et al. ........... 715/513 |

OTHER PUBLICATIONS

PCT Search Report, Int'l Application No. PCT/US04/31260, filing date Sep. 21, 2004, mailing date Jul. 15, 2005 (5 pages).

* cited by examiner

*Primary Examiner*—Afsar Qureshi
(74) *Attorney, Agent, or Firm*—Blakely, Sokoloff, Taylor & Zafman, LLP

(57) ABSTRACT

A system is described for processing messages and calls comprising: a plurality of filtering modules to apply a corresponding plurality of rule sets in succession to filter incoming and/or outgoing electronic messages and to apply the highest priority rule from among a plurality of rule sets to calls; and a pre-inbox for temporarily storing the calls and/or electronic messages as each of the plurality of rule sets are applied, the calls and/or electronic messages being removed from the pre-inbox and disposed of only after each of the plurality of rule sets have been applied to the calls and/or electronic messages.

39 Claims, 56 Drawing Sheets

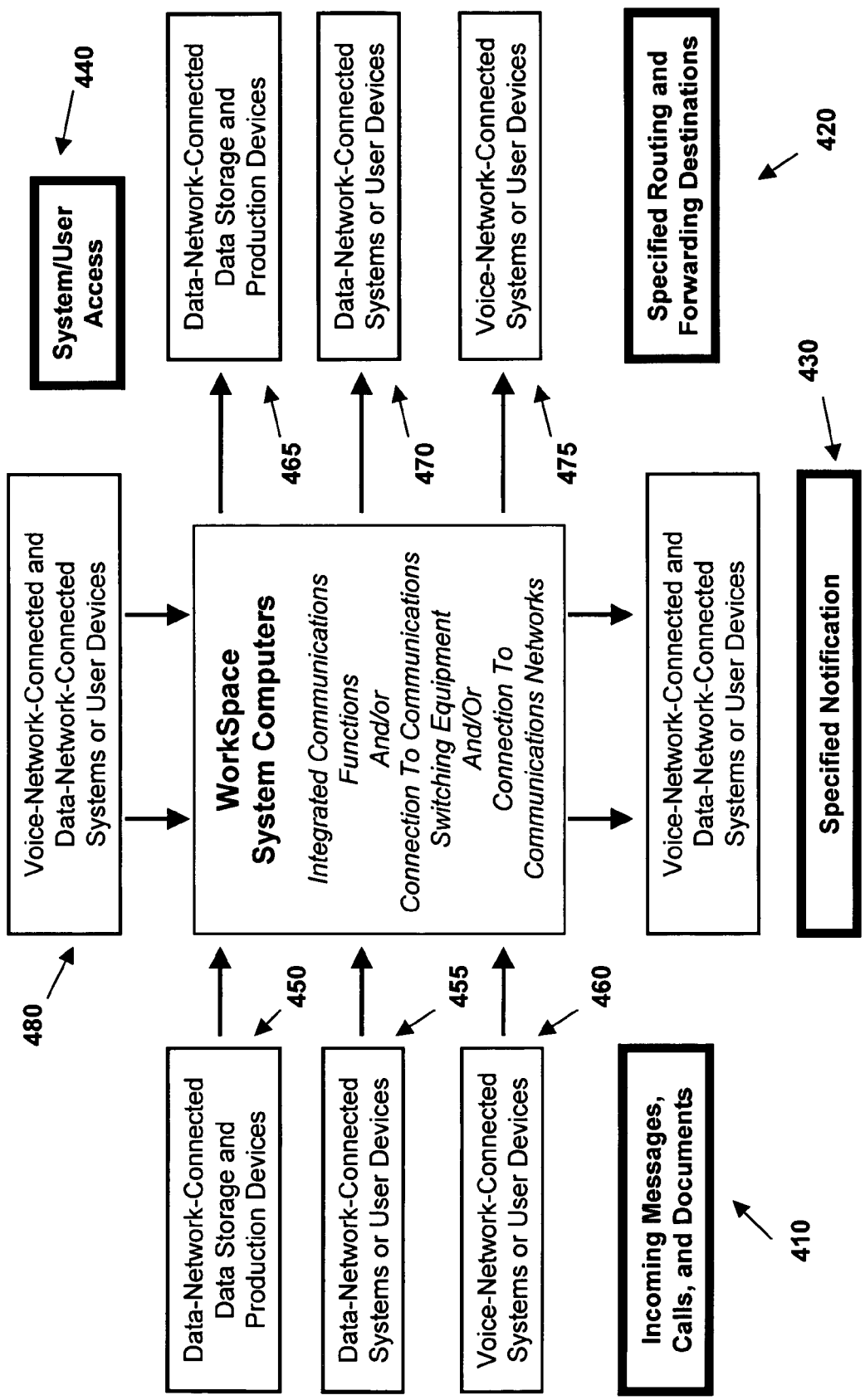

Double Blind Instant Messaging

SYSTEM AND METHOD FOR MULTI-TIERED RULE FILTERING

PRIORITY

The present application claims priority from a U.S. provisional application entitled "Integrated Message and Document Management", Application No. 60/486,166, filed Jul. 11, 2003.

BACKGROUND

1. Field of the Invention

This invention relates generally to the field of information management systems. More particularly, the invention relates to a system and method for implementing multi-tiered filtering in an integrated document/message management system.

2. Description of the Related Art

The average individual accesses and manages a surprisingly large number of messages and documents every day. In a typical business environment, the number of legitimate messages received and sent in the course of a day averages roughly fifty. These include emails, faxes, voice messages, voice calls, text messages, and instant messages. The number of devices that individuals use for communications and messaging has also multiplied. Such devices include computers, fax machines, wire-line phones, wireless phones, personal digital assistants ("PDAs"), and pagers, with each device typically handling a different type of message or method of communications. Most individuals today manage their messages across different media and, more importantly, over multiple types of devices.

Simultaneous with the proliferation of messages and messaging devices, the penetration of personal computers and servers in homes and offices has also risen sharply. The average individual accesses, creates, modifies, saves, and otherwise manages a large number of documents every day. This number is even larger when documents are broadly defined to include private and work-related databases as well. To complicate matters, documents are often transferred among individuals as stand-alone messages such as faxes, as attachments to electronic messages, as information embedded within messages, and as data files with attached messages.

To help manage the complexity of multi-media messaging over numerous devices, unified communications solutions consolidate different types of messages into a single platform. Many of these platforms allow for remote access and management of messages over the Public Switched Telephone Network ("PSTN"), the Internet, as well as other public and private voice and data networks. Increasingly, such solutions are also tied to communications systems themselves to allow both real-time and near-real-time communications. For example, many voicemail platforms enable users to use the call-back number of a voicemail sender to return a call during the course of retrieving a voicemail. The goal of unified communications solutions, therefore, is to allow users to access and manage different types of messages from a single access point, regardless of the user's device of choice. Through communications system interfaces, unified communications solutions also permit some limited communications (as opposed to retrieval and management of messages) from the same platform.

In the area of document and data management, solutions have generally taken the form of remote access to data storage devices that house documents and databases and the sharing of data on such devices based on a user's security level. The management of documents and data, however, has traditionally been viewed as a problem quite distinct from communications and the management of messages. Differences between data management solutions and communications/message management solutions, however, are becoming blurred as communications and message management solutions increasingly enable document access and transfer. Nevertheless, data management solutions and communications/message management solutions today remain, for the most part, quite separate.

BRIEF DESCRIPTION OF THE DRAWINGS

A better understanding of the present invention can be obtained from the following detailed description in conjunction with the following drawings, in which:

FIG. 4 illustrates WorkSpace user access and information flows according to one embodiment of the invention.

DETAILED DESCRIPTION OF PREFERRED EMBODIMENTS

Described below is a system and method for advanced information management and rule creation within an integrated virtual WorkSpace. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Introduction

Figure 1:
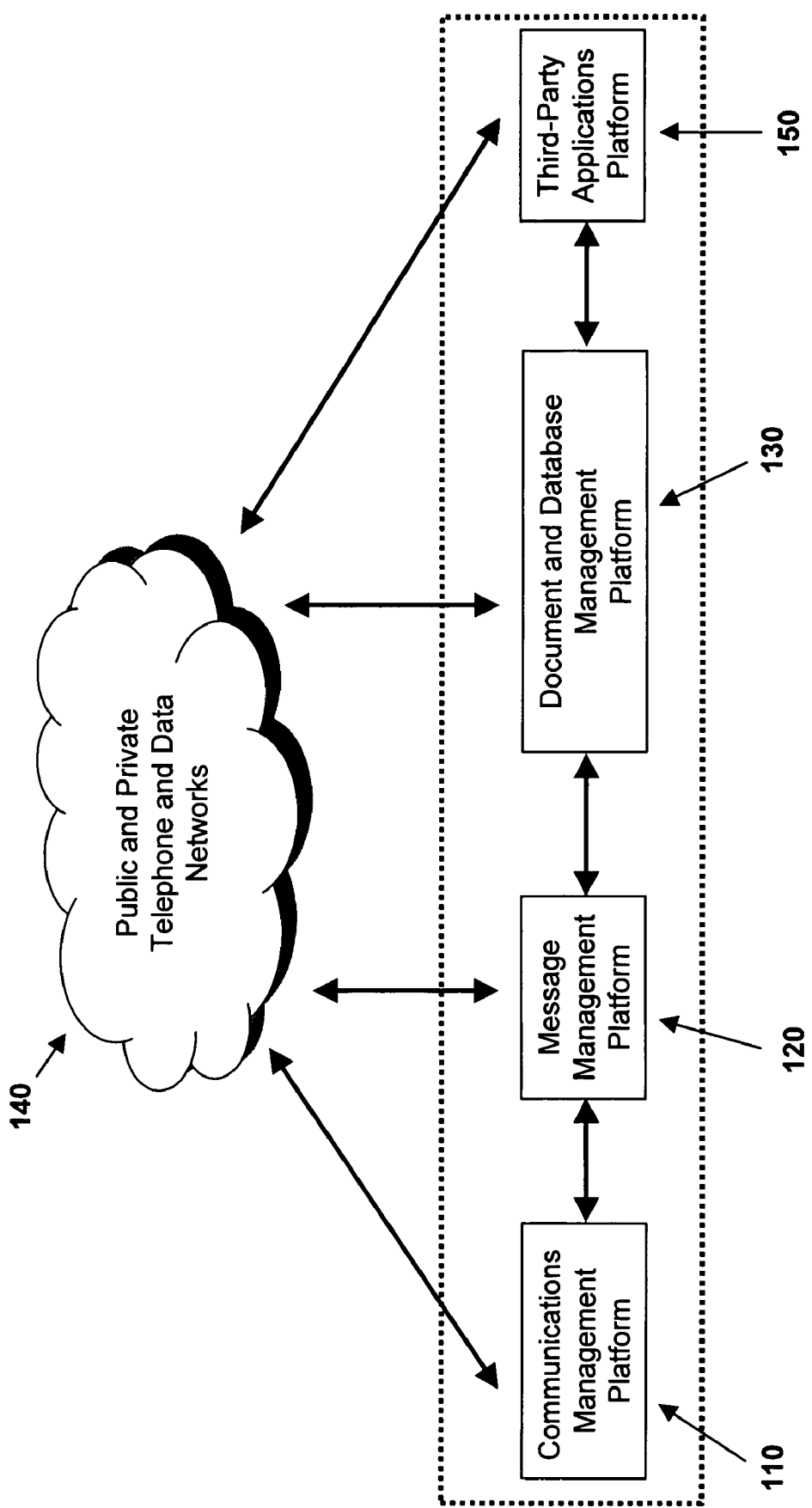
FIG. 1 illustrates various functional platforms employed in one embodiment of the invention.

A system is described below that contains communications, message management, and document management functions as well as applications utilizing these functions. It is a user portal to communications, message management, and document management functions. It is also a tool that enables advanced communications, message management, and document management. This system will be referred to herein as the "WorkSpace" system. As shown in FIG. 1, the WorkSpace system contains a communications management platform 110 that is connected to both public and private telephone and data networks 140. The communications management platform is integrated with a message management platform 120 that is connected to the same telephone and data networks 140 as well as to a document and database management platform 130. The document management platform could also be connected independently with the telephone and data networks. Each of these three platforms is connected to each other either directly or indirectly. In turn, they may also be connected to other platforms that host third-party applications 150. The term "platform" is used here to describe software code installed on appropriate hardware that performs communications, message management, and document management functions. Finally, although not shown explicitly, a WorkSpace system may also contain process- or situation-specific applications that incorporate various communications, message management, and document management tasks.

As a portal, the WorkSpace system acts as the entry point for the important tasks handled by many individuals during the course of a day: (1) communications; (2) message management; and (3) document management. As mentioned above, it may also act as a portal to applications that incorporate these three functions or as an interface to other stand-alone third-party applications. For example, consider the communications and document requirements of a doctor. They may include transferring documents to colleagues as part of messages about patient care. An application in this context could include (a) transmittal of a prescription to a pharmacy along with (b) information on patient insurance from an insurance database on the doctor's computer and (c) transmittal of some lab results to a colleague along with a link to retrieve the history of the patient's lab tests. The prescription transmittal and the test result retrieval methods are examples of applications that may be enabled by and accessed through the WorkSpace system described herein. The insurance database is an example of a third-party application that may or may not be integrated with the WorkSpace system but is nevertheless accessible through the WorkSpace system.

In one embodiment, WorkSpace software integrates its communications and message management platforms to communications systems such as Private Branch Exchanges ("PBX"s) that are in turn connected to communications networks. Alternatively, the functionalities of such communications systems may be incorporated in the WorkSpace system. It also allows users (consistent with that user's privileges) to access and manage documents and databases on computer devices such as servers and mainframes. Beyond merely facilitating access to documents and databases, the WorkSpace system also allows for the creation of context-specific document creation, transfer, storage, and other document management functions by using the communications and message management platforms as engines for these functions. It is especially powerful when documents, messages, and communications are part of the same work process. The WorkSpace system, therefore, integrates communications, message management, and document management in a single system. It also allows the creation of different applications that incorporate these three functions.

An Exemplary Enterprise Environment

Figure 2:
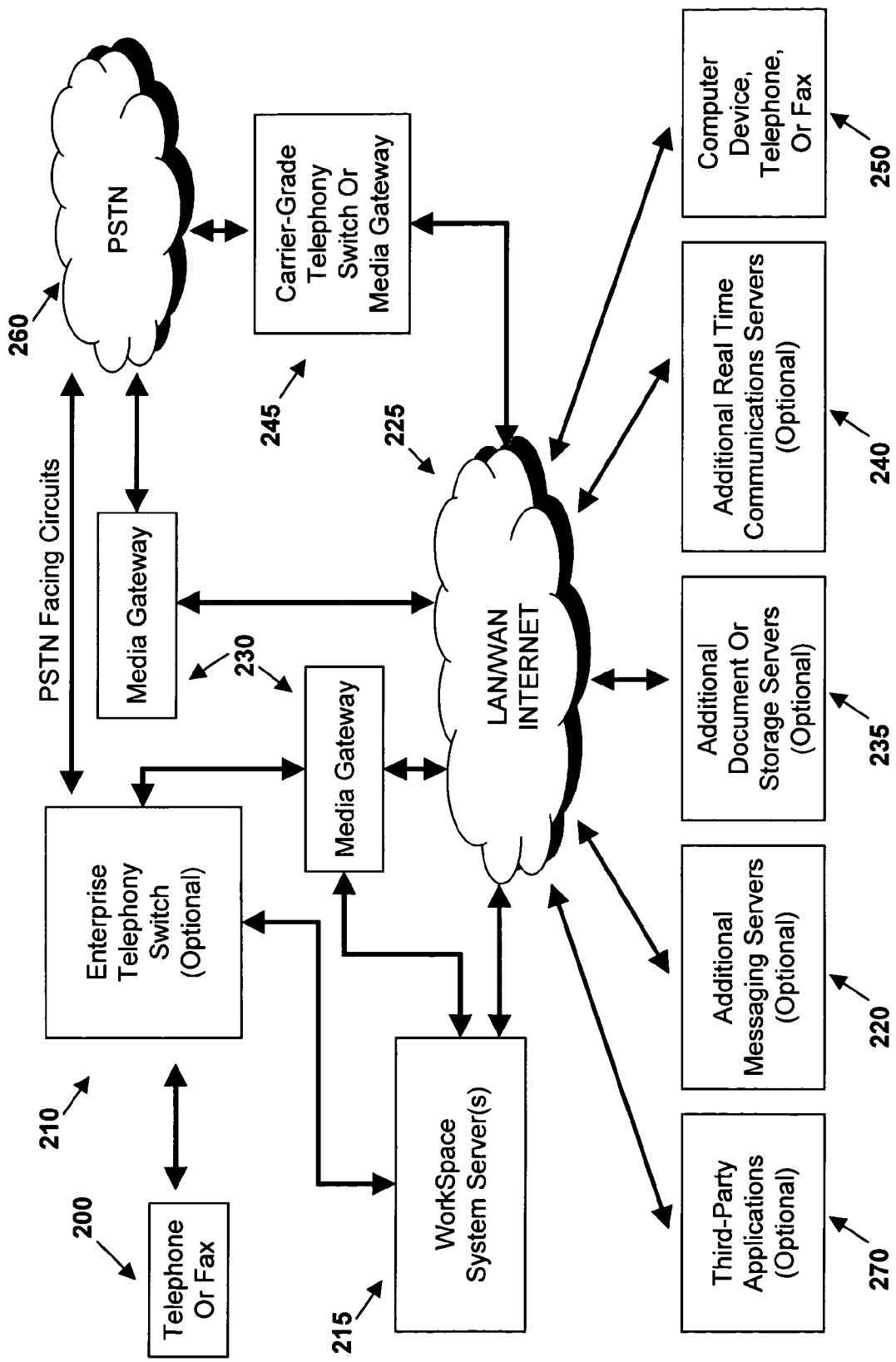
FIG. 2 illustrates a WorkSpace enterprise environment according to one embodiment of the invention.

FIG. 2 shows a typical enterprise environment in which a WorkSpace system is deployed. In one embodiment, the enterprise, driven by its voice communications requirements, is connected to the PSTN 260 directly via Time Division Multiplexing ("TDM") circuits such as T-1's and PRI's or analog phone lines. In an additional embodiment, the enterprise is indirectly connected to the PSTN through a media gateway 230 used to connect an enterprise using packet-voice protocols such as Voice-over-Internet-Protocol ("VoIP") for internal voice communications. Such media gateways generally handle conversions from/to TDM protocols to/from VoIP protocols and may be (1) a stand-alone device; (2) an integrated component of an enterprise telephony switch 210 that has packet-switching capabilities; or (3) an integrated component of a WorkSpace system server 215. An enterprise that chooses to handle the VoIP to TDM conversion itself rather than through a third-party service provider will use a media gateway 230 to perform the conversion.

The first embodiment is typical in a circuit-switched environment while the second describes a VoIP environment. In yet another embodiment, the enterprise may be connected directly to the PSTN over TDM circuits but may also process some or all VoIP calls to originate and/or terminate PSTN calls. In this example, a carrier-grade telephony switch 245 with media gateway functionalities or a carrier-grade media gateway 245 handles the VoIP to TDM conversions. Such a device lies either at the edge of the enterprise's data network 225 or within a carrier's data network and may or may not be operated by a third-party service provider.

On the enterprise side in the first and third embodiments, the TDM trunks or lines from the PSTN 260 terminate on enterprise telephony switch devices 210. Such devices include digital PBX's, analog and digital key systems, and VoIP-capable PBX's. These are the devices that route calls to and from end user stations such as telephones and fax machines 200. End-user-facing trunks or lines connect telephony switch devices to end user stations. If the enterprise telephony switch device has packet-switching capability, end user stations 250 capable of processing data packets may be connected to the enterprise's data network rather than to the telephony switch.

The design of the WorkSpace system allows connectivity to (a) the enterprise telephony network (regardless of the underlying transport protocols), (b) other data servers or computers 235, (c) other message management servers or computers used by the enterprise such as email servers 220, (d) other real-time communications servers or computers 240, and (e) servers or computers hosting third-party applications 270. It should be noted that separate or additional data storage devices, message management platforms, and real-time communications devices are not required for complying with the underlying principles of the invention. They need to be deployed only if message and data volumes, higher levels of security, and/or user preferences for third-party solutions are relevant considerations. An enterprise's Local Area Network ("LAN") or Wide Area Network ("WAN") would normally tie together the above described infrastructure. Users typically access the WorkSpace system over a computer device 250 such as a personal computer or PDA connected to the data network of the enterprise, either through a private or a public data network. Users may also access the WorkSpace system through a telephone device connected either to the PSTN or the enterprise's voice network. Access through hybrid computer-telephone devices is also possible.

An Exemplary Carrier Environment

Figure 3:
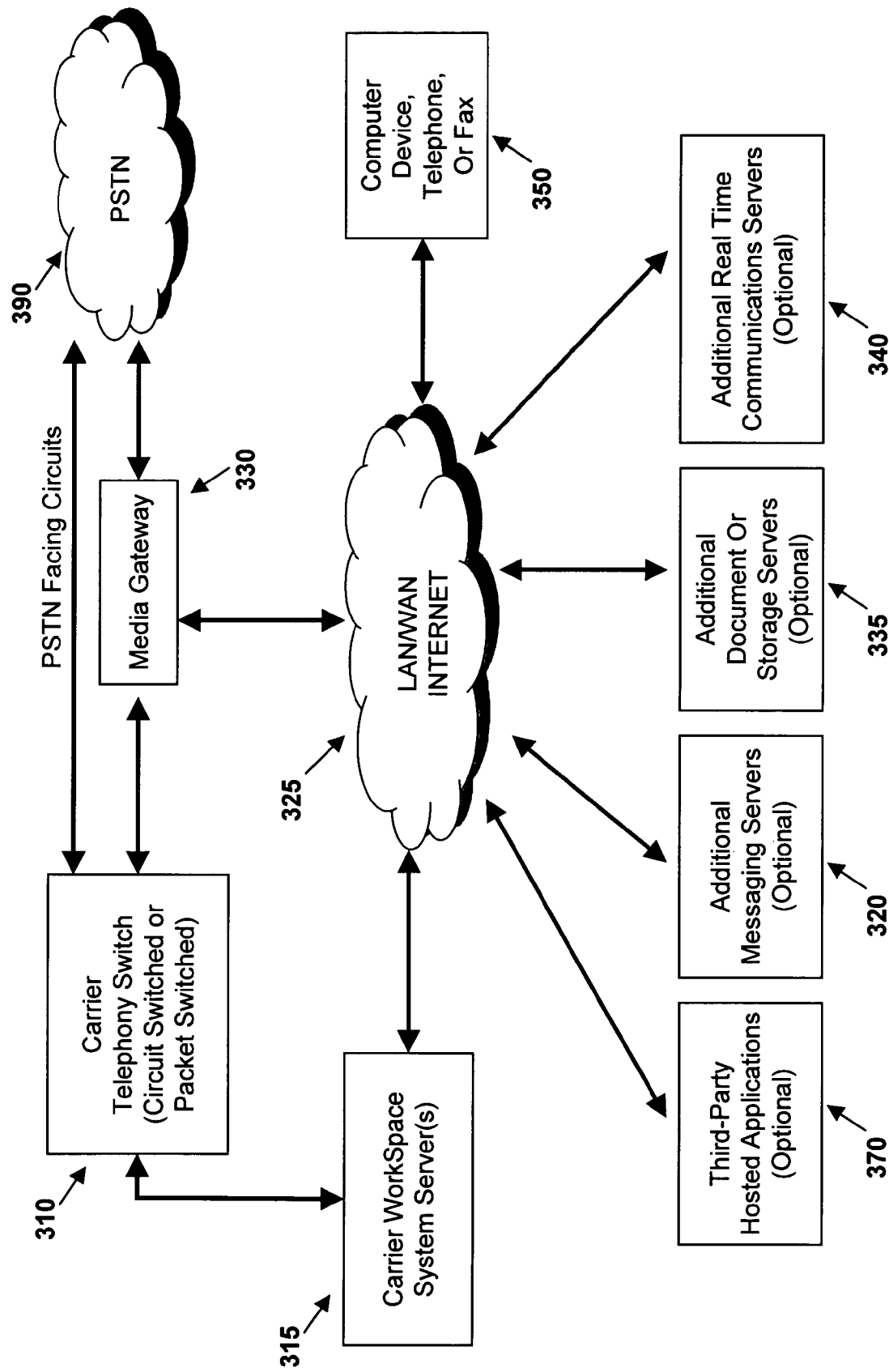
FIG. 3 illustrates a WorkSpace carrier environment according to one embodiment of the invention.

In one embodiment of the invention, the WorkSpace system is deployed in a carrier (service provider) environment. This type of deployment, illustrated in FIG. 3, allows carriers to provide data management services along with communications and messaging services. As shown in FIG. 3, the WorkSpace system is connected to a carrier's telephony switch 310 regardless of whether the switch was operating in circuit-switched or packet-based environments. In another embodiment, the WorkSpace system itself could be used instead of a separate carrier switch for switching and routing voice calls. If this were the case, the carrier would have to deploy a media gateway 330 either stand-alone as shown or integrated with the WorkSpace system to handle TDM to VoIP conversions. In the former scenario, packetized voice calls would travel over a data network 325 to the carrier's WorkSpace servers 315. In the latter scenario, TDM voice traffic would terminate into the WorkSpace servers after passing through a media gateway 330. End users access the WorkSpace system through a telephone device or a computer device 350 connected to a data network which may be either private or public. Users could also access the WorkSpace system through a telephone device connected to the PSTN.

As in the enterprise environment, carriers may choose to deploy messaging platforms of different vendors or additional servers 320 that are tied to WorkSpace systems over a data network 325. Additional or separate data servers 335 could also be connected in the same manner. Carriers may also choose to provide third-party hosted applications 370 that are not part of the WorkSpace system. A carrier may also opt to deploy real-time communications servers manufactured by a third-party vendor 340. As long as industry-standard, non-proprietary protocols are used by third-party vendors of message management, data management, and real-time communications devices, integration with the WorkSpace system requires virtually no integration effort. The above-described infrastructure would be connected through a private and/or public data network 325.

Carriers that want to retain their embedded TDM infrastructure but also support packet-voice traffic could deploy media gateways 330 to convert TDM traffic to the appropriate packet-voice protocol. This would be in addition to a TDM switch. Alternatively, a carrier could deploy a hybrid telephony switch capable of both circuit switching and packet switching of voice traffic. This configuration would also permit carriers to migrate voice traffic from legacy TDM equipment to packet-voice equipment over time.

WorkSpace Portal

In one embodiment, the WorkSpace system provides a portal comprised of three main work functions of individuals today. These functions consist of (1) communications across various media, (2) management of different types of messages, and (3) management of documents and databases.

Each of these functions in turn includes numerous subfunctions. The software contains code to control access and security to the system. The software code is also designed to work with other mechanisms for managing access to computer devices and data storage devices that may have been developed by others. Interfaces to third-party communications systems such as telephony switching systems to handle different types of communications may also be included in the WorkSpace system. By embodying the ability to interface with communications systems or by incorporating communications system functions within in it, and by utilizing its message management technology to manage documents, the WorkSpace system goes beyond the mere unified communications and group work technologies that are commonplace today.

While the WorkSpace system may be particularly suitable for an enterprise environment, the ability to access WorkSpace systems over the Internet enables the creation of personal WorkSpace services that can be offered by hosting and communications service providers. It integrates communications, message management, and document management functions in a single system. It is especially well suited to work with user devices that are capable of both voice and data communications. Two examples of these devices include hybrid hand-held phone-computer devices and stationary computer user devices enabled for real-time communications.

In one embodiment of the invention, accessing the WorkSpace system is similar to accessing well-publicized Internet or Web portals. While such portals typically have Web-based applications that provide real-time stock quotes or up-to-the-minute news along with Web-enabled transactions such as online shopping and online dating, one embodiment of the WorkSpace portal is more specifically geared towards work-related functions of communications, message management, and document management. The WorkSpace portal is accessible either over the public Internet or through a private data network and allows only authorized users to access the system. Once within the system through the WorkSpace portal, basic functions as well as applications built upon these functions are made available to the user. In its most basic form, a user can access various message types, communicate or send messages across multiple media, and access documents made available to the user. The WorkSpace system, however, is designed to accommodate more complex combinations of these functions that are customized for specific individuals, systems, or processes. These combinations are essentially custom-developed applications available to users or systems that access them through the WorkSpace portal. The WorkSpace system is also designed to interface seamlessly with third-party applications and databases.

Core WorkSpace Functionalities

While embodiments of the WorkSpace system allow for advanced management of communications, messages, and documents, some of the core functionalities of the WorkSpace system will now be highlighted. In one embodiment of the WorkSpace system, users can send, receive, forward, and otherwise manage messages of different types, including but not limited to email, text messages, faxes, voice messages, and video messages. These messages can be sent and forwarded to as well as received from both other WorkSpace system users/locations and users/locations external to the WorkSpace system. As different types of messaging are developed, they too can be easily incorporated into the WorkSpace system.

The WorkSpace system also allows users to communicate with both system users and users external to the system. In one embodiment of the WorkSpace system, users can send, receive, and forward instant messages ("IM"). They can also make and receive audio phone calls and video phone calls as well as forward such calls to destinations both within and external to the WorkSpace system. They may also participate in audio conferences, video conferences, Web conferences, group chat, and various combinations of these and other collaborative communication schemes.

Document access and management is another core functionality of the WorkSpace system. Users can store documents of different types and access them through the various interfaces to the WorkSpace system. More importantly, they can save the documents they accessed back to their original locations with little or no manual intervention (i.e., no uploading of document from a local computer to a WorkSpace system computer or server is required). They may also transfer these documents through the messaging capabilities of the system. The WorkSpace system can also be linked to external data sources to facilitate a single access interface or it can be more closely integrated with third-party data sources to enable meaningful management of such data through the various functionalities of the WorkSpace system.

The WorkSpace system is also a Personal Information Manager. In particular, the system has an extensive contacts management function. Schedule (event) management of a single user or a group of users and the assignment and tracking of tasks are also facilitated by the system. Finally, the system has an extensive alerts functionality that reminds users of particular events, deadlines, or tasks through various messaging and communications methods. In one embodiment, alerts may be in the form of: a direct alert in one's inbox; an email; a text message; a recorded message sent to a phone number; a pop up while logged in; or any combination of these methods.

In one embodiment of the invention, both the contacts and the calendar functions of the system are integrated with the messaging and communications modules of the WorkSpace system. For example, both messages and communications may be generated from the contacts section. Information from a user's contacts is also made available when various rules for managing information within the WorkSpace system are specified. Similarly the calendar items are integrated with both the messaging and communications modules to enable multi-media alerts and to schedule both events and tasks.

While there is prior art that focuses on one or more of the core functionalities within the WorkSpace system, there are virtually no systems that combine all of the above-mentioned functionalities in a single platform. This integration of messaging, document management, and communications functions mentioned above (or any combinations) in a single platform is innovative. So too is the advanced means of managing such information (both statically (information storage and access) as well as dynamically (information flows) that are described in greater detail herein.

User Access and Information Flows

In one embodiment, users may access WorkSpace system functions and applications in several ways including: over a telephone device, from a data network access device such as a personal computer, or through hybrid devices such as I-Mode phones, Blackberry handheld devices, and devices that access data sources through voice recognition schemes. As shown in FIG. 4, users generally access WorkSpace system computers with devices 480 connected to the PSTN and/or the Internet. Of course, access through other public and private voice and data networks is also possible. Given the narrow bandwidth of the telephone and the generally imperfect user experience with accessing text over the telephone, most users are unlikely to want long text messages or documents read to them over the telephone. Such access to text messages or documents is technically feasible and can easily be accommodated if desired by users through the use of Text-To-Speech ("TTS") engines. Non-text documents (such as spreadsheets and databases) and non-text messages (such as faxes) may be accessed over a narrow-band telephone device but they may not be susceptible to much meaningful manipulation or management. In one embodiment of the invention, for such documents and messages, users access their summary characteristics (such as size, name, or document type) over the telephone and use such characteristics to transfer them and perform other management functions, as described herein.

One way to access a WorkSpace system is over a data network to which the user is connected over a broadband connection. One particular user device is a hybrid telephone-computer device that communicates over both voice and data networks. This optimal access method allows fast and complete access to one's documents and messages in addition to convenient real-time communications. The broadband connection may be either in the form of Web access using a browser or in the form of a computer application (computer client application). The browser-based Web access gives the user ubiquitous access from anywhere and from virtually any device connected to the Internet.

Access through a computer client application requires WorkSpace software to be installed on the device used for access to the WorkSpace system. However, the use of the computer client application gives the user additional capabilities such as working offline (i.e., not connected to a WorkSpace system) to compose messages or to schedule one's calendar. The computer client application also overcomes many of the limitations inherent in the use of a Web browser such as the ability to seamlessly and quickly save a document back to its original location in a WorkSpace system. Such saving back is virtually seamless when the client application is the system access method. It should be noted however, that in one embodiment of the invention, a Web plug-in allows users to save back their documents to their original WorkSpace location without having to save the documents locally and then uploading them to the WorkSpace location. Finally, the computer client application of the WorkSpace system is designed so that WorkSpace system computers can be accessed through the client as long as there is an Internet connection.

Information (broadly defined) is either stored directly on or is sent to WorkSpace systems by individuals or systems over voice and data networks, both public and private. Examples of such information include voice calls, faxes, text messages, emails and documents. As shown in FIG. 4, incoming information is generated by voice-network-connected devices or systems 460, data-network-connected devices or systems 455, and data-network-connected data storage and production devices 450 (grouped as 410 in FIG. 4). Based on the preferences and the settings of the user, the information is processed by the WorkSpace system and routed to voice-network-connected user devices or systems 475, data-network-connected user devices or systems 470, and data-network-connected data storage and production devices 465 (grouped as 420 in FIG. 4). In addition, users may be notified of messages and documents that they have received based on notification criteria established in a WorkSpace system 430, as described herein. When connected to communications switching equipment or communications networks, or if communications functions are incorporated within a WorkSpace system, users may engage in real-time and other communications enabled by such equipment and networks. As mentioned earlier, the functionalities enabling such communications need not be external to the WorkSpace system.

Examples of Integrated Communications, Message Management, and Document Management While the message management functionality of the WorkSpace system is valuable by itself, the system utilizes message management as a tool to make more efficient work processes that require either document management/transfer capabilities and/or message management/communications capabilities. Many such processes are handled today as separate sub-processes and often by separate applications—ones to handle message management and communications and others to handle the management of documents and data. These processes generally involve multiple tasks and/or queues.

By way of example, consider a message (voicemail or email) sent by a customer placing an order or a completed order form (fax or Internet-based form) to purchase a product or service. In FIG. 4, the voicemail and fax arrives at the WorkSpace system through voice-network connected user devices 460 and the email arrives from a data-network connected user device 455, typically a computer tied to an email server. The Internet-based form would be stored on a data-network connected data storage device 450 that the user would access over the Internet, complete, and then forward to the WorkSpace system. Many fulfillment processes for customer orders require multiple tasks involving multiple individuals and queues. As a first step, the message management platform could either attach the message to or embed it within the company's order form. It could then be automatically sent to a queue requiring the first fulfillment task. These two steps would result from software instructions within the WorkSpace system (i.e., implemented by one or more of the functional modules shown in FIG. 7). Since the message itself is now part of the order form, the fulfillment person could even review the message if they want to confirm certain details from the customer's message.

Furthermore, in one embodiment, a call may be generated to the customer if the message contained a call-back number and thus would combine communications functions with document and message management functions. The WorkSpace system enables such communications either by incorporating communications functionalities within itself or by connecting to communications switching and routing equipment either directly or indirectly through communications networks, as described above with respect to FIGS. 2–3.

To continue with the example, the first fulfillment person may attach a voice file to the order form to clarify any special instructions with their own call-back number for the benefit of the person handling the next task or queue. This integrated approach also allows the customer to find out by telephone or over the Internet the particular status of their order which is easily identified by the task or queue.

An extension of this approach is to have a voice recognition algorithm convert the customer's initial phone order onto an order form with the voice message still attached to the order form and available for validation by a fulfillment person. One example of this type of order process is prescription call-ins to pharmacies by physicians. If this were the application contained in one embodiment of a WorkSpace system, voice recognition software tied to within the system would complete the prescription order form within a certain degree of certainty. The attached voice message would be available for validation of the order but filling out the order would be at least partially completed.

Another example of a process where communications, message management, and document management functions are integrated involves sorting and managing information based on characteristics of the sender or those of the information itself. In a telephone call context, the calling number ("ANI") or the called number ("DNIS") associated with a telephone call may determine where the voice message file would be placed. For example, consider the above example of physician prescription call-ins. A nationwide pharmacy chain could assign unique toll-free numbers for each pharmacy location. The voice message files could then be sent to and stored in mailboxes specific to a pharmacy location. Alternatively, the voice message files could be attached to or embedded within a prescription order form and sent to a specific document location for the pharmacy. This involves specific routing and forwarding instructions 420 implemented by the WorkSpace system that send the document to a data-network connected data storage device 465 that is accessible by pharmacy staff over voice or data networks.

As a general proposition, characteristics of documents, messages, and real-time communications may determine whether and how the WorkSpace system stores, sends, or otherwise handles information it has received. Of course, specific instructions to handle the information are triggered by such characteristics. For example, in one embodiment of the invention, the type of document attached to a message or otherwise sent to a user is used by the WorkSpace system to determine where the document is stored. For example, a user may wish to store all spreadsheet files that they received in a specified location (e.g., a spreadsheet binder). Another user may specify that both messages and documents from different sources be stored together or sent to the same location. Similar instructions may also be dictated by work processes as opposed to users. Context-specific applications for such routing and forwarding 420 may be employed through the core communications, message management, and document management software within the WorkSpace system, as described herein.

Another example of integrated communications, document management, and message management functions involves individuals accessing documents based on certain summary characteristics and requesting over the telephone that these documents be sent to designated recipient locations (e.g., fax machine or email address). For example, an individual may request that a paper titled "Voice-over-IP White Paper" in one of their directories be sent to their boss's email address or to the fax number of a hotel where a colleague is staying. Even documents that are external to a specific WorkSpace system could be accessed and managed in a similar fashion. Security for access to external documents, however, would be an added consideration. Thus, one embodiment of the WorkSpace system provides integration of document management functions with message management and communications capabilities. In one embodiment, documents may be accessed over a data network (including the Internet) and managed with message management functions. Similar access and management of documents is also possible over the telephone.

A final example entails the creation and delivery of "meta documents," documents that are comprised of sub-documents of different types. For example, a mortgage application may consist of copies of tax documents (possibly a TIF file), an application form (possibly a PDF file), and a spreadsheet listing an individual's assets against which the mortgage is obtained. Finally, an applicant may wish to include a personal cover letter (possibly a word processing file) or a note along with the application to explain certain irregularities in their application. On the reverse side of the transaction, the mortgage company may want to deliver to the applicant closing documents that may also consist of different types of sub-documents. Indeed, many transactions involve documents of different types that must be delivered to different parties to a transaction. Such documents today are sent as attachments to an electronic message, or as stored documents on a storage disk, or more commonly, printed out and mailed to the relevant party to the transaction.

Figure 5A:
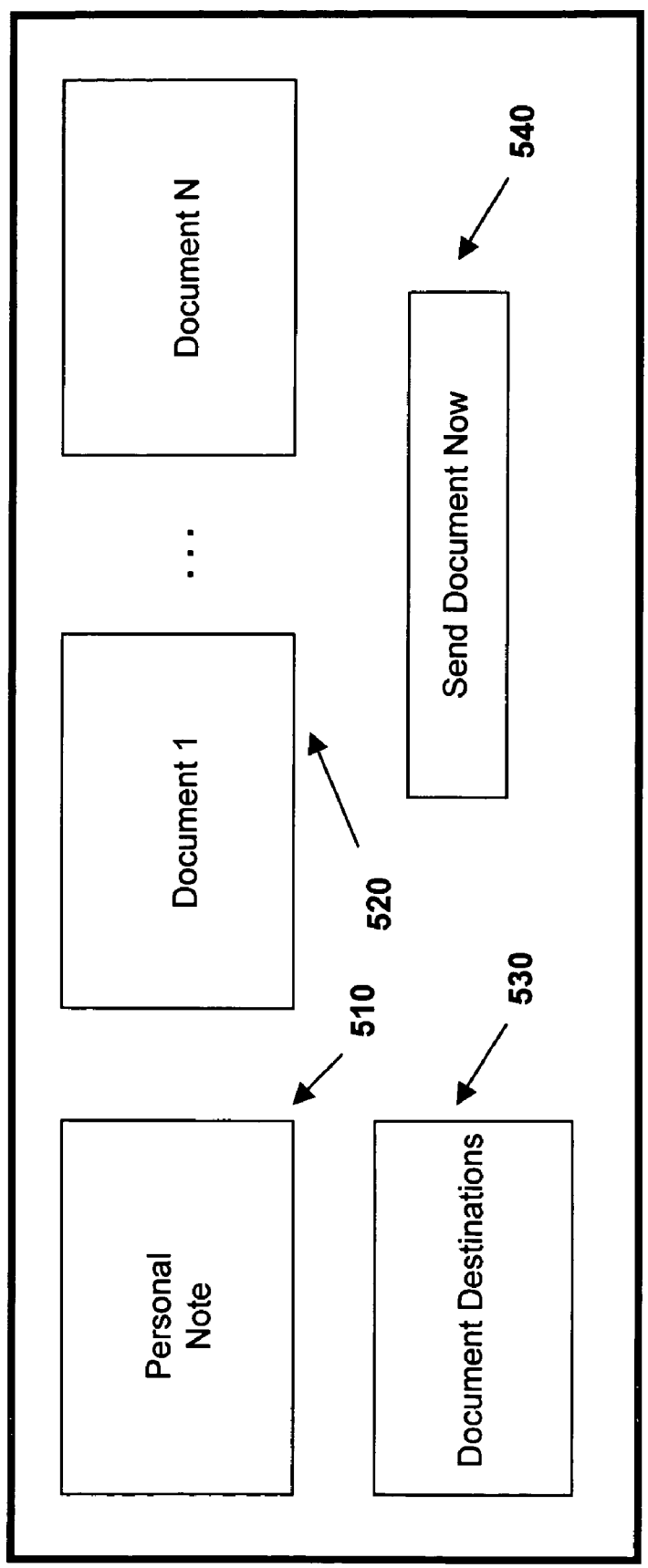
FIG. 5a illustrates a meta-document employed in one embodiment of the invention.

One embodiment of the WorkSpace document management engine allows for the creation of a meta-document comprised of different document types. Its meta-document creation software allows for the assembly of documents of various formats, thereby creating a single unified document using a simple Graphical User Interface ("GUI"). FIG. 5a illustrates one embodiment of a GUI used to create and transfer a meta-document. The interface allows the end user to compose a personal note 510 that is typically attached to a set of documents that are transferred. It also allows the user to place various types of documents 520 in sequence within the meta-document itself. Documents of different types and sizes may be organized within the meta-document in the sequence chosen by the user. These documents are stored in locations that are connected to or otherwise accessible from the user's WorkSpace system. The documents may be on the user's computer, on a network shared document storage device, or even a third-party location. In one embodiment, users may select documents to be included within the meta-document using a "browse" function such as those used to attach documents to electronic mail. Security and access rights may be considered in determining whether documents may be placed within the meta-document.

Once a meta-document has been created, several options are available for delivery of the meta-document. One option involves the transfer of the meta-document to a secure but accessible data storage area (e.g., such as an FTP or Web site) where security information such as a password specific to the document transfer is needed to access the document. The sender of the message may create the password or have it automatically generated as soon as the document is sent. If so desired, the sender may also request that the system automatically provide the password to the recipient (e.g., via an email, text or voice message). For security or convenience reasons, however, the sender may prefer to provide the password information to the recipient verbally or through some other means of communication. Once the recipient accesses the file and downloads it successfully, in one embodiment, an electronic receipt notification is automatically transmitted to the sender. The foregoing process effectively replaces the overnight mail delivery of documents. The same process, of course, may be clearly used for the transfer of a single document without the creation of a meta-document.

Figure 5B:
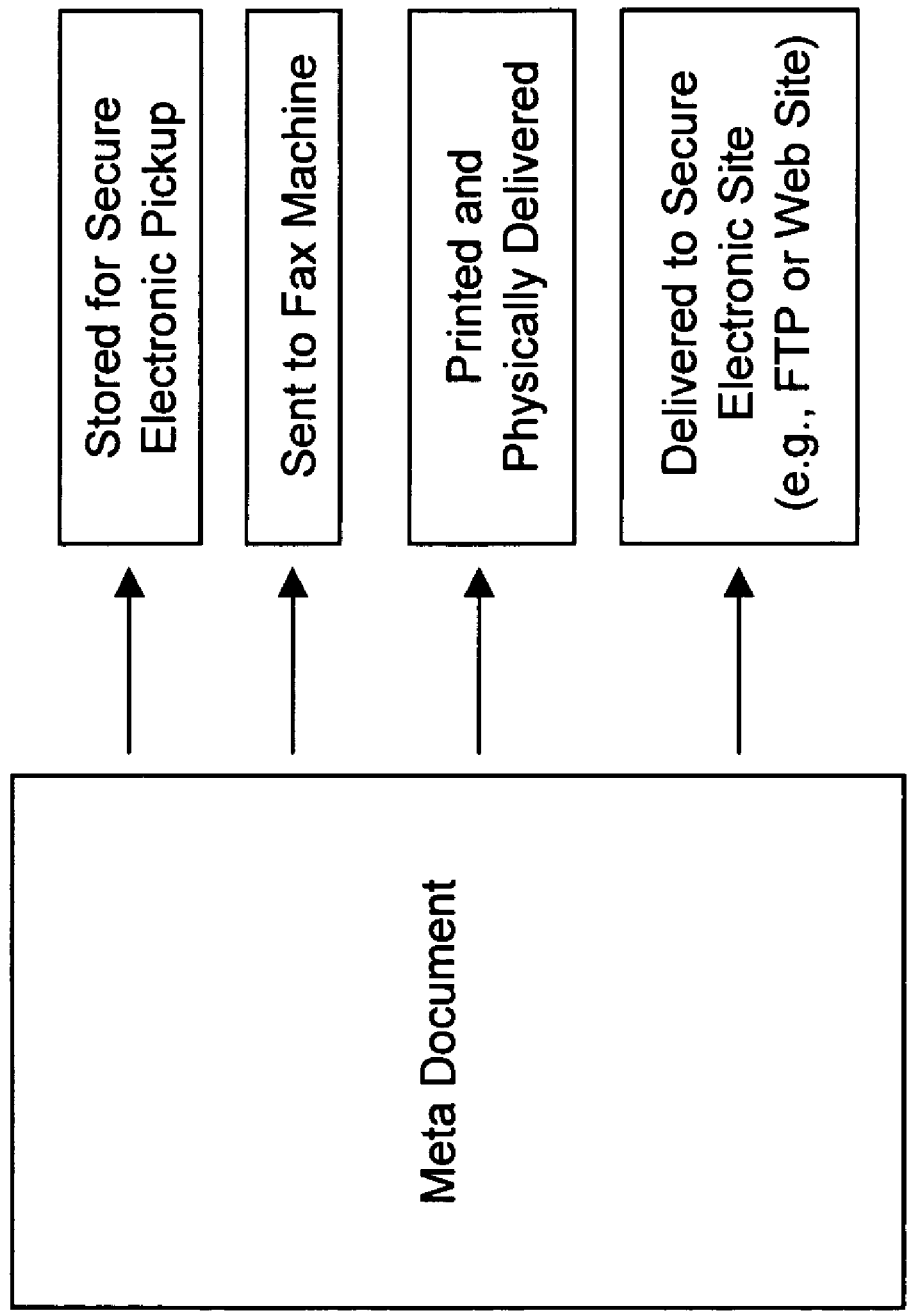
FIG. 5b illustrates various delivery methods for meta-documents enabled by one embodiment of the invention.

If security or receipt notification is not a concern, the sender may send the meta-document as an electronic mail attachment or even have it faxed (text documents only) to a designated fax number location. Another option is to have each of the component documents within the meta-document automatically or manually printed out, assembled, and delivered through physical delivery methods such as overnight mail. As shown in FIG. 5b, various delivery methods enabled by WorkSpace system software may also be used for the delivery of such documents, depending on the size of the document and the urgency of delivery. The combination of meta-document creation combined with a delivery mechanism that is part of an integrated message/document management system is particularly advantageous.

As highlighted by the above examples, the most efficient use of the functionalities within the WorkSpace system involves processes that integrate communications, message management and document management functions as required by business practices or as dictated by user preferences. The use of communications and message management platforms as engines for document management, all within a unified portal framework, is advantageous.

An Exemplary System Hardware

Figure 6:
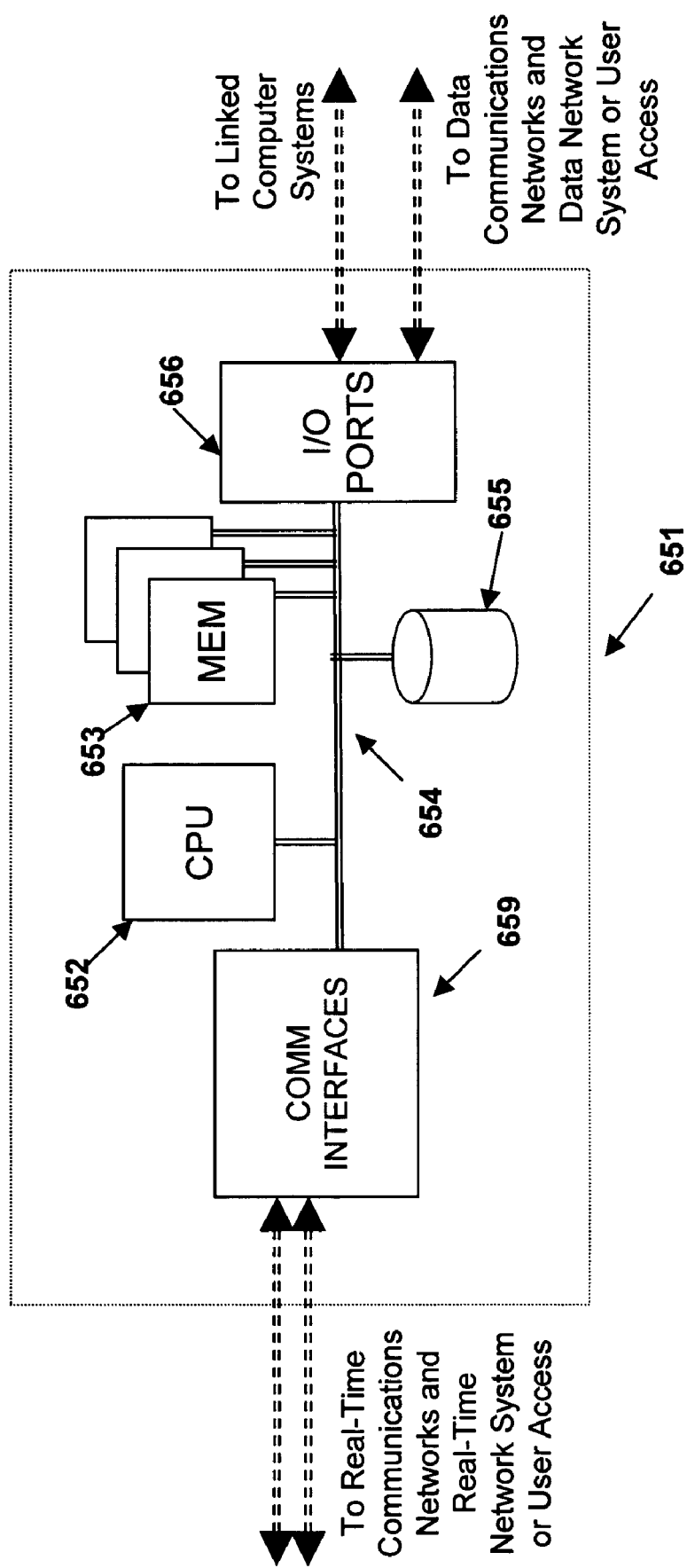
FIG. 6 illustrates WorkSpace system hardware architecture employed in one embodiment of the invention.

FIG. 6 illustrates one embodiment of a WorkSpace system computer 651, which may perform the functions of a Web server, a messaging server for the management and storage of messages, a server for the storage of documents and/or databases, and a server for switching and routing real-time communications as described herein. A similar computer system, either attached to system 651 with a telephone network interface or within system 651 itself, with TTS and speech recognition programs may be used to read text messages to users and to implement a voice response unit, as described herein.

The CPU 652 may contain a single microprocessor (e.g. an x86 microprocessor), or it may contain a plurality of microprocessors for configuring the computer system 651 as a multi-processor system. The memories 653 include a main memory, such as a dynamic random access memory (DRAM), as well as a read only memory, such as a PROM, an EPROM, a FLASH-EPROM, or the like. The system 651 also includes mass storage devices 655 such as various disk drives and tape drives. The main memory typically includes dynamic random access memory and high-speed cache memory. In operation, the main memory stores at least portions of instructions and data for execution by the CPU 652.

The mass storage may include one or more magnetic disk or tape drives or optical disk drives, for storing data and instructions for use by CPU 652. For an enterprise-based WorkSpace system, for example, at least one mass storage system 655 in the form of a disk drive or tape drive, stores the operating system and application software as well as data, such as received and sent messages and documents. The mass storage system 655 within the computer system 651 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 651. It should be noted that mass storage devices for messages, documents, and other user information, as well as parts of the application software may be outside computer system 651.

The computer system 651 also includes one or more input/output interfaces for communications, shown by way of example as an interface 659 for real-time communications via a real-time communications network. Examples of real-time communications include: voice calls; video calls; audio conferences; video conferences; and audio/video conferences integrated with Web conferences. The interface 659 may be a modem, channel bank, digital signal processor card with ports, fax cards, or any other appropriate voice-grade communications device, for digital and analog communications of various types via a voice communications network. The physical communication links may be optical, wired, or wireless (e.g., via satellite or cellular network).

The computer system 651 may further include appropriate input/output ports 656 for interconnection with data networks or devices connected over a common data network. The input/output ports 656 may be a modem, an Ethernet card or any other appropriate data communications device. To provide the WorkSpace service to a large number of customers, the interface 656 preferably provides a relatively high-speed link to a data network or to the Internet. The physical communication link may be optical, wired, or wireless (e.g., via satellite or cellular network). Alternatively, the computer system may comprise a mainframe or other type of host computer system capable of Web-based communications via a data network or the Internet. The input/output ports may include a display and keyboard serving as the administrative or user interface. Although not shown, the server type system could also include a port for connection to a printer. The input/output ports are one of the main access points for users into the computer system 651 as well as the point of interconnection with other WorkSpace systems and related computer devices.

Each computer system 651 runs a variety of application programs and stores data, enabling one or more interactions via the communications interfaces or the input/output ports to implement the desired processing for the WorkSpace service or the processing of requests for related services. One or more such applications enable the delivery of Web pages, the management of documents, the generation of email and other messages, and communications in a real-time environment. Those skilled in the art will recognize that the computer system 651 may run other programs and/or host other Web-based or Internet Protocol based services. As such, the computer system 651 need not sit idle while waiting for WorkSpace service related functions. Also, the system 651 may be implemented as a single computer system or as a distributed system having multiple appearances at different nodes on the Internet.

The components contained in the computer system 651 are those typically found in general purpose computer systems used as servers, workstations, personal computers, network terminals, and the like. In fact, these components are intended to represent a broad category of such computer components that are well known in the art. It should be noted, however, that the underlying principles of the invention are not limited to any particular computer system architecture.

An Exemplary System Software and Data

Figure 7:
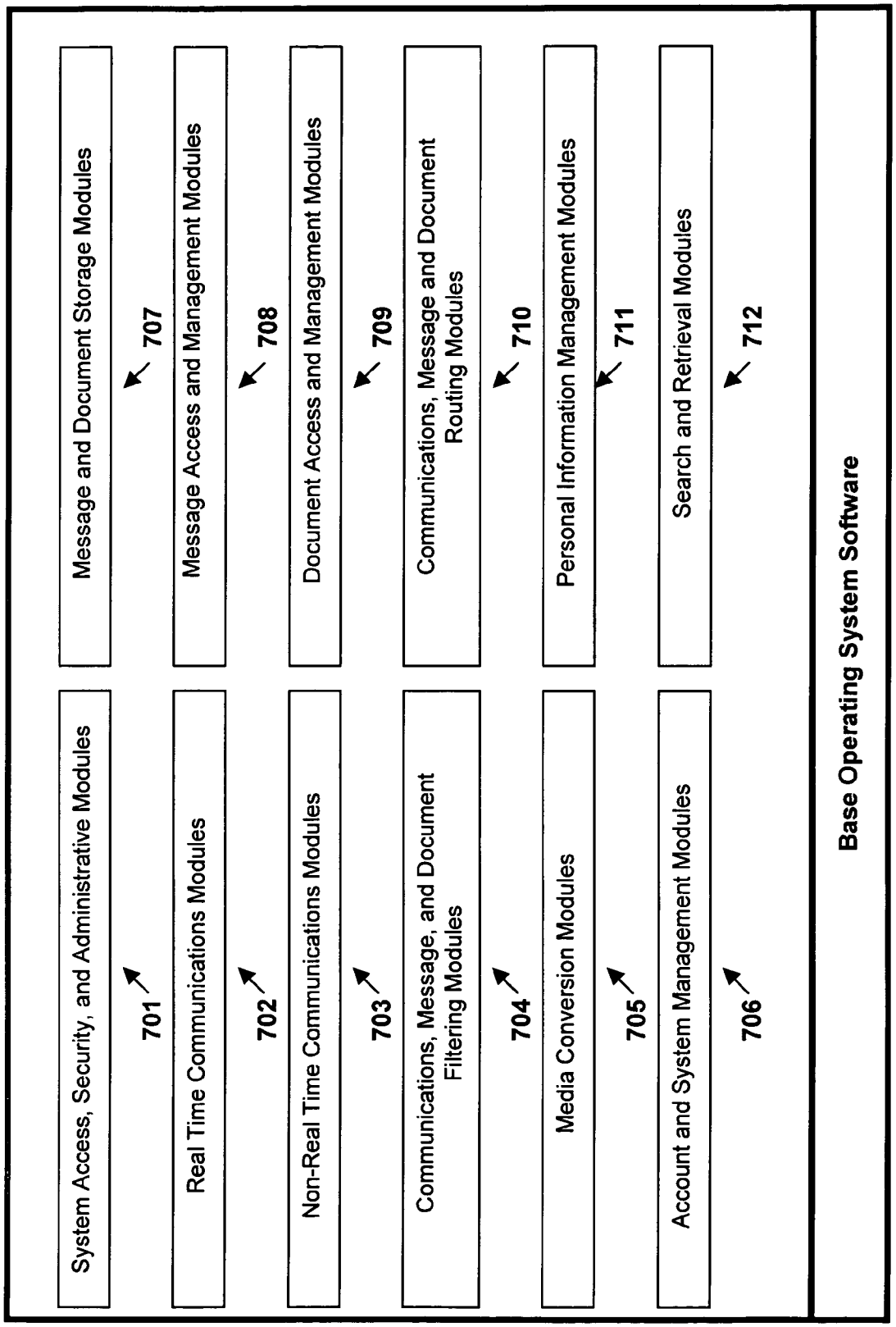
FIG. 7 illustrates a general view of a WorkSpace system software architecture employed in one embodiment of the invention.

Many concepts discussed herein relate to the software elements, such as the executable code and/or the various databases containing information essential for proper working of the executable code, and other software used to implement the different functions in each of the software modules identified in FIG. 7. These functions may reside on the same physical system or on different physical systems that are linked by local or wide area communications networks. However communications among WorkSpace systems and computer systems serving as storage systems for messages, documents and databases may be private and/or appropriately secured.

Thus, some of the concepts discussed herein relate to functionalities embedded within and processes enabled by WorkSpace software. The software consists of executable code that performs various functions contained within various modules. It also consists of various databases that are essential to the performance of the executable software code. The exemplary modules illustrated in FIG. 7 include system access, security and administrative modules 701 for providing access, security and network administration functions (e.g., such as user authentication, encryption, and authorization, as described herein); real time communication modules 702 and non-real time communication modules 703 for providing the various real time and non-real time communication techniques described herein; communications, message, and document filtering modules 704 for providing the various rule-based filtering techniques described herein; media conversion modules 705 for converting between different types of communications media (e.g., voicemail to email conversion); communications, message and document routing modules 710 for performing various document and message routing functions described herein; message and document storage modules 707 for performing message/document storage functions; message and document access and management modules 708 and 709, respectively, for providing various message and document management functions described herein; account and system management modules 706 for providing end users and administrators with account management capabilities described herein; personal information management modules 711 for management of contacts, calendar items (events, tasks, alerts), and other user-specific information; and search and retrieval modules 712 for providing the search and message/document retrieval capabilities described herein.

Thus, FIG. 7 provides a high level view of the functional modules used to implement a variety of different WorkSpace system features described herein. The specific functions performed by each of the modules 701–712 will be apparent from the specific examples of system operation set forth below. It should be noted that other modules necessary for specific or custom processes or applications may also constitute functional modules of a WorkSpace system. For example, an embodiment of the WorkSpace system may entail integration with a company's accounting system. In this case, an additional third-party application interface module would constitute a WorkSpace system functional module.

In one embodiment, the functional modules illustrated in FIG. 7 are designed to run on a Linux operating system, but may also be extended to work with other operating systems such as UNIX and Windows. Of course, as mentioned above, the underlying principles are not limited to any particular software or hardware implementation.

Embodiments of an Agent Software Architecture for Integrated Communications, Message, and Document Management One embodiment of the invention is built from a plurality of autonomous communicating entities referred to herein as "agents." By way of example, messages transmitted via different communication media, such as email, voice, and text messaging, are managed using agents that process and communicate messages/documents from one location to another while respecting various instructions that are associated with the messages/documents. As described in greater detail below, in one embodiment, the agents perform their respective functions (e.g., processing, routing, filtering) based on a multi-layered set of rules (see, e.g., FIGS. 27–28).

In one embodiment of the WorkSpace system, some agents are responsible for performing specific tasks such as, by way of example, sending an email, saving a message to a folder, or handling a phone call. Agents that perform these specific tasks are referred to herein as "Task Agents." Some agents in the WorkSpace system mainly perform the work of coordinating the tasks of other agents. Such agents are generally referred to as "Manager Agents."

Figure 8:
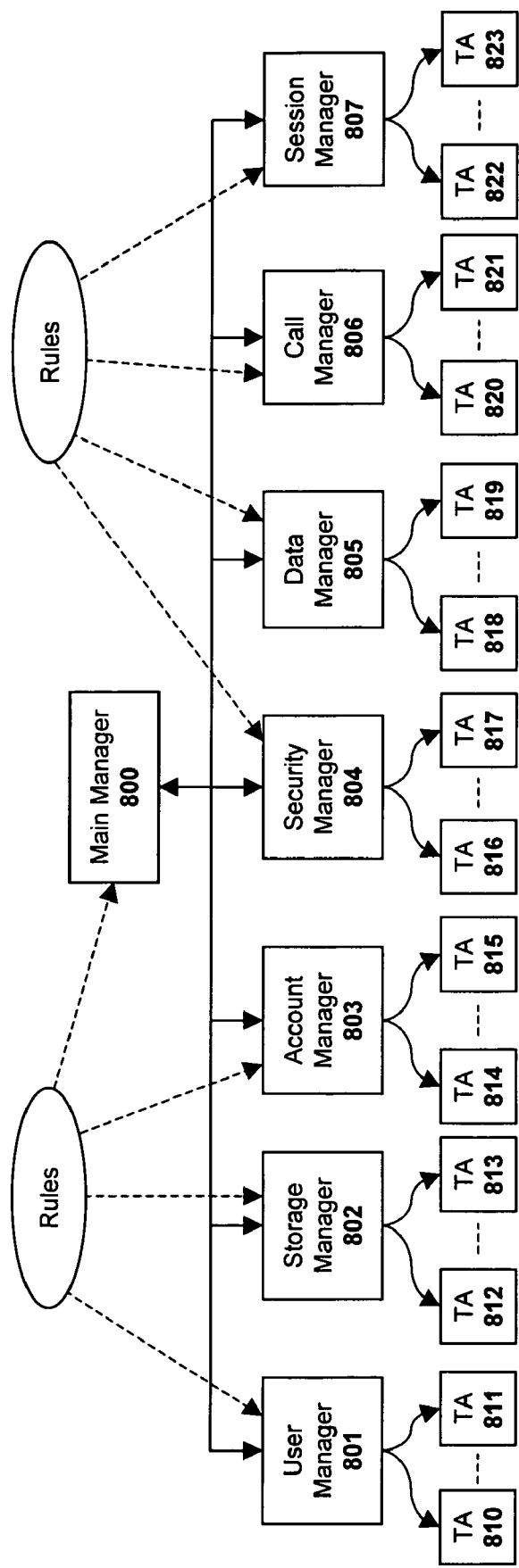
FIG. 8 illustrates a more detailed view of a WorkSpace system software architecture comprised of a plurality of agents.

FIG. 8 illustrates an exemplary architecture showing a plurality of manager agents 800–807 and a plurality of task agents 810–823 managed by the manager agents. Manager agents are arranged in a hierarchical fashion, with some manager agents, such as manager agent 800, coordinating the management activities of other manager agents 801–807. This model of management is generally called a "Federated System of Agents" and is a way of organizing communications between agents. Messages between agents are sent through manager agents so that manager agents may decide the best way to perform the activities associated with the agent.

Even though the agents 800–807 can run autonomously, i.e., as independent programs, they can also respond to messages they receive through a messaging medium. In one embodiment, internet sockets are used to pass messages between agents, but other techniques for message passing may also be used. When an agent receives a message it can choose to act on the message by responding to it, performing a task requested in the message or ask other agents to perform this or other related tasks.

Within the WorkSpace system, agents may be organized on the same computer or they may be organized, according to their function, on separate computers. Since portions of WorkSpace may operate on different computers, the WorkSpace system may be considered as a distributed program. For example, agents handling fax services may reside on one computer while agents handling Web services may reside on a separate computer. The agents that are on different computers may work together as if they are on the same computer by exchanging messages that relate to performing tasks. For example when a fax arrives at the fax server, an agent on the fax server will inform its manager agent on the same fax server, which will then inform the manager agent on the Web server computer. This information will tell a Web server task agent to update the Web pages of the user who just received the fax, even though the Web server computer never received the fax. When the user tries to retrieve the fax, a Web server agent will, through a system of managers, ask an agent on the fax server to retrieve the fax and to send it to the user's Web page.

A system of agents accomplishes distributed message management of equivalent messages through the coordination of multiple management tasks, one task for each location where the message is stored or sent. At the head of these agents is a main task manager agent 800 that coordinates all other manager agents 801–807 and associated task agents. In one embodiment, when a message is managed by a task agent, the main task manager is informed when the particular task is performed. This, in turn, initiates a series of instructions to manage the same message across the system as specified by a set of rules.

In operation, any request to the WorkSpace system arrives at one of the different interfaces provided by one of the manager agents 800–807. Depending on the nature of the request, a task is initiated within the domain of the manager, or some other managers are involved in handling the request. The workflows involved for handling different tasks are coded into the request-handling manager. In one embodiment, the session manager agent 807 is involved in most activities not involving telephony connections and the call manager 806 is involved in activities involving telecommunications.

As an illustration, suppose that an instant message is sent to a WorkSpace system user. In one embodiment, this message arrives at an agent managed by the session manager agent 807 that handles instant messaging. The session manager agent 807 may invoke some rule-based filters to decide how to process this message. The security manager 804 may also be involved to determine whether the instant message received is a legitimate message. The user manager 801 may be involved in retrieving the user's profile to determine where to forward the message (e.g., perhaps in a different format).

Suppose that the rules/filters determine that a text message containing the content of the instant message is to be sent to the user's cell phone. Then, in one embodiment, the appropriately filtered text message version of the instant message is created by a message translation agent. This message is then relayed to the user's cell phone through an agent managed by the call manager agent 806. If the message cannot be sent successfully, the call manager agent 806 may notify the session manger agent 807 to send an instant message to the sender, indicating that the user is offline. To do this, the session manager agent 807 needs to maintain a session history, so a history agent subordinate to the session manager is utilized to see how to respond to the last message.

The foregoing example illustrates that many different components may be involved in achieving a task. In addition, tasks may be achieved asynchronously through message passing and the system does not depend on every component being available all the time. For example, in the example, the fact that the user's cell phone is not be turned on is merely a condition to be handled by the call manager agent 806.

In addition, each component maintains its own activity and interprets any arriving request reasonably based on its available information. For example, in one embodiment, the session manager 807 maintains a history that tells it how to handle a failed attempt to send a message. This can also take into account other conditions such as a later message from the same sender.

Moreover, for tasks that may involve significant computational or communications resources, many versions of the same capability (i.e., the same manager agents and associated task agents) can be provided within WorkSpace system. For example when experiencing a high volume of call handling, the session manager may communicate with the next available call manager through the local high speed network just as if it is on the same computer.

Finally, using the agent architecture, capabilities may be developed and added in stages (e.g., some can be achieved and tested while others are being developed). For example, until a text message agent is available, an email agent may send an email to the user containing the text of the instant message. Incorporating the text message manager would then require only a few lines of extra program logic when the text message manager becomes available.

The foregoing example is intended to illustrate the way agent-based systems work in managing messages and communications, but should not be read to limit the scope of the present invention. Different agent types and hierarchies may be employed while still complying with the underlying principles of the invention.

In one embodiment of the invention, the set of agents illustrated in FIG. 8 provide the following features to the WorkSpace system:

1. User Manager Agent 801
1.1. Profile—each user has a profile that expresses user information such as logins, address or devices. This may also include accounting information for billing and personal information such as contacts and calendar items (events, tasks, alerts).
1.2. Preference management—users can express preferences that may be used by the filtering and routing subsystems of the session manager.
1.3. Capabilities—users may be provisioned for various combinations of services. These preferences are used by the session manager to decide on services available to the user. The provisioning manager interacts with the user to recall and change account capabilities that can be later used during sessions.

2. Storage Manager Agent 802
2.1. Archival agent—data about prior states of the WorkSpace system, including, by way of example and not limitation, database backups and previous user preferences that are saved using an archival, or backup, subsystem.
2.2. Session history agent—history of various sessions are stored using a session history manager that can recall previous sessions. This is also the part that may be affected if very large storage for user sessions, such as email and voice mail, is offered as part of WorkSpace system. There are different session histories for different communication modes, each of these may be handled by a separate agent:
2.2.1. Fax history agent—provides a history of received/sent faxes.
2.2.2. Text message history agent—provides a history of received/sent text messages using the short message service.
2.2.3. IM history agent—provides a history of received/sent instant messages.
2.2.4. Email history agent—provides a history of received/sent email messages.
2.2.5. Voice message history agent—provides a history of received/sent voice messages.
2.3. Call records agent—record of various telecommunication sessions are saved since these may be needed for billing some services and also for resolving disputes.
2.4. Voice mail archives agent—this manages older voice mail messages and usually includes automatic cleanup of old records (being autonomous, the agent can perform this task at regular time intervals regardless of other activities.)

3. Account Manager Agent 803
3.1. Billing agent—involves preparing the bills on regular intervals according to different criteria. There may be different modes of billing such as direct billing and credit card billing that may be handled by subsystems of this agent.

3.2. Account profile agent—a user may have different profiles, different display preferences, multiple messaging accounts, and other information specific to the user.

3.3. Account utilities agent—interfaces with external data sources with which data is exchanged. There may be different subsystems for this agent that handle tasks such as synchronization of data (e.g., personal contacts, calendar items), exporting and importing of data including sound and image files, and interfacing with external applications (e.g., corporate accounting system, third-party content providers).

4. Security Manager Agent 804

4.1. Web security agent—this manages security of the Web site, with log-ins, cookies, secure sockets and other standard Web security measures.

4.2. Device security agent—deals with similar security considerations for other access devices. The method and quality of security will differ based on device capabilities.

4.3. Secure storage agent—applies primarily to accounting information, but it can also be used in managing storage of anything securely. The functionality here is to store everything in such a way that all information is stored in an encrypted way so that a compromised computer does not compromise the contents in storage.

4.4. Voice signature agent—is a way to manage security of voice sessions, it is a possible addition to the various functions, but may require integration with some third party system.

Data Manager Agent 805—Manages the various databases employed on the WorkSpace system including, for example:

5.1. Personal Information databases—manages each user's contacts and calendar items.

5.2. Telephone number database—manages comprehensive list of telephone numbers 5.3. Account history—user account history 5.4. Session history—includes major parameters such as session duration, start and end time for each mode of access. More detailed session data such as email or voice mail may be separately stored by the storage system.

5.5. Provisioning history—this is useful for account disputes 5.6. Management reports—the database can produce a variety of reports, this can also use some standard report generation tools.

5.7. Just in time information systems—this may be used for management reports, but it can also be a service that supplies filtered reports to users.

6. Call Manager 806—manages all aspects of telecommunications.

6.1. PSTN interface—access to the PSTN through an intelligent network layer.

6.2. Fax server—this is an important WorkSpace system component for managing incoming/outgoing fax traffic.

6.3. Voice mail server—this is another important WorkSpace system component for managing voicemail.

6.4. Voice services—involves managing messages using voice commands and may require some third party components.

6.6. Telecommunications services including forwarding, recording, conferencing, and blocking of voice and video calls and conferences.

6.7. Voice over IP services—for providing and managing voice over IP connections.

6.8. Fax over IP services—for managing fax over IP communications.

7. Session manager 807—Manages user sessions within the WorkSpace system.

7.1. Web session manager
7.1.1. Web page server
7.1.2. Application interfaces
7.1.3. Database manager for Web sessions
7.2. Filtering subsystem
7.2.1. Rule management
7.2.1.1. Rule session—where the user defines the rules
7.2.1.2. Logical rule interpreter—this may utilize a simple rule engine
7.2.1.3. Flexible rule interpreter—this involves finding balanced resolution between multiple possibly conflicting rules
7.2.2. Learning filters
7.2.2.1. Neural network learning filters
7.2.2.2. Machine learning systems
7.2.3. Spam filters—if required
7.2.3.1. Email filter
7.2.3.2. IM filter
7.2.3.3. Voice call filter
7.2.3.4. Fax filter
7.2.3.5. Voice message filter
7.2.3.4. Text message filter
7.3. Message translation system—consists of systems for extracting information from messages in one format and sending that information in an appropriate form to a target device. The following agents are merely examples
7.3.1. Fax header to telephone
7.3.2. Email to stored voice messages
7.3.3. Voice mail to email enclosure
7.3.4. Any media to text message
7.3.5. Any media to speech
7.4. Provisioning
7.4.1. Account provisioning—may also be in the accounts manager
7.4.2. Route provisioning—setting up various call and message handling options
7.4.3. Route preferences—is related to rules and user profiles
7.5. Synchronization
7.5.1. Synchronization with other messaging systems or external databases
7.5.2. Synchronization with desktop data
7.6. Third party devices
7.6.1. Wireline phone devices
7.6.2. Wireless phone devices
7.6.3. Wireline computer devices
7.6.4. Wireless computer devices
7.6.5. Personal Digital Assistants
7.6.6. Hybrid phone/computer devices
7.7. Call session manager—handles various aspects of a call session and is related to the call manager.
7.8. History manager—also interacts with history storage and learning systems.
7.9. Voice session—largely voice-based sessions. The following components may be considered separately:
7.9.1. Voice recognition
7.9.2. Text to speech (TTS)
7.9.3. Voice dialing
7.9.4. Voice security.

In one embodiment of the invention, the hierarchical, agent-based architecture described above is used to enable the various WorkSpace system features described herein. It should be noted, however, that the underlying principles of the invention are not limited to any particular software or hardware architecture.

Context-specific Views and Filtering Using a Virtual Contextual File System

Individual users of computer devices access documents and messages in a variety of formats. Generally, different document/message sets are associated with different devices. The documents accessed on a desktop, for example, are often different from those obtained through the Web. Similarly, the documents/messages retrieved through telephone systems form yet another set of documents/messages. One embodiment of the WorkSpace integrated message and document management system overcomes limitations of traditional systems and aims to provide contextual access to messages and documents from different devices.

Users generally need access to not just individual documents but a group of related documents. Users of desktop computers generally organize related documents in folders. The simplest way to provide access to documents is to provide access to documents based on the physical organization of documents in a desktop computer. This however does not meet the requirements of contextual access. Users may have different contexts for their documents. For example, a user may have various work-related projects. In addition, such a user may have contexts associated with home, social activities or hobbies. One embodiment of the WorkSpace system provides contextual access to groups of documents/messages and yet provides this access in a way similar to how messages/documents may be accessed on a familiar desktop system.

Figure 9A:
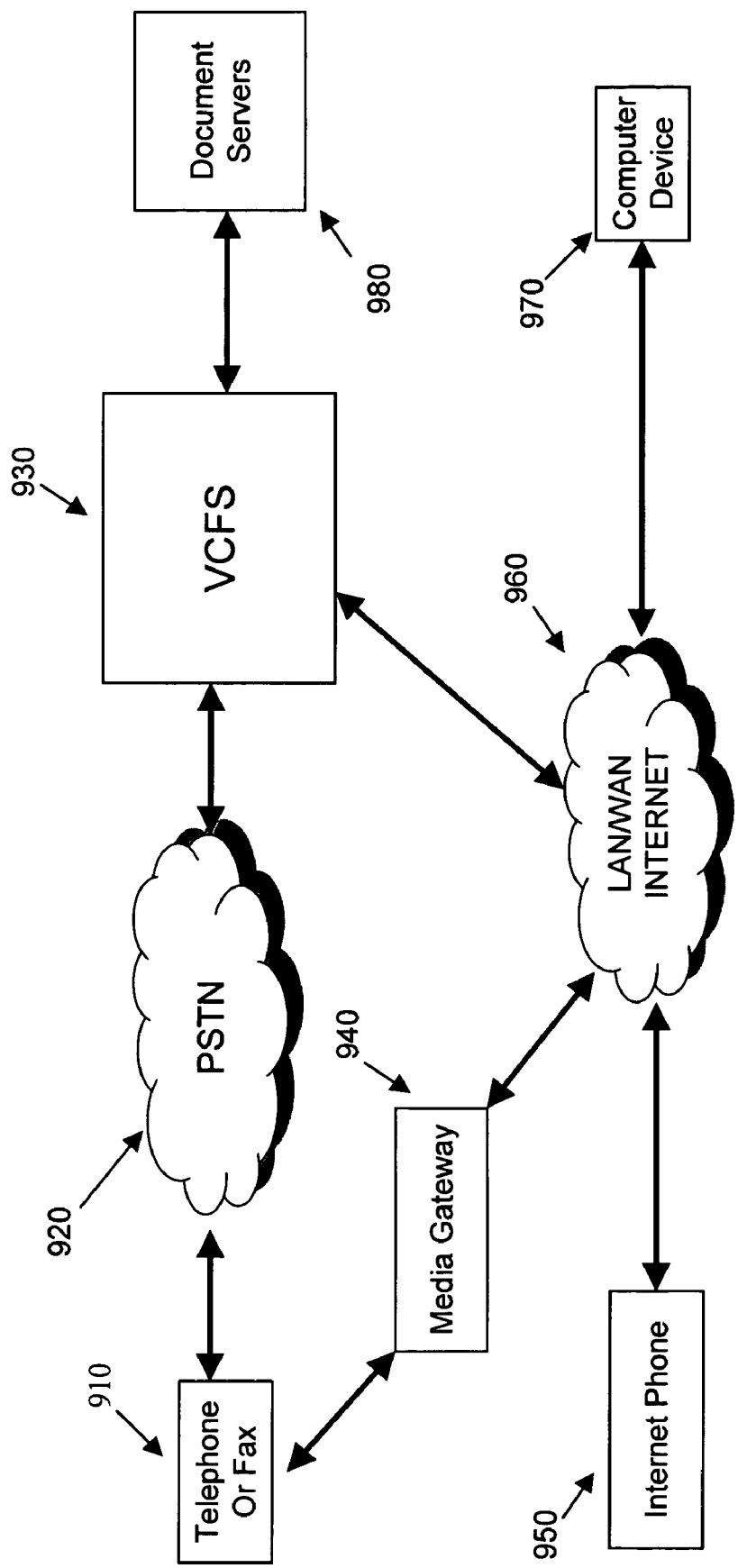
FIGS. 9a–c illustrate a virtual contextual file system employed in one embodiment of the invention.

FIG. 9a illustrates one embodiment of a Virtual Contextual File System ("VCFS") implemented within the WorkSpace system to provide users with contextual views of messages and/or documents. The VCFS 930 is connected to the PSTN 920 and the LAN/WAN INTERNET 960. The VCFS 930 is also connected to document/message servers 980 within the WorkSpace system that provide raw document and message (hereinafter referred to generally as "documents" in this section) storage. The document servers 980 may support any of the document and message types described herein including, for example, email messages, voice messages, fax messages, word processing documents, and spreadsheets. The documents stored within the document storage may be accessed through any of the communication channels described herein including, for example, telephone or fax devices 910, Internet phones 950 or computer devices 970. Devices utilizing wireless telephony are included among telephone and fax devices 910, while a variety of computer devices including internet devices and wireless local area network devices are included among computer devices 970.

In one embodiment, the VCFS and the other components illustrated in FIG. 9a exist within the framework of the WorkSpace system and the agent architecture described above. For example, the call manager agent 806 (and associated task agents) may provide connectivity to telephony devices 910, 950 and the data manager agent 805 (and associated task agents) may provide access to the document servers 980. In fact, in one embodiment, the VCFS is itself a manager agent which communicates with the rest of the agent framework via message passing. In one embodiment, documents are organized according to contexts such as "Work," "Friends," and "Home." A variety of additional customized contexts may be specified by the user.

Figure 9B:
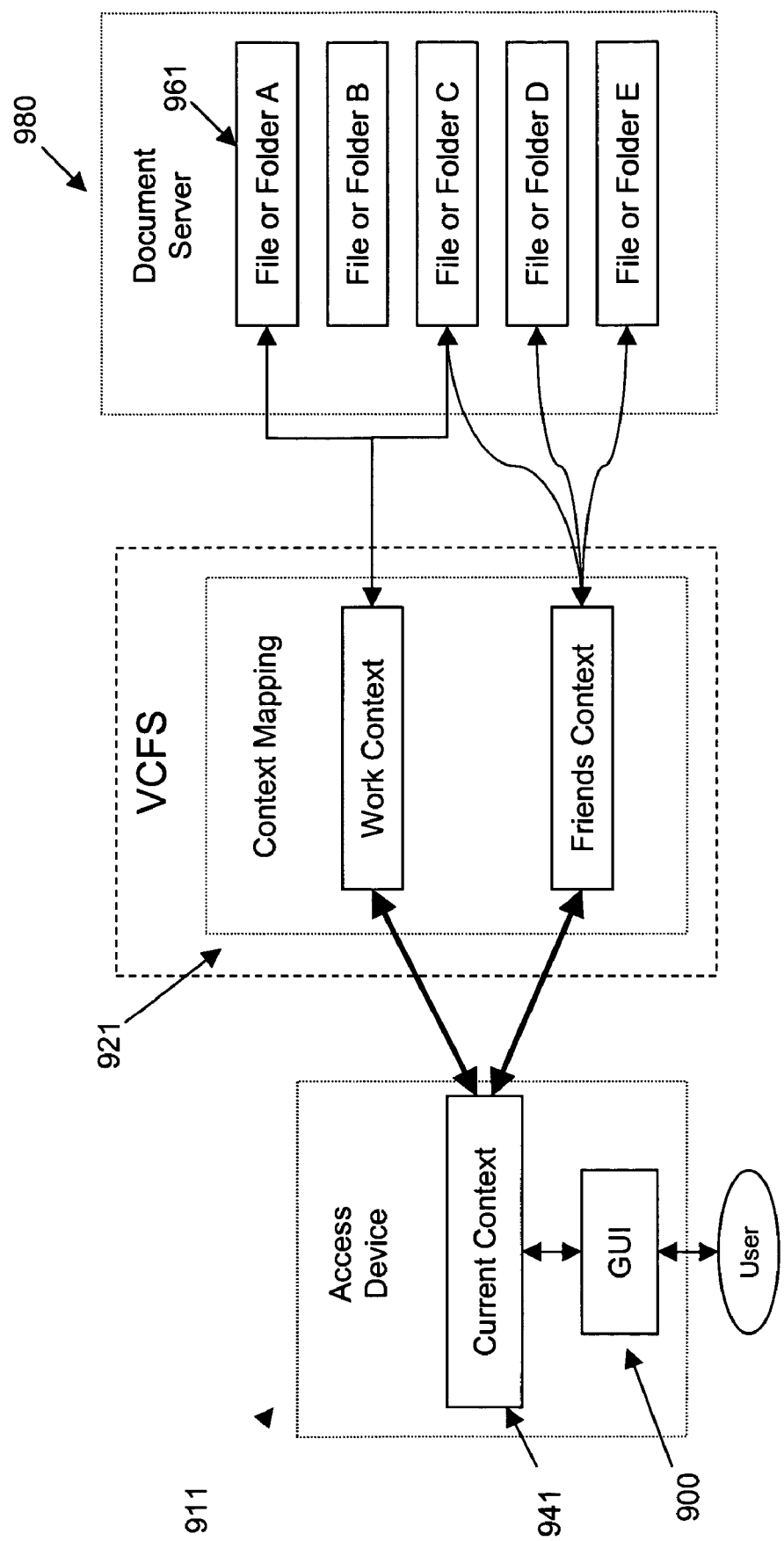

FIG. 9b provides a more detailed illustration of one embodiment of the VCFS. Access device 911 may be any access device including PSTN phones, fax devices, Internet computers, Internet phones, or computing devices of all types. Through the graphical user interface 900 (or other type of interface) of the access device 911, users may specify contexts 941 for document viewing and access. For example, as illustrated a user may specify a "Work" context. In response, context mapping module 921 within the VCFS will employ document filtering techniques to ensure that only documents related to "Work" are displayed and made accessible to the user. In addition, in one embodiment, the user may switch contexts at any time. In one embodiment, the GUI 900 includes a drop-down menu for switching between contexts (e.g., such as those described below). In response, the context mapping module 921 generates a new view based on the selected context. For example, in response to selection of the "Friends" context via the GUI 900, the VCFS will filter out any documents not associated with the "Friends" context. In one embodiment, the currently selected context 941 within the access device is used by the VCFS to identify and organize documents related to the particular context.

Information associated with the current context is communicated to the VCFS through various network protocols (e.g., wireless and Internet transmission protocols including wireless Internet). The Context mapping module 921 interprets the context to create the virtual file systems by retrieving information associated with the current context from the document servers 980. Thus, for each context, such as "Work" or "Friends," the context mapping module 921 maps actual files or folders residing on the document server 980 to the current context 941 of the access device. As illustrated, the document server contains multiple files (e.g., documents and messages) and folders such as "File or Folder A" 961.

Each context within the context mapping module 921 is associated with an arrangement of files and folders on the document server. Moreover, it is possible for different contexts to share one or more files or folders on the document server (such as "File or Folder C" in the illustrated example). It is also possible to have files or folders on the document server 980 that are not associated with any context.

Figure 9C:
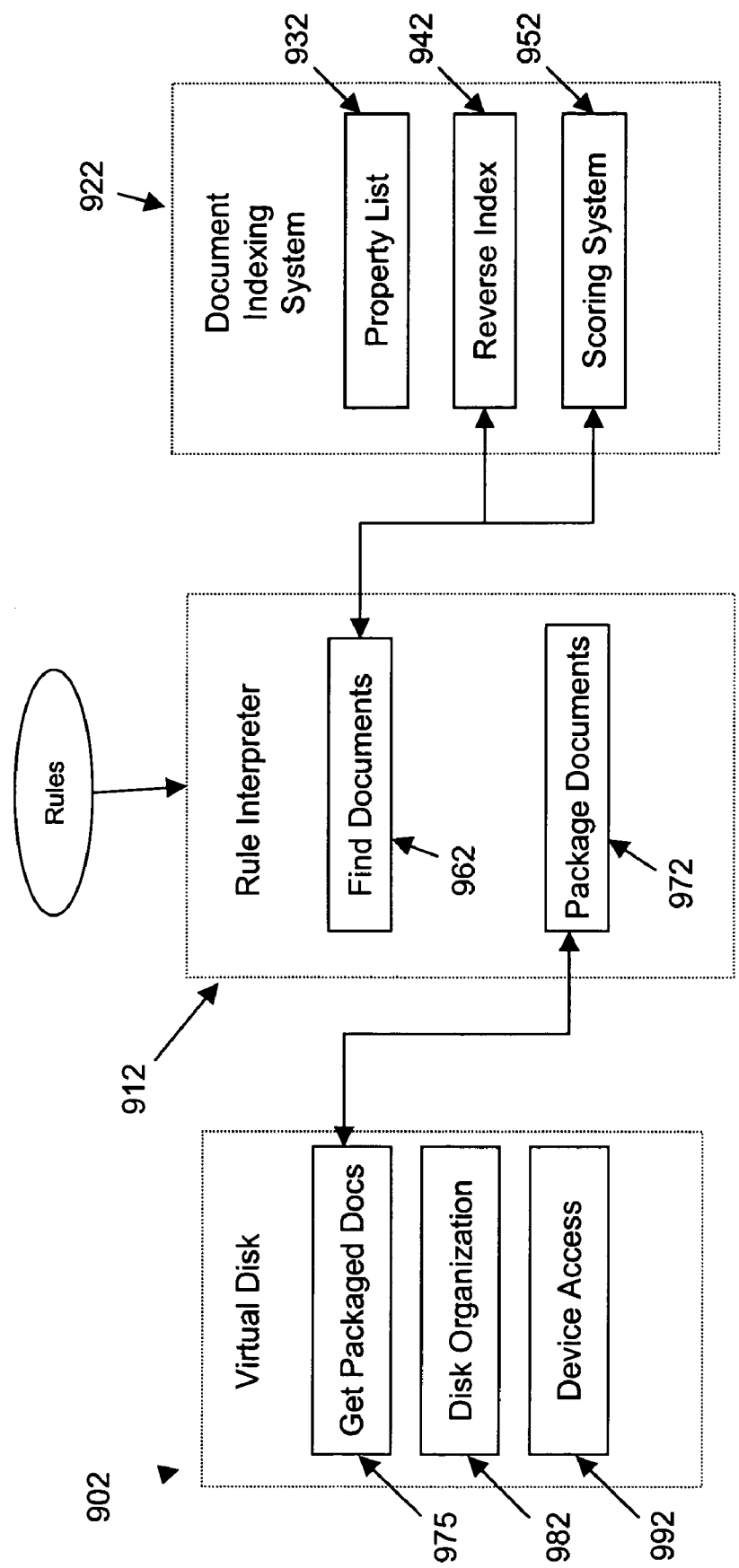

FIG. 9c illustrates the operation of one embodiment of the context mapping module 921. In this embodiment, the context mapping module 921 performs the mapping functions through a set of rules which may be specified by the user (e.g., via the WorkSpace user interface as described below). The VCFS may also contain a set of predefined rules. For example, a predefined rule may associate documents created between 8 a.m. and 5 p.m. with the "Work" context. The context mapping module 921 interprets the rules to search the document system for files and folders matching the current context. This information is then packaged to appear to be a real file system that simulates the desktop appearance of a file system.

The context mapping module illustrated in FIG. 9c includes three major components: a document indexing system 922, the rule interpreter 912 and a virtual disk 902. The document indexing system 922 maintains persistent, up-to-date information related to the files and folders that are used by the VCFS. Specifically, in one embodiment, the document indexing system 922 creates and updates information that facilitates later retrieval of documents (performed, for example, during periods of low user activity). This involves analyzing the contents of the actual document storage 980 to associate documents with certain specified properties. Information from this analysis is stored in a property list 932 that extends the usual dictionaries used in search operations. A property list may contain details besides document contents. For example, it may contain information about the time of creation and the times and durations of previous access, when associated with various contexts. In particular, property lists also contain information, called ancestry, about each file or folder in terms of its "parent" and other "ancestor" folders. The property list is used to create a reverse index 942 which associates queries about documents with actual documents according to document properties. In a simple example, the reverse index could associate a point in time with documents created within a few hours of that point in time.

In one embodiment, the reverse index 942 and property list 932 are further analyzed within the document indexing system 922 using a scoring system 952. This system assigns scores to matching documents so as to organize the documents using a number of different criteria. Some of the criteria may be common criteria associated with file systems on the desktop. For example, the scoring system 952 may organize files based on alphabetical ordering of names and/or times of creation or access. Other scoring criteria may be based on various measures of relevance such as frequency of access or higher degree of match with each document query.

Another function of the document indexing system is executed when users are searching for documents. This operation involves the virtual disk 902 and the rule interpreter 912. During this function, queries are sent from the rule interpreter to the document indexing system. Each query accesses the reverse index 942 and the scoring system 952 to create a hierarchy of files and folders based on the query.

The rule interpreter 912 utilizes predefined or customized rules associated with the user's current context. For example, one rule associated with the "Work" context may state "Documents created under folders starting with the name 'Project' belong to the Work context." Another rule may state "If a document A has text that substantially overlaps text from a document B already belonging to the Work context, then A also belongs to the Work context." A virtually unlimited number of additional rules may be employed. The find documents 962 component of the rule interpreter is a rule-based interpreter that translates rules, such as the ones mentioned, to query terms that are understood by the document indexing system. For example, documents that fall within a folder starting with the name "Project" are identified through the reverse index 942 using the ancestry property of each file or folder.

Once a hierarchy of folders or files is obtained from the document indexing system 922, the package documents component 972 creates a secure, possibly compressed, version of the file system on the document server 980 for use by the virtual disk. The packaging may include whole documents or just links to documents based on the user's context and current access device. For example, if the user is accessing documents through a telephone, the package documents component 972 may provide the information only in the form of links, whereas if the user is accessing through a broadband internet connection, the package documents component 972 may supply the entire contents of some files.

In one embodiment, the contents from the package documents component 972 is utilized by the virtual disk 902 to present the user with a file system that mimics the appearance and functionality of an ordinary desktop file system (e.g., such as Windows). The first step of providing this view is to retrieve the packaged documents (or packaged links) from the package documents component 972 of the rule interpreter 912. After retrieving the packaged documents, a disk organization component 982 arranges the packaged information in the form of a disk. The user may access this information through a variety of devices. Depending on the device, the device access module 992 interprets the disk organization information in a manner suitable for the device. For example, when documents are accessed using a personal digital assistant, the device access module 992 may provide the documents using a familiar folder view as on desktops, but if accessed through a telephone, documents may be arranged in the form of a menu as in interactive voice response ("IVR") systems.

Advanced Rule-based Administration &
Management for Communications, Messages and
Documents As mentioned above, one embodiment of the WorkSpace system employs a variety of rule-based techniques for managing communication channels, messages and documents. In particular, users may invoke advanced rules to perform functions such as filtering, routing, synchronization, notification, and searching. The specification of rules (criteria, exceptions, and actions) is essential to advanced management of messages, documents, and communications. Such rules may be specified (1) on a system-wide basis applicable to all users, (2) at the system-level but applicable to a select set of users or accounts; (3) at the system-level in the form of pre-defined default rules that can be changed by the user; and (4) at the user level in the form of rules that the user can define, activate, and change.

The WorkSpace system employs various techniques to facilitate advanced information management including filters, views, searches, and saved searches. Given a particular set of information, filters narrow the set based on criteria defined by a user. In general, filters are used to narrow the set of information temporarily, quickly, and somewhat broadly. Filters are used in the WorkSpace system to narrow pre-defined sets of messages, documents, contacts, and calendar items. Pre-defined sets of messages include messages in a given folder, messages that comprise a view, and messages retrieved by a search. Pre-defined sets of documents include documents in a given binder, documents that comprise a view, and documents retrieved by a search. Pre-defined sets of contacts include the entire set of contacts and contacts retrieved by a search. Pre-defined sets of calendar items include the entire set of calendar items, particular subsets of calendar items (events, tasks, alerts), and calendar items retrieved by a search. The notion of a pre-defined set could easily be extended. In general, filters are temporary and any characteristic of the set of underlying members of the information set (e.g., document name, receipt date of a message) could be used to define the filter.

In contrast to a filter, "views" are more permanent. Users specify the various sources of information (e.g., folders, binders) as well as the characteristics of such information. Views are permanent displays of the filtered information and are automatically updated as the information in the defined sources change. Examples of views that many users find extremely useful include "new messages," "messages from particular people," "documents attached to messages," and "documents in a particular storage location" such as a user's local drive.

Searches of various kinds (quick, basic, and advanced) allow a user to retrieve information based on the information source and information characteristics that a user specifies. In contrast to views, searches are ad hoc and temporary. They are applied to information within the specified sources as it exists at the time of a search. In between views and searches are "saved searches" that contain previously defined sources of information and information characteristics. Such searches are applied to information contained in the specified sources at the time of the search. However, the sources and characteristics are saved so that a search may be run at a later time without having to repeat the specification of sources and information characteristics.

The above techniques—filters, views, searches, and saved searches—apply to data that is essentially static at a given point in time. They do not apply to information that is flowing in real time. Messages and calls, however, flow and rules may be specified to information as it is being received or sent. In the context of such dynamic flows of messages and calls, users may define management rules to handle them. Users may define management rules for incoming and outgoing messages such as email, text messages, faxes, and voicemail. They may also define management rules for incoming instant messages and calls. All of these management rules can be applied to incoming and outgoing information based on various characteristics of the information. In one embodiment of the invention, the management rules are defined within the context of a particular "mode" with "normal" mode being the default mode. The notion of "modes" is described in greater detail elsewhere in this application.

Some of the prior art incorporates few of the above-mentioned notions of narrowing the set of information in a user's WorkSpace. Yet few, if any, incorporate all of the various techniques described above—filters, views, searches, saved searches, and management rules. Even fewer allow for such techniques to apply simultaneously to various types of messages and across multiple sources of information (e.g., messages and documents).

In addition, the prior art has been fundamentally restricted in how to specify complex information characteristics. In particular, the ability to specify an unlimited number of rules with multiple criteria joined by AND, OR and NOT is not found in the prior art. The use of such "joins" does exist in the prior art but typically in the context of a single criteria specification such as "keyword" and often limited in the number of values that could be specified (e.g., three keywords). In general, much of the prior art in multiple criteria specification assumes AND as the operative join. Thus, advanced criteria specification in the prior art requires that all (and not some as implied by the join OR) of the criteria must be met. Furthermore, the method of specifying advanced or complex multiple criteria in the prior art is typically cumbersome and highly unintuitive.

The WorkSpace system allows for the specification of advanced rules in the context of views, searches, saved searches, and management rules. Three notable differences from the prior art is the ability to: (1) specify different types of "joins"; (2) rearrange the order of the criteria; (3) define unlimited multiple criteria efficiently; and (4) preview the results of applying the specifications before making "views" and "management rules" permanent.

Figure 10:
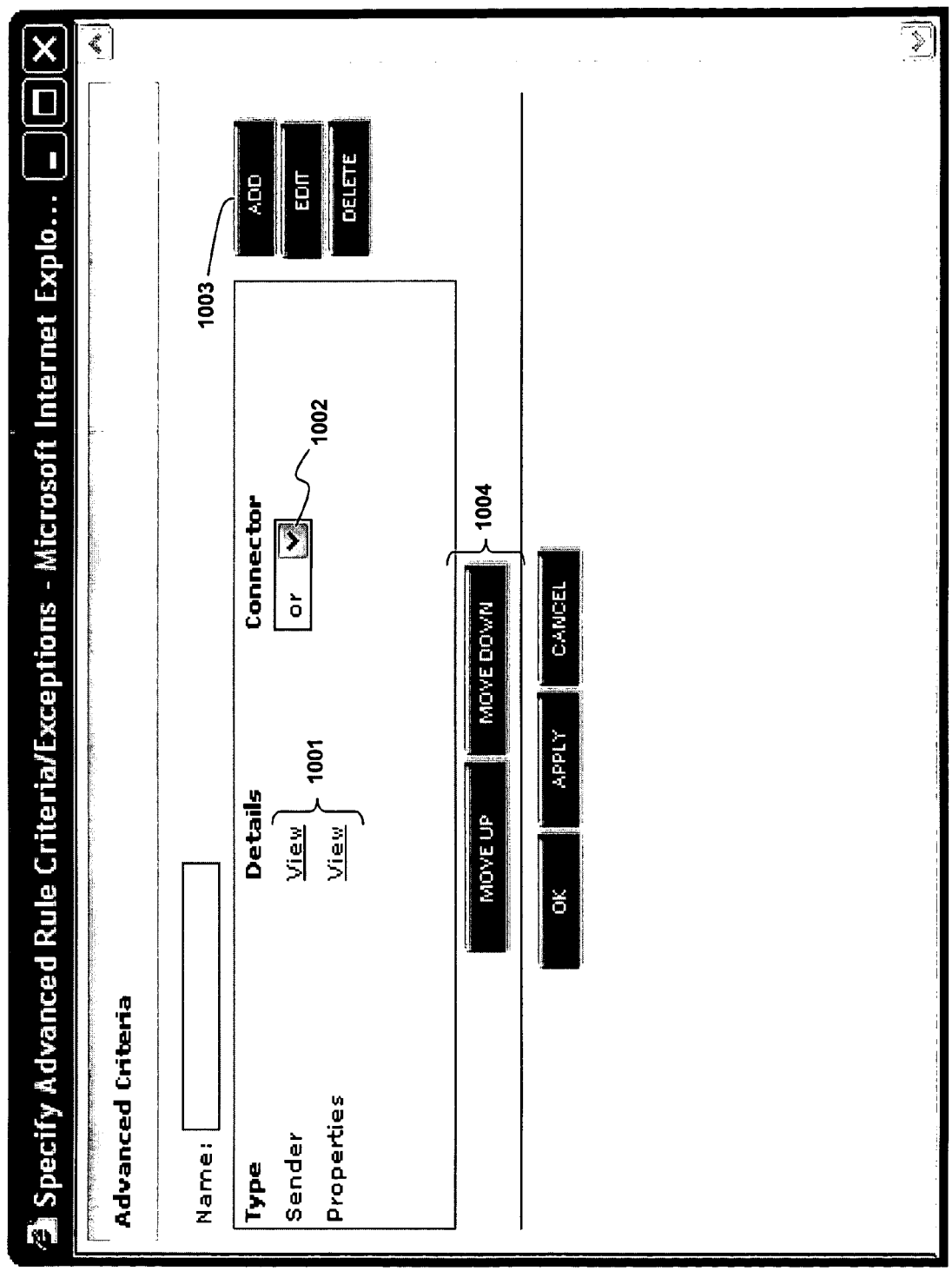
FIG. 10 illustrates an exemplary graphical user interface for managing advanced rules.

One embodiment of the Workspace system provides these features via a highly intuitive graphical user interface ("GUI") illustrated in FIGS. 10 and 11a–e. FIG. 10 shows a set of criteria 1001 which may be joined together using a variety of logical connectors selected through a drop down selection menu 1002. In one embodiment, the drop down menu 1002 includes AND, OR and NOT connectors. If two criteria are connected via an AND connector, the values of both criteria must be met to trigger an action. By contrast, if two criteria are connected using an OR connector, an associated action may be triggered if the value of either criteria is met. Finally, NOT connectors are employed to exclude certain criteria from the search, view, or filter. Any number or new criteria may be added via an "add" graphic element 1003 and joined together as described above. In addition, "move up" and "move down" elements 1004 allow the user to reposition each of the rules relative to one another (thereby facilitating the organization of the rules and associated connectors).

Figure 11A:
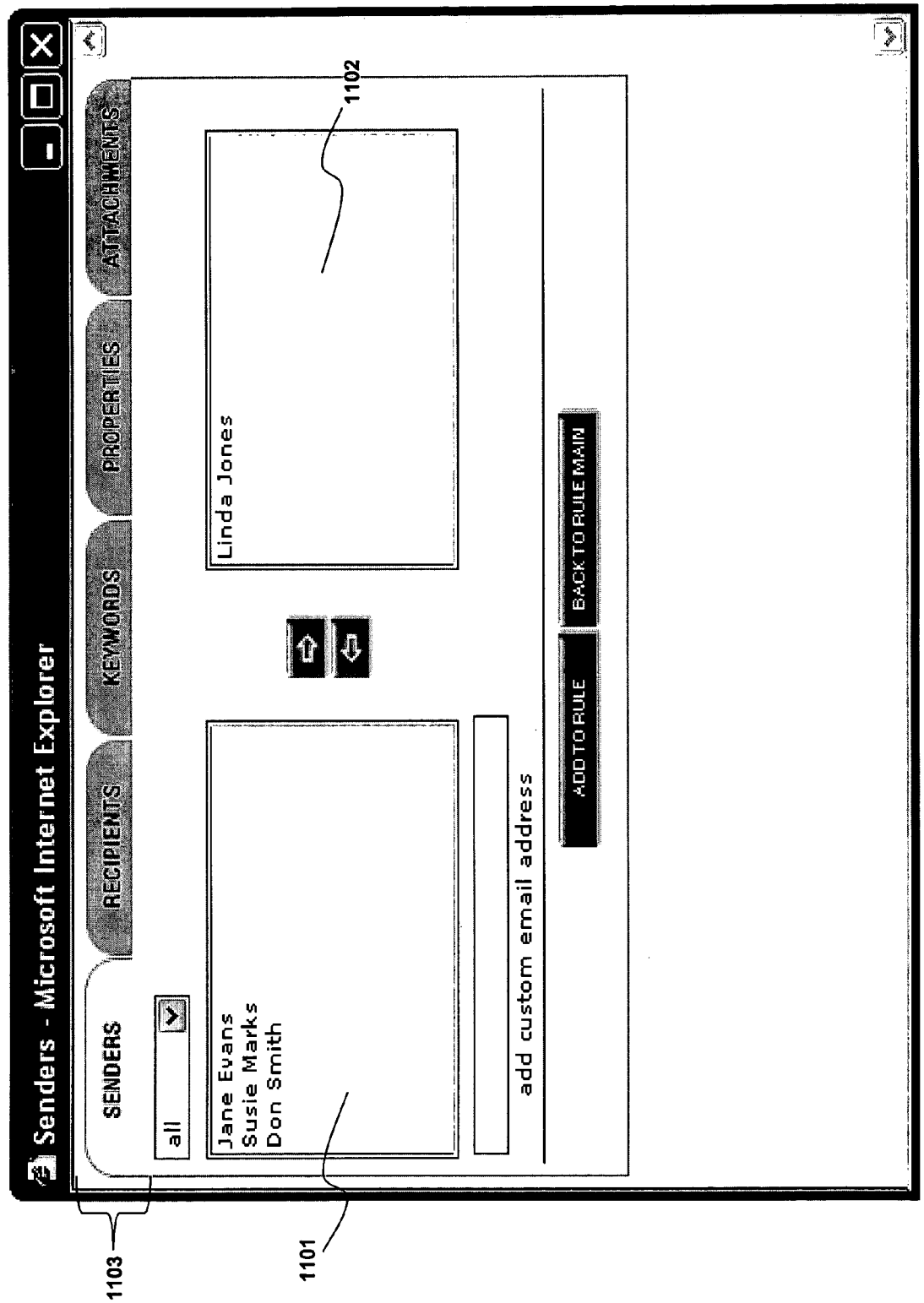
FIGS. 11a–e illustrate an exemplary graphical user interface for specifying advanced rule criteria.

FIG. 11a illustrates a GUI which may be employed to create new or edit existing criteria (i.e., in response to selection of the "add" graphic 1003). The GUI includes a plurality of tabs 1103 for specifying various different types of criteria including a "senders" tab for identifying one or more message senders who satisfy the criteria. In the illustrated embodiment, the "senders" tab is selected and a listing of users 1101 is provided which may include all WorkSpace system users, all contacts in a user's address book, all business contacts, all personal contacts, or any other grouping of potential message senders. Once selected, the sender is moved from the first listing 1101 to a second listing 1102 which includes all message senders to whom the rule applies.

Figure 11B:
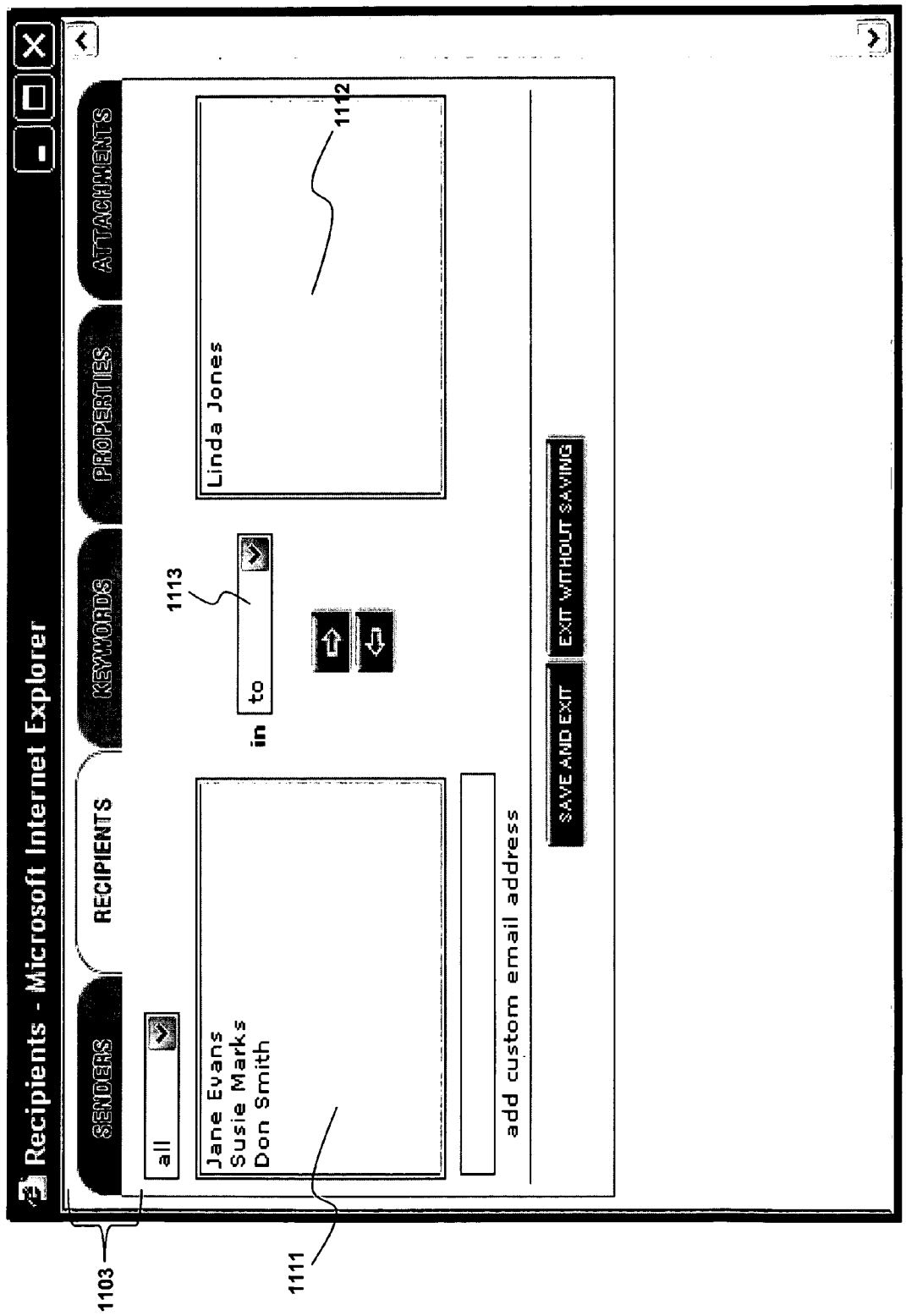

FIG. 11b illustrates a GUI generated when the "recipients" tab is selected from the plurality of tabs 1103. As in FIG. 11a, a listing of users 1111 is provided which may include all WorkSpace system users, all contacts in a user's address book, all business contacts, all personal contacts, or any other grouping of potential message senders. Once selected, the recipient is moved from the first listing 1111 to a second listing 1112 which includes all message recipients to whom the rule applies. In addition, a drop down menu 1113 is provided so that the user may specify whether the recipients are listed in the "TO" field, the "CC" field, the "BCC" field, or "ANY" field of the electronic message.

Figure 11C:
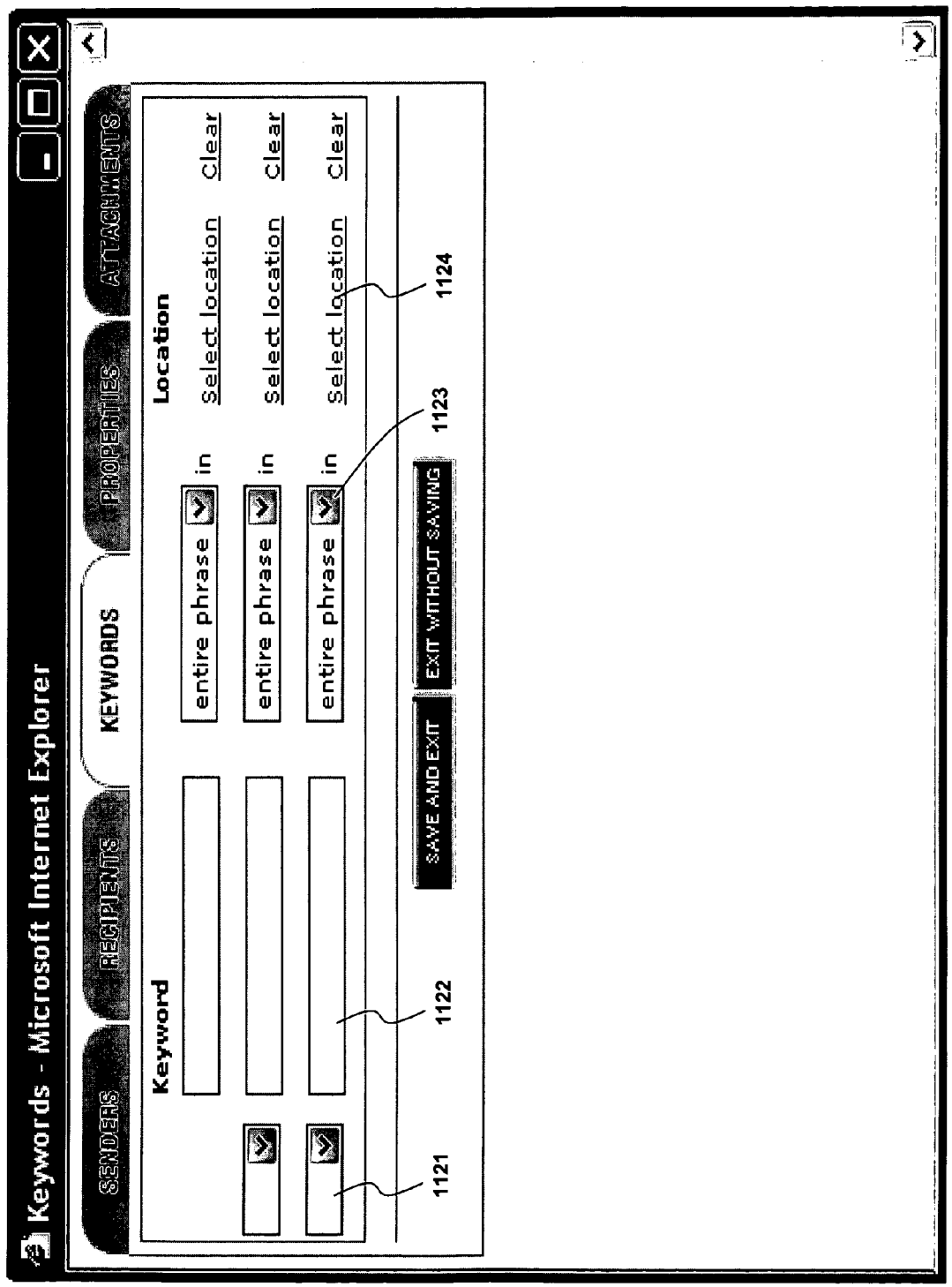

FIG. 11c illustrates an exemplary GUI for entering keyword criteria. A plurality of keywords may be entered in a plurality of data fields 1122 which may be joined together by AND, OR, and NOT operands selected via drop-down menus 1121. A second set of drop-down menus 1123 allow users to specify whether the criteria should include the entire keyword phrase or only portions of the phrase (e.g., any single word included in the phrase). In one embodiment, the user may also specify wildcard characters (such as $ or !) to identify portions of relevant words within the phrase. In addition, the user may specify specific locations in which the keywords appear via selection elements 1124. A variety of options are available including, for example, message subject or body.

Figure 11D:
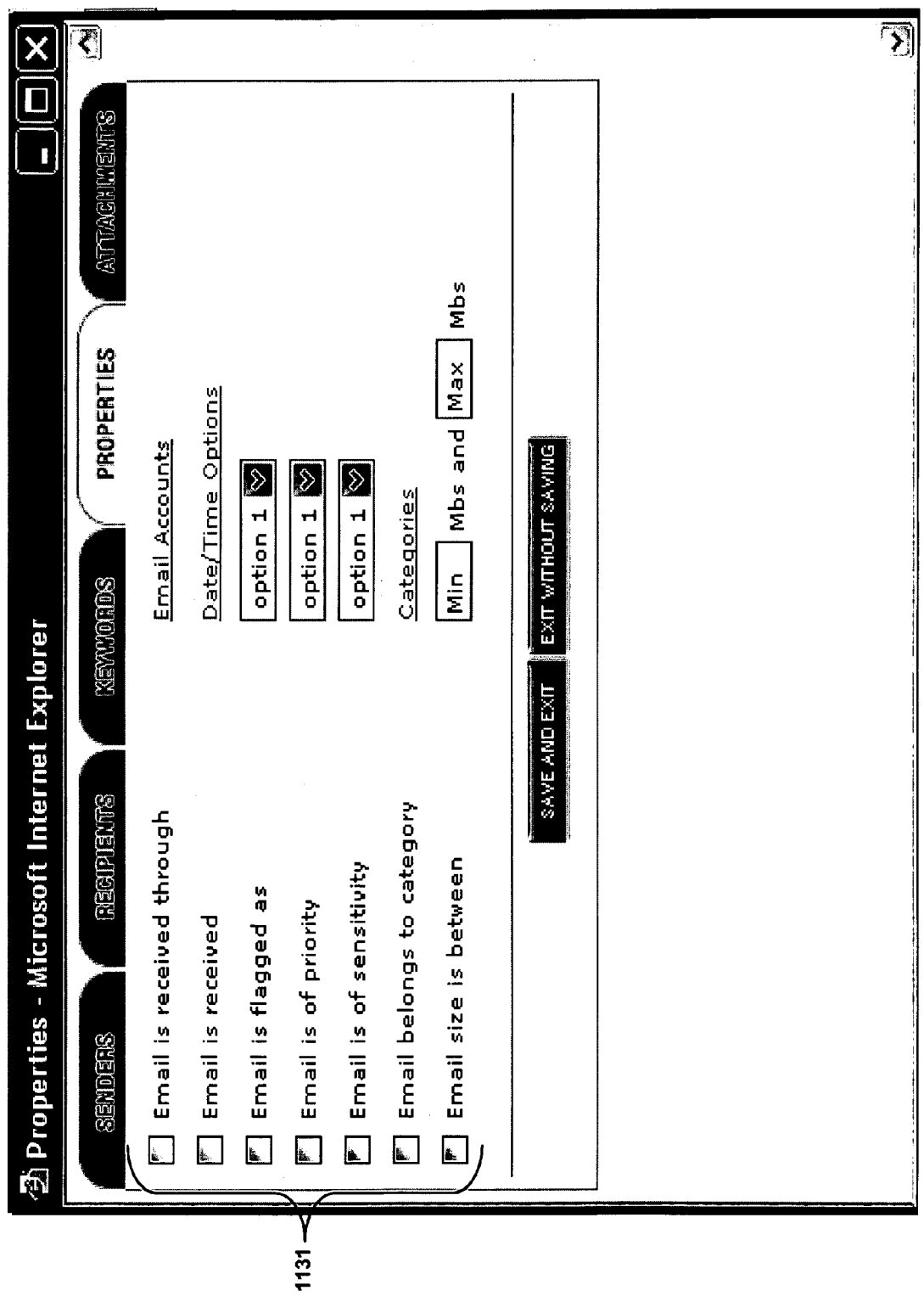

FIG. 11d illustrates an exemplary GUI for entering message property criteria. By selecting from a variety of check boxes 1131, the user may specify email accounts through which messages are received; date/time periods over which messages are received; email flags, priority levels and sensitivity levels; categories associated with the email messages (e.g., personal, business); and email message size limitations. A variety of additional message properties described throughout this detailed description may also be selected by the end user.

Figure 11E:
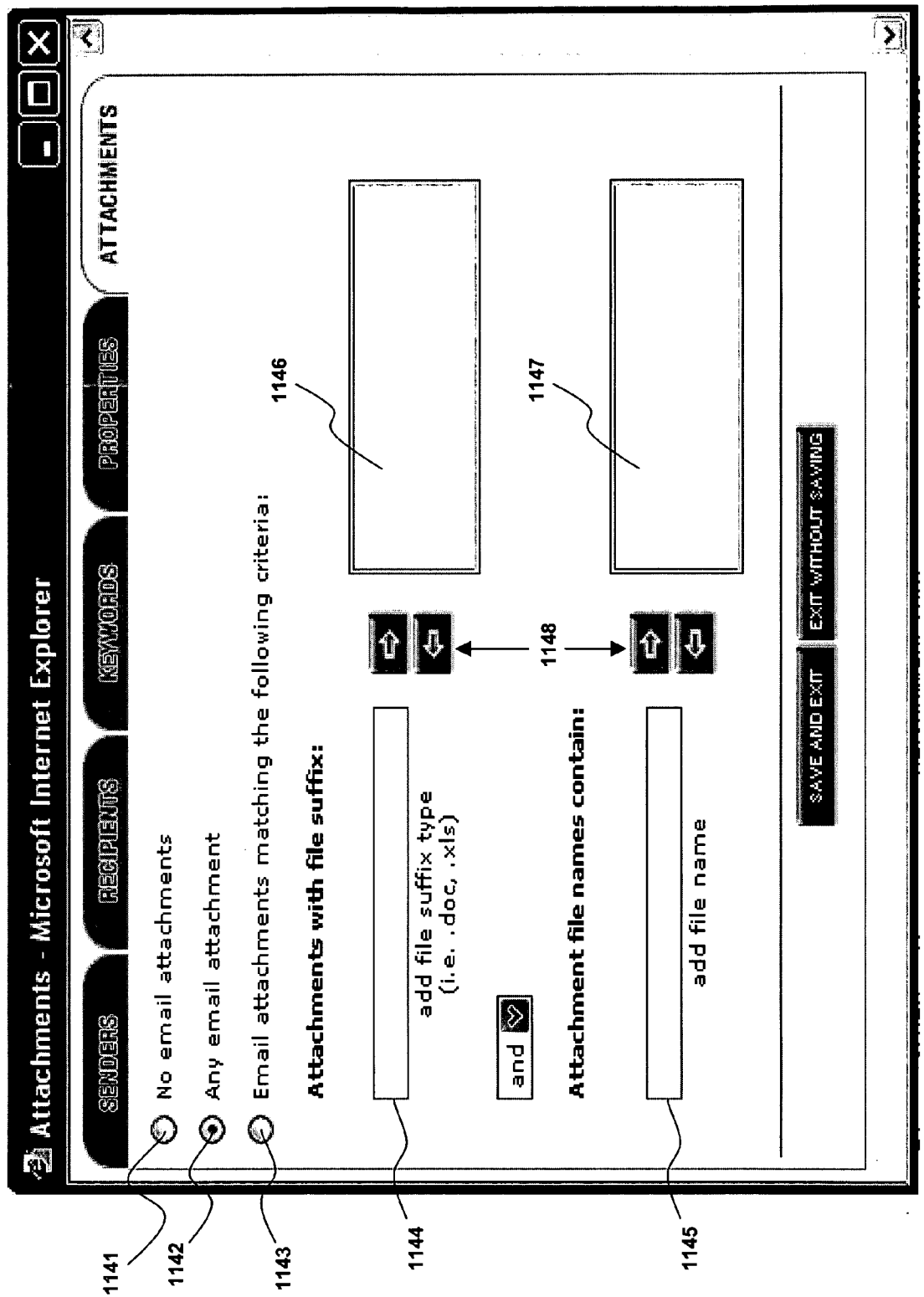

FIG. 11e illustrates an exemplary GUI for specifying attachment properties associated with electronic messages. The GUI includes user-selectable options for specifying no email attachments 1141 and any email attachments 1142. When the option for no email attachments 1141 is selected, no messages with email attachments associated with the overall user-specified criteria 1101 will be permitted. By contrast, when the option for any email attachments 1142 is selected, no attachment filtering is performed by the system.

In addition, in one embodiment, an option 1143 is provided for identifying specific attachment criteria. In particular, a first data entry field 1144 is provided for specifying particular attachment suffixes (e.g., .doc for Word documents) and a second data entry field 1145 is provided for specifying file names of attachments. Once again, different wildcard characters (e.g., $ or !) may be used. Once entered, the attachment suffixes and names are listed within regions 1146 and 1147, respectively of the GUI. The suffixes and names may be added and removed via selection buttons 1148.

The WorkSpace system also permits the specification of advanced rules in the context of data synchronization. One critical feature of the WorkSpace systems is the ability to synchronize information such as messages, contacts, and calendar items inside the WorkSpace system with similar information in other systems. WorkSpace enables specification of advanced criteria to refine the set of such information that should be synchronized. It also allows the definition of different synchronization instructions for information that have different characteristics.

Resolving Conflicts in Action and Filtering Rules

1. General Background

Action rules specify what to do with a particular communication, message or document. How should a call be routed? Where should a message be sent and how? Where should a document be stored? Filtering rules on the other hand make a determination about message or document characteristics. For example, is a call, message, or document from someone who is a friend? What is the nature of the call, message or document if the sender is also a work colleague? This is important because users may specify different rules for communications, messages and documents from different groups of senders.

Once users are allowed to specify action and filtering rules, conflicts between and among such rules are inevitable, especially as communication, message and document types and rule-triggering conditions multiply. The question then is how to resolve them. One answer is never allowing users to specify conflicting rules. While appealing, this solution requires the system to anticipate all conflicts and for the user to isolate and resolve easily the source(s) of all conflicts. Another answer is to require the user to specify the order of applying action rules (e.g., apply rule one before rule two) or the priority of filtering rules (e.g., if caller is friend and colleague, treat caller as friend for purposes of applying action rule). This is the approach taken by many filtering and action rule schemes. For example, rule one is applied before rule two. However, this still leads to conflict if rule two specifies an action (e.g., mark the message as important) at odds with rule one (e.g., mark the message as normal). Most systems today recognize the conflict and apply neither rule.

An approach employed in one embodiment allows the user to specify sub-rules related to priority. For example, a user may specify that a rule not be applied if a particular type of action was specified by a previous rule. In the previous example, the user may specify that if a previous rule marks the message as normal then a subsequent rule should not remark the message as important (i.e., the message would remain marked normal as called for by the first rule). This approach of basic rules supplemented by priority sub-rules employed in one embodiment of the WorkSpace system is an approach that is superior to doing nothing if there is a conflict among rules.

Figure 12:
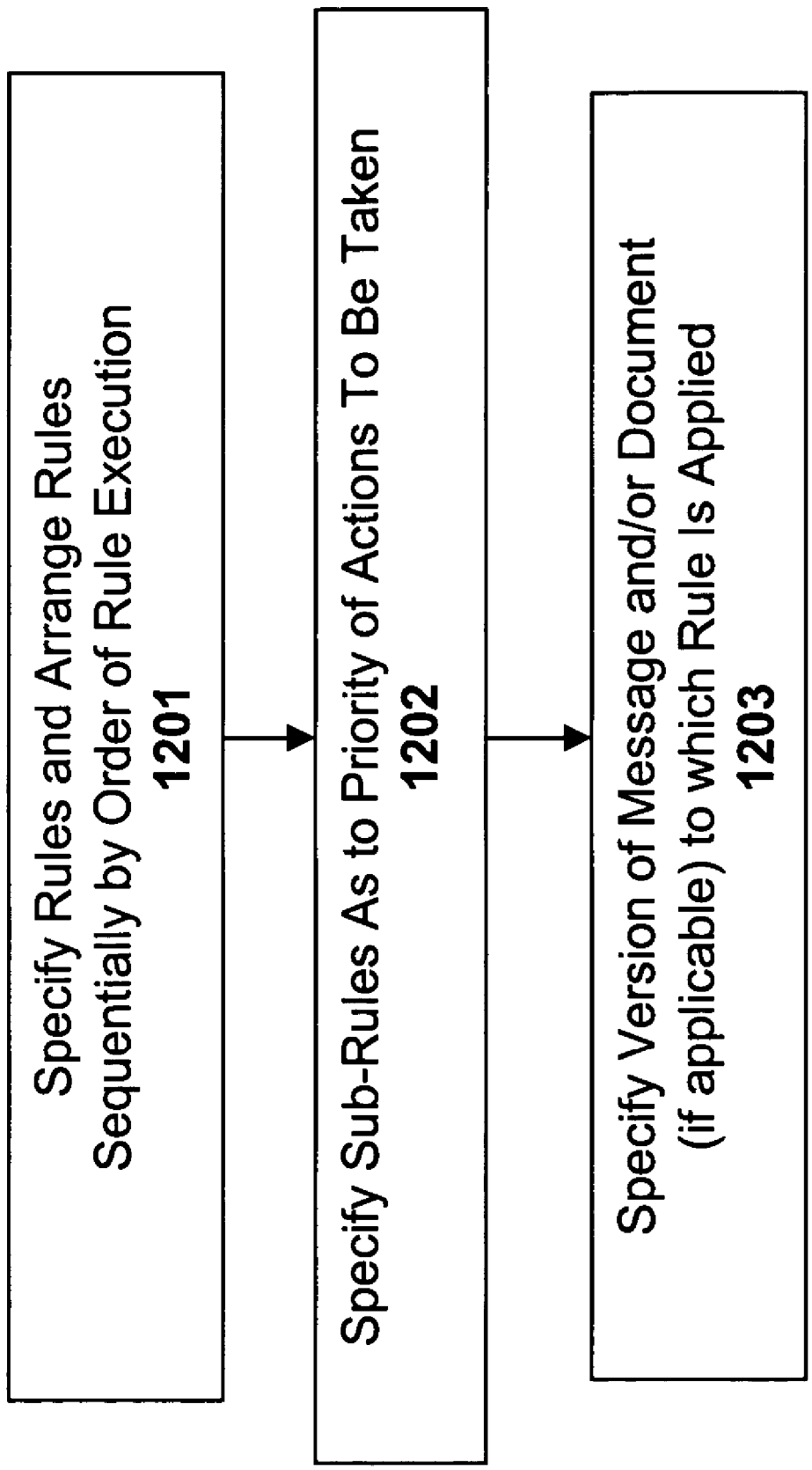
FIG. 12 illustrates one embodiment of a method for rule detection comprised of basic rules supplemented by priority sub-rules.
Figure 29:
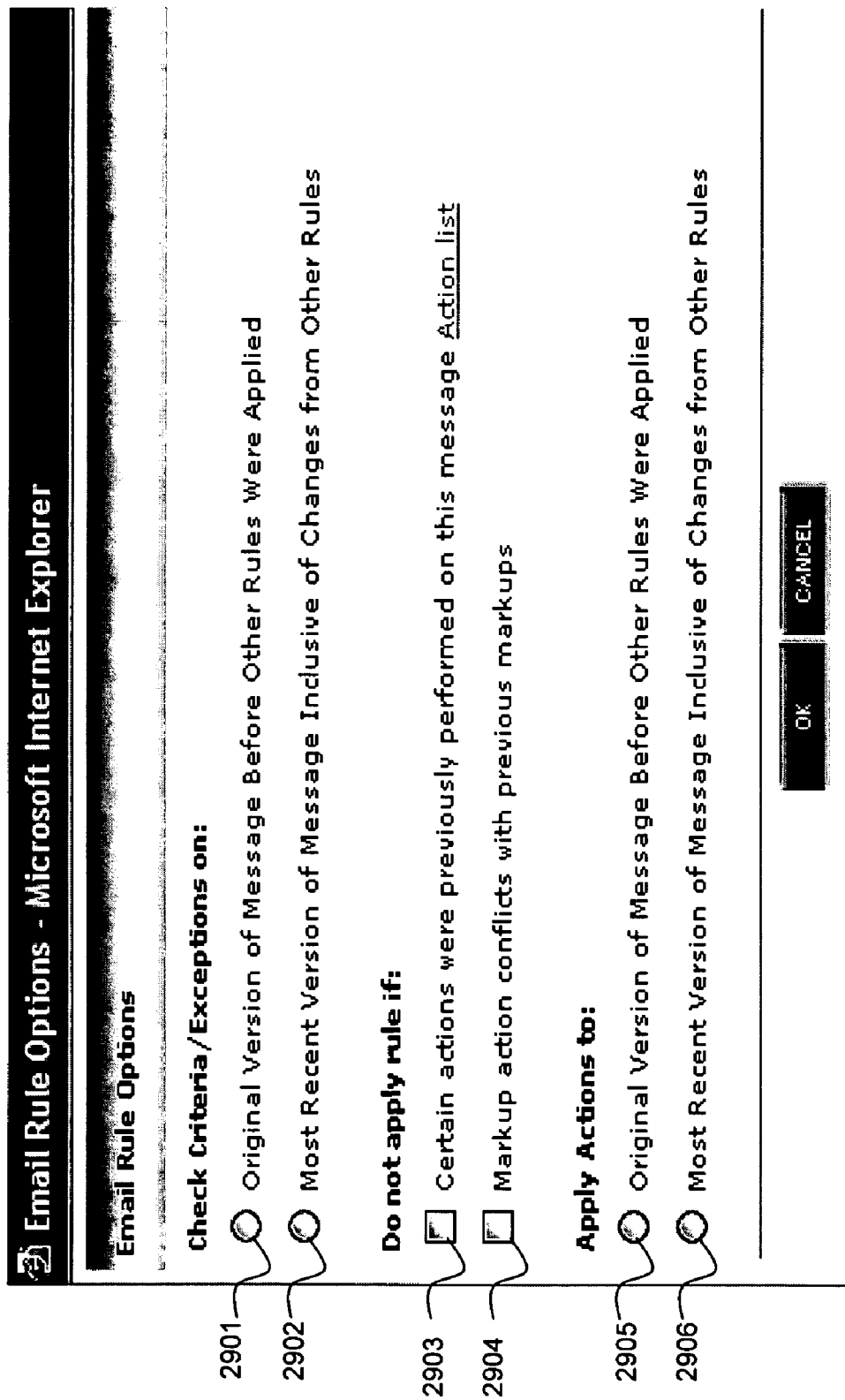
FIG. 29 illustrates an exemplary graphical user interface that allows the user to specify whether or not to apply a rule if a particular set of actions were taken by prior rules and to specify the version of the message to which to apply a particular rule.

An exemplary method directed to this approach is set forth in FIG. 12. At 1201, a plurality of rules are specified and arranged in a preferred order of rule execution. At 1202 sub-rules are specified which define a priority of actions associated with each of the rules. At 1203, a version of the message and/or document to which subsequent rules are to be applied is identified. For example, the user may specify whether the criteria of a rule is to be checked against the original version of the message (i.e., as it existed prior to the application of any other rules) or the most recent version of the message (i.e., inclusive of the changes resulting from other rules). FIG. 29 illustrates one embodiment of a GUI for specifying this functionality.

Another embodiment of the WorkSpace system employs the following solution that allows the user to specify rules and not be concerned about conflicts unless they are "large". The solution is a method of simultaneously resolving conflicts between and among rules rather than attempting to resolve them sequentially as in the first embodiment. The logic underlying the solution is as follows: "Small" conflicts should be resolved intelligently by the system while only "large" conflicts should require user intervention or a default resolution scheme. Consider a user who specifies that calls to their office phone from "friends" between 5 p.m. and 7 p.m. be routed to their home phone. They may also specify a second rule that specifies that phone calls from "work colleagues" between 6:30 p.m. and 8 p.m. be routed to their cell phone. Suppose that John who is both a friend and work colleague calls at 6:55 p.m. This is an example of a "small" conflict assuming a conflict resolution threshold of 30 minutes. Since John is both a "friend" and "work colleague," the two rules clearly conflict—the first requiring that the call be directed to their home phone and the second requiring that the call be directed to their cell phone. Given the 30-minute threshold, however, the conflict would be resolved automatically since the second rule is "more or less" dominant and the call would be sent to the cell phone. The second-rule is dominant because the 30 minutes (between 6:40 p.m. and 7:10 p.m.) centered on 6:55 p.m. is contained entirely within the second rule while only 20 minutes (between 6:40 p.m. and 7:00 p.m.) is contained by the first rule. With the same set of rules but with a threshold of 10 minutes, a call from John at exactly 6:40 p.m. would result in the two rules being equivalent. This is because a 10-minute window centered on 6:40 p.m. (between 6:35 p.m. and 6:45 p.m.) would be contained entirely within both rules. When no rule is "more or less" dominant, some default resolution method such as "send the call to voicemail" would have to apply. The above situation would be an example of a "large" conflict.

It is difficult to anticipate the possibility of the above conflict when the user is entering their call routing rules. In fact, it is not clear at all that the user should be prohibited from entering the second rule because there are many situations where the two rules (despite overlapping times) would not conflict. By contrast, if a user first specified that calls from "friends" between 5 p.m. and 7 p.m. be sent to their home phone and then specified in a second rule that calls from "friends" between 6:30 p.m. and 8:00 p.m. be routed to their cell phone, the system would consider the second rule to be a "large" conflict that required user intervention. The system would generate an error message that prevented the second rule from being specified.

Figure 13:
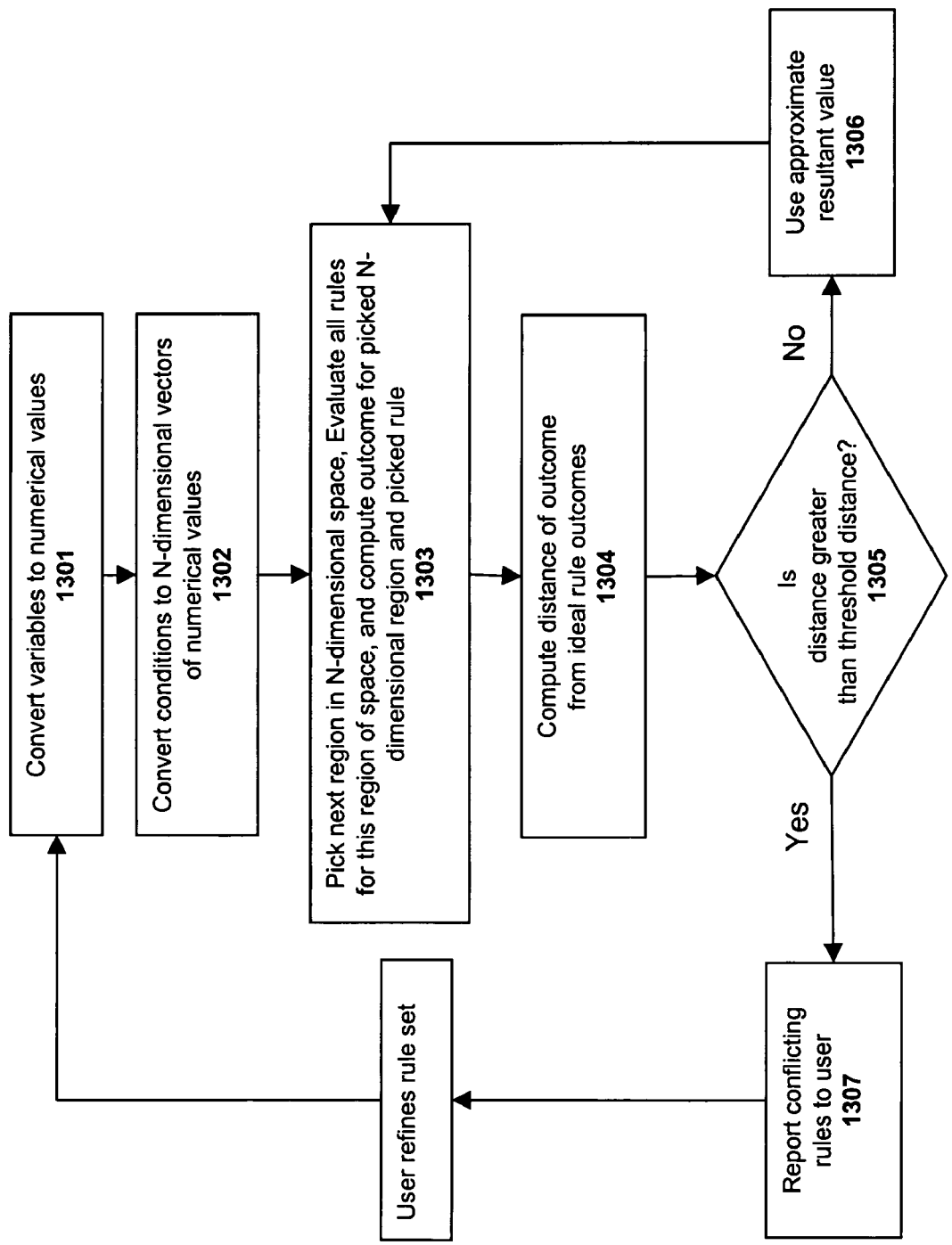
FIG. 13 illustrates a method to resolve conflicts in message and document filtering/routing according to one embodiment of the invention.

In one embodiment of the invention, to accomplish the type of conflict resolution described above, rules are first converted to mappings between multi-dimensional real number spaces. Each variable in each condition is then mapped to a part of the real number line and associated with a statistical distribution centered at a numerical value (real number). Similarly, outcomes in each rule are mapped to a statistical distribution. Conditions associated with each rule are mapped to a multi-dimensional region made up of the regions for each individual variable. In each specific sample of variable values, an approximate outcome of the rules is computed using a resolution method. This is illustrated in FIG. 13. The outcome is then compared with outcomes prescribed by the rules to determine the amount of conflict present in the rules in that specific situation. For small conflicts between applicable rules, the method determines a solution that approximates user-supplied instructions on the disposition of each message. For large conflicts as determined by a user- or system-specified parameter, the method informs the user of the specific rules that cause large conflicts. The method updates the degree of large conflicts while the user adds and removes rules. One embodiment of the WorkSpace system detects and resolves message and document action and filtering rule conflicts using the following method:

Referring to FIG. 13:

1301: Convert variables in the conditional part of each rule to a value in a statistical distribution centered at a point in the real line and convert each outcome also to a numerical value in the real line.

1302: Map all conditions applicable in a particular time and space locality as a region in N-dimensional space.

1303: For each time-space region, determine the outcome of applicable rules using a resolution method.

1304: Compute the distance of the outcome value from each of the possible values of outcome variables from rule-specified outcomes using a Euclidean metric.

1305: Compare the distance of outcome variables with a specified threshold to determine if conflict is small or large.

1306: If the conflict is small, use the outcome of the resolution as the value of the outcome and use the resultant value to manage messages and documents within the specific time and space.

1307: If the conflict is large, determine the rules that participated in the decision. Iteratively compute the distance of the outcome variables from rule outcomes as user changes the rules that caused the large conflict.

Users of the WorkSpace system are likely to specify rules to route, store and otherwise handle communications and messages, including those created by telephone, fax, voicemail, email, and text messaging systems. They may also provide rules to route, store and otherwise handle documents. These rules apply to a combination of time and space constraints. The rules instruct underlying transmission, retrieval, and storage systems to manage these communications, messages, and documents based on those rules that apply at any particular time and location.

Each rule describes a specific set of actions corresponding to a specific time and space location. Individually, each rule is assumed to provide non-contradictory information about the disposition of any applicable message or document. However, when creating a rule, it is difficult for users to determine if one rule may conflict with another. Consequently users may create rules that instruct the underlying system to perform conflicting actions. Indeed, the likelihood of such conflicts is so great that one may safely assume that they will arise with most users.

The method described herein overcomes this limitation of rule systems for disposition of communications, messages and documents. It applies to management rules where conditions for the application of each rule are based on a location in space and time. It applies to the management of a variety of communications, messages, and documents that arrive at a particular location (i.e., communications or data storage device, in a particular format, within a specific time period). The method determines a disposition of each communication, message, or document according to an approximate evaluation of all possible actions. In situations where such an action would vary significantly from the prescribed outcome, the method determines that rule conflicts are too large to provide a reasonable approximate outcome and instructs the user to avoid such conflicts in their rules for managing messages and documents.

A related consequence of the method here is in managing filtering rules. Filtering rules may apply to the outward characteristics of messages and documents, but may also apply to the content of the messages and documents. These rules decide on the disposition of a piece of information on the basis of conditions that involve variables in time and space, including an information space. Filtering rules may be interpreted as involving mappings between multi-dimensional spaces of real numbers. When users create filtering rules, they may create conflicts between these rules. The method described here resolves conflicts between these rules to produce approximate actions. The method also advises users on filtering rules that may create large conflicts. Under such advice, users may tune filtering rules to lower the level of conflict between rules.

2. Resolving Conflicts in Communications, Message, and Document Management Actions Communications, message, and data management systems offer users a variety of devices and methods for exchanging communications and messages and for managing documents. While most systems were designed with a view of creating and delivering communications, messages, and documents using similar devices and platforms, the proliferation of devices and methods of communications, message, and data management have created the need to deliver communications, messages, and documents generated on one device to a variety of target devices or locations. Therefore, communications, messages, and documents sent to a device may be routed to a different device and location based on preferences selected by the user. These preferences are often expressed in terms of rules.

Rules consist of conditions and consequences. Conditions usually involve statements that contain variables. When the variables in a condition fall within specific ranges of values, the rule is applicable (or said to "fire"). A rule also contains one or more consequences. Consequences consist of specific actions. When a rule fires, the actions listed among the consequences should be carried out by the system that utilizes the rules. Rules in a communications, message and document management system generally determine how communications, messages and documents should be handled under specific conditions involving time and space. Here space is generally described in terms of locations and devices and time is described as time periods.

A rule may be statements such as "If I get a phone call on my office phone between 5 p.m. and 10 p.m., and if the phone call is from a friend, then forward that call to my home phone." In this rule, the variables in the conditional part of the rule include: (a) a time period between 5 p.m. and 10 p.m.; (b) a device that may be considered as location, i.e., office phone; and (c) an originator that may be considered as another "location," namely a friend. The consequence in this rule involves: (d) a location, i.e., home phone; (e) an action on the home phone, i.e. ring the phone to get immediate attention; and (f) an implicit specification that the time period involved is the same as the time period in the condition.

In many situations, rules are defined by the provider of a service. For example, a telephone service provider may activate a "call waiting" tone to a user already using a phone—the determination of when to supply this tone is made by rules created by the provider. With some systems, however, users have the ability to create rules that personalize or customize the way messages are delivered.

The method described here generally applies to situations involving rules created by users. Unlike rules created by careful analysis, users tend to create a variety of rules in an ad-hoc manner. These rules are interpreted in a strict manner by most communications, message, and document management systems. Due to unintended interplay between rules, the behavior of a system may not conform to a user's expectations. There are situations where rule interpretation does not produce correct communications, message or document management solutions. The following examples consider some such situations.

1. Rules are often evaluated based on hard boundary values. For example, a rule that specifies calls to be routed to a home phone number starting at 5 p.m. would not apply at 4:59 p.m. As a result, a user may not get a call that came in at some boundary value as illustrated above even though that value was close to the time a rule would have applied.

2. Rules are generally interpreted in a linear order. For example an older rule that calls should be forwarded starting at 5 p.m. will need to be removed to activate a new rule that says calls should be forwarded after 6 p.m. Often users have difficulty understanding such interplays in rule execution order. The result is that the older rule (that the user may have forgotten) overrides the newer rule that was recently created by the user to address specific needs.

3. A rule may conflict with another rule when interpreted in a strict way. For example there may be a rule to send calls to the office from 8 a.m. to 5 p.m. and another to send them to the home phone after 4 p.m. Rule systems generally do not interpret what needs to be done from 4 p.m. to 5 p.m. Here again users have trouble understanding the interactions of various rules.

4. If rule boundaries do not cover a specific situation, a rule system may do nothing. For example, there may be a rule covering the time period from 8 a.m. to 5 p.m. to send calls to the office, another starting at 6 p.m. to send calls to the home phone. But there is no interpretation of what to do at 5:02 p.m. and at 5:58 p.m. even though there are reasonable solutions in both situations.

The problems of rule application have been addressed using various forms of approximate reasoning. These may include Neural Networks, Fuzzy Logic, Probabilistic Reasoning and some lesser-known methods such as Belief Networks. All of these methods try to overcome the limitation of strict reasoning. Each method used varies in terms of how it carries out approximate reasoning.

While the different approximate reasoning methods differ in terms of their methods, they generally try to find a conclusion by simultaneously evaluating multiple pieces of evidence. When multiple pieces of evidence are considered in user-created rules, conflicts may also be present. The method here deals with conflicts that arise from evaluating multiple conditions simultaneously when performing approximate reasoning.

One embodiment of the method also tries to consider multiple conditions using a method that can be adapted to different approximate reasoning methods. In one preferred application of the method here, a form of reasoning related to fuzzy logic is used as the approximate reasoning component. The method described here differs from other methods in one key respect—in managing messages and documents, the method described here is aware of whether the conflicts it deals with are too large. Hence the method is able to determine whether an approximate conclusion is reasonable and therefore alert the user that the conflicts may be too large to be overcome by a selected approximate reasoning method.

3. Resolving Conflicts in Communications, Message, and Document Filtering

Filters are communications, message, and document management screening devices that attempt to select communications, messages, and documents from a pool of all available communications, messages, and documents. Filters accomplish this task by evaluating properties of communications, messages, and documents. The properties considered by filters for managing communications, messages, and documents include time and space characteristics. Filters generally involve properties of communications, messages, and documents but may also be related to their content.

Filtering rules then are instructions on how filters should be applied. These rules contain a set of conditions and an implicit action (place communications, messages, and documents meeting the conditions in a single set). The conditions may involve a number of variables. When variables within the condition of a filtering rule are within certain ranges of values, the filter applies, or fires. As a result, variables in the action part of the rule are set to specific values (i.e., in the set or not in the set). These values eventually translate to some actual actions in terms of the disposition of a message or document as defined by action rules.

Filtering rules are often applied to messages and documents where content may be assessed. For example, a filtering rule (together with an action rule) may be "If an Excel file arrives from work colleagues as an email attachment, detach the file and place in the 'Work Excel' file folder. Otherwise, do not detach." Another filtering rule (together with an action rule) may be "If an email arrives with a subject line that mostly consists of sexually explicit words, and if the sender is not in my list of contacts, then send the email to my trash folder." Here the degree to which the subject line is made up of meaningful words is assessed as a real number value. Similarly whether the sender is in my list of contacts may also be assessed as a numerical value, i.e., a real number. The action may also be considered as a numerical value associated with the degree to which the user may pay attention to the incoming message or document. Thus filtering rules may be interpreted as mappings between multiple dimensional real number spaces.

Filtering rules are created by users or service provider organizations. Service providers usually filter only messages that are generally accepted to be promotional "junk" mail since it is hard for them to determine the value of each type of content. Individual users or organizations of users may create filtering rules to try to reduce the number of messages they need to consider. When users create filtering rules, it is hard for them to assess and anticipate the potential conflicts between filtering rules and their associated action rules. Such conflicts in user-created filtering rules arise especially when multiple conditions need to be considered. The following are some of the conflicts in filtering rules that may result in unintended consequences while applying rules:

1. A filtering rule may specify an ad-hoc numerical value. For example a rule may specify that if a message contains three occurrences of the word "price" that it should be considered as junk. However there may be other evidence along with this word (such as that this is in direct reply to a message sent by the user) that may indicate that this message should get immediate attention and not be treated as junk.

2. Filtering rules are also generally applied in the order in which they are given. This produces unintended results since earlier rules have precedence, a fact that may not be clear to users especially if the earlier rules are "legacy" rules. In this case, the conflict is that older rules should be given greater weight in an overall estimation of a filter's decision.

3. Rules may be directly in conflict. This frequently happens when merging rules created in different situations such as work-time filtering rules combined with personal-time filtering rules.

4. Filtering rules often do not cover all situations. This leads to further conflicts as users try to create rules without sufficient consideration of potential conflicts. This is often a problem for example in unsolicited email filtering (including rules created by service providers).

5. Since filtering rules are hard to write, users often combine rules created by others. This combination is done without understanding the situation when the rules were created and results in unintended consequences. This situation is often seen when Internet Service Providers combine lists of suspect sites, resulting in unintentionally blocking legitimate sites included within the general domain.

Figure 14:
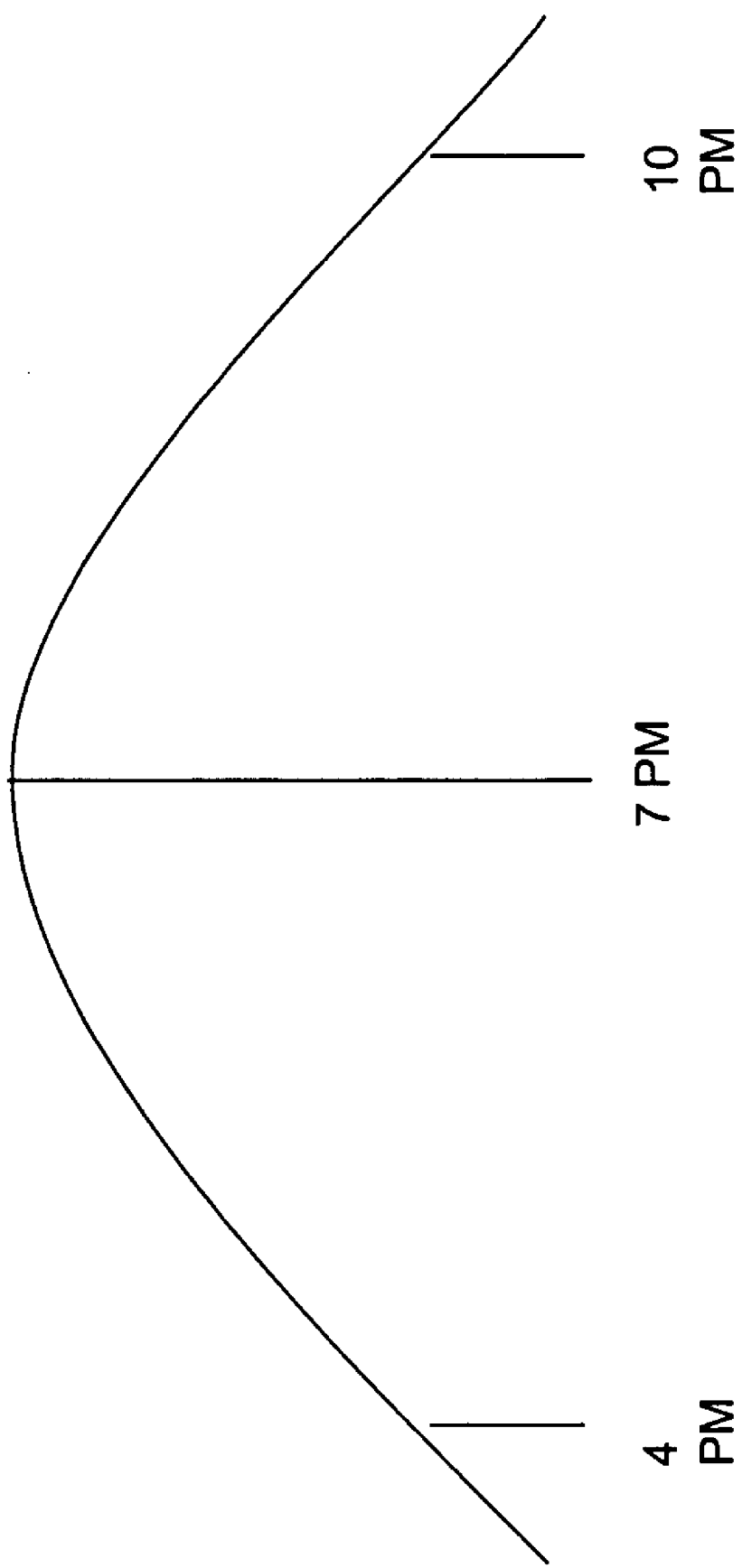
FIG. 14 illustrates an exemplary sample distribution comprising evening home calls.
Figure 16:
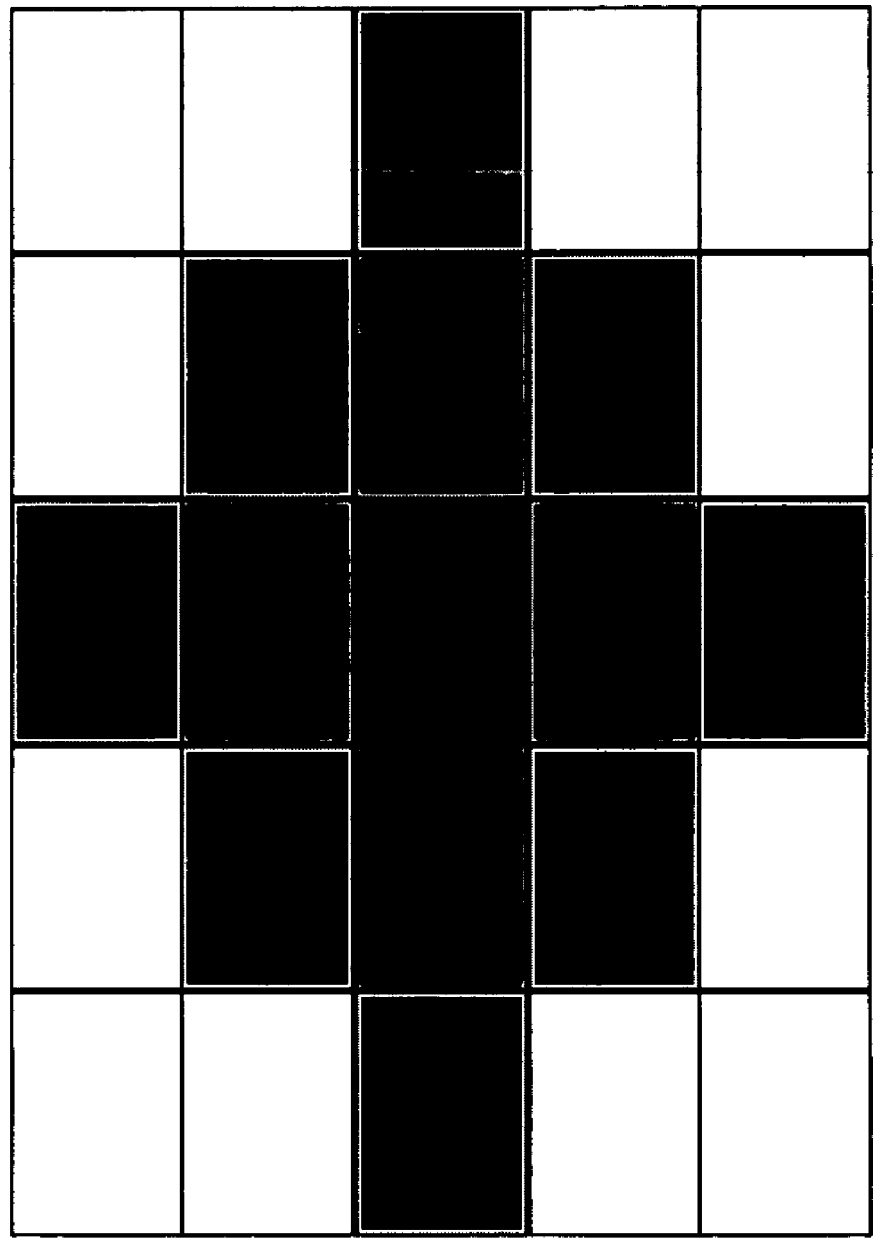
FIG. 16 illustrates an exemplary two-dimensional representation of a two-variable joint distribution.
Figure 17:
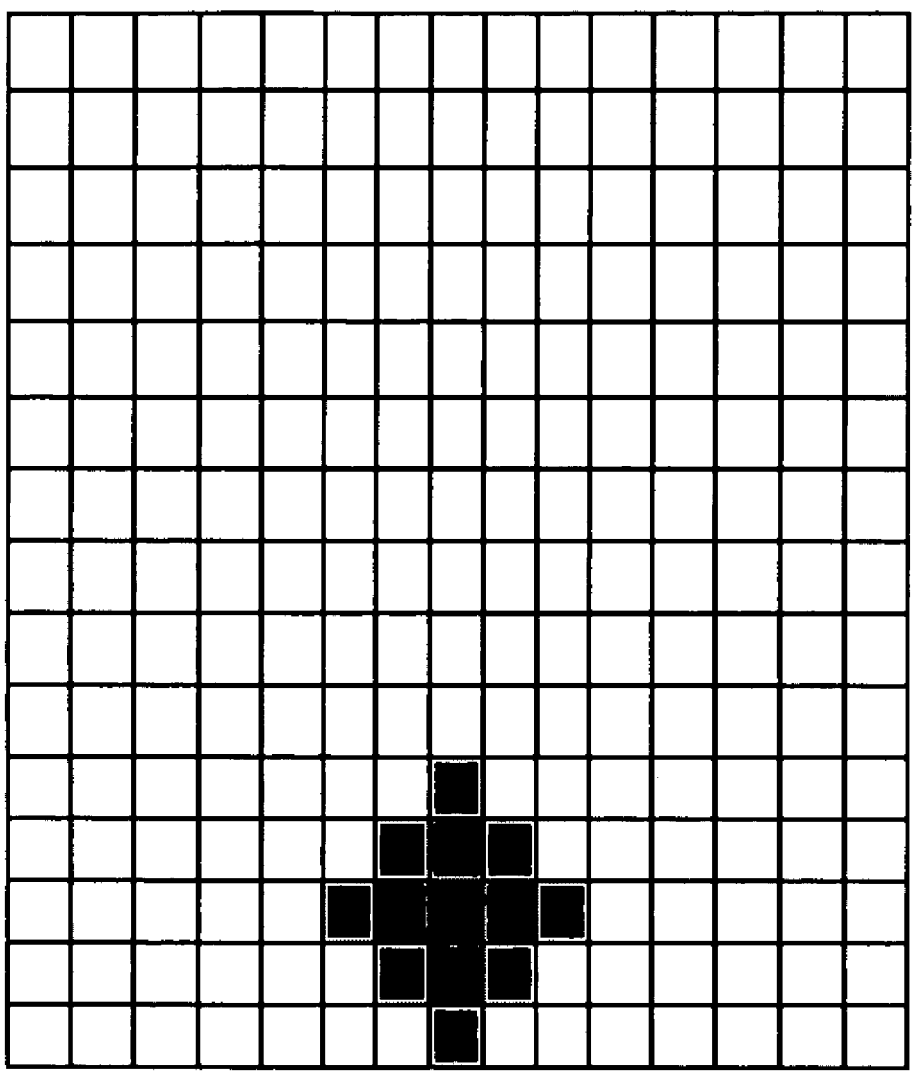
FIG. 17 illustrates an exemplary generalized two-dimensional representation of a two-variable joint distribution.
Figure 18:
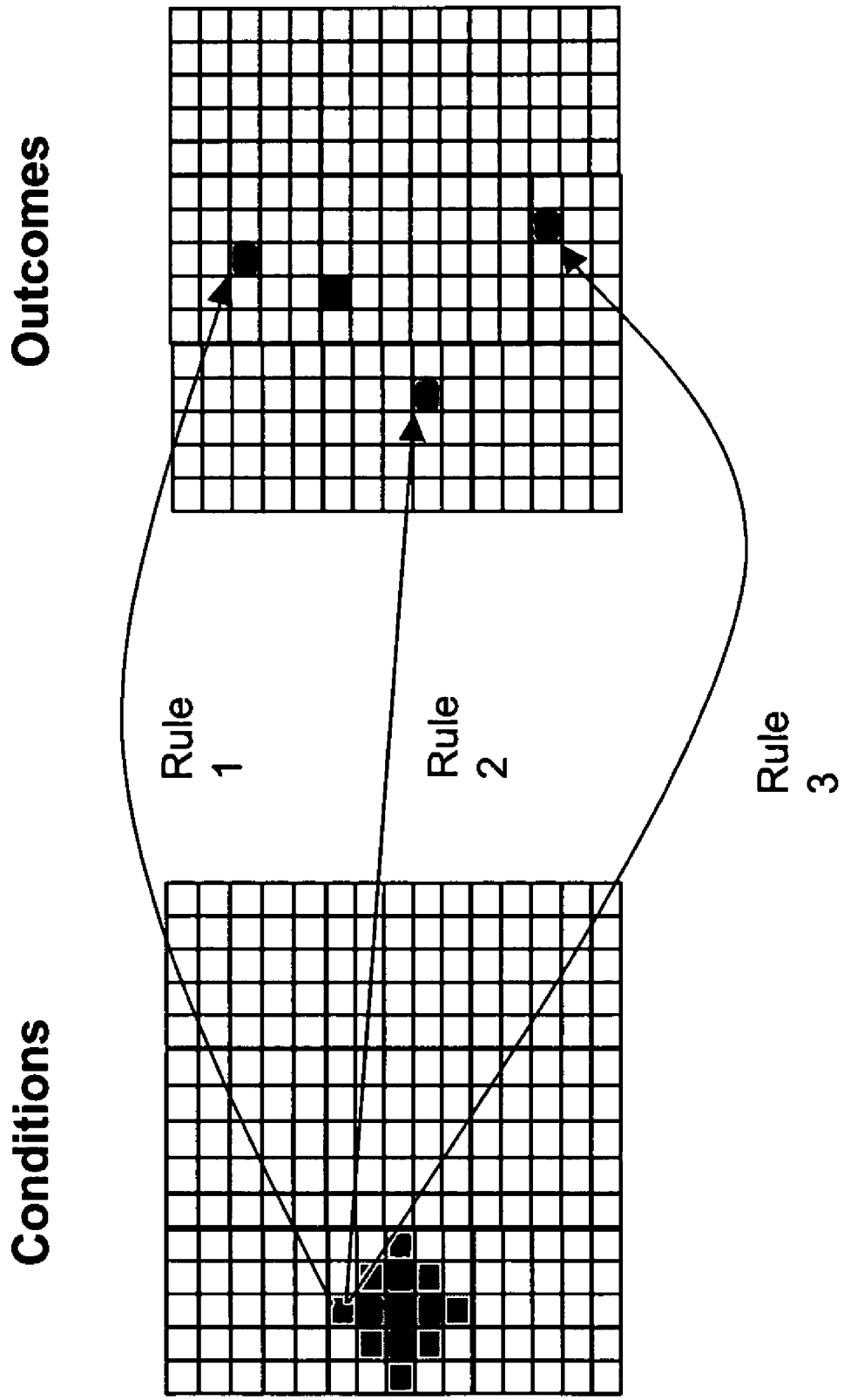
FIG. 18 illustrates an exemplary mapping of conditions against resultant outcomes.

Conflicts within filtering rules are resolved using the method described here. In the case of filtering rules, variables are evaluated in terms of positions within a vector space of multi-dimensional values. This mapping results in some clusters; data outside of these clusters generally are mapped to one of these clusters. Clusters are created both for variables within conditions of the rules and for variables involved in the consequences of rules (i.e., actions). A vector space is an N-dimensional space; a two-dimensional space is illustrated in FIG. 16. Each dimension of such a space consists of data values in that dimension. The data values generally are close to each other while some may be further from the majority of values. This is illustrated in FIG. 14. In two-dimensional space, a cluster is illustrated in FIG. 16 and FIG. 17 where a cluster is the set of points that looks like a shaded region. The darkest parts of the shaded region include the majority of points in the cluster; there are fewer points in the less densely shaded parts. Mappings between clusters are illustrated in FIG. 18 where each of the curves lines going from left to right indicates a mapping. A mapping associates points representing variables in the conditional ("if") part of the rule with variables in the consequence part of the same rule. When there are multiple rules, there will be a corresponding number of mappings.

Figure 19:
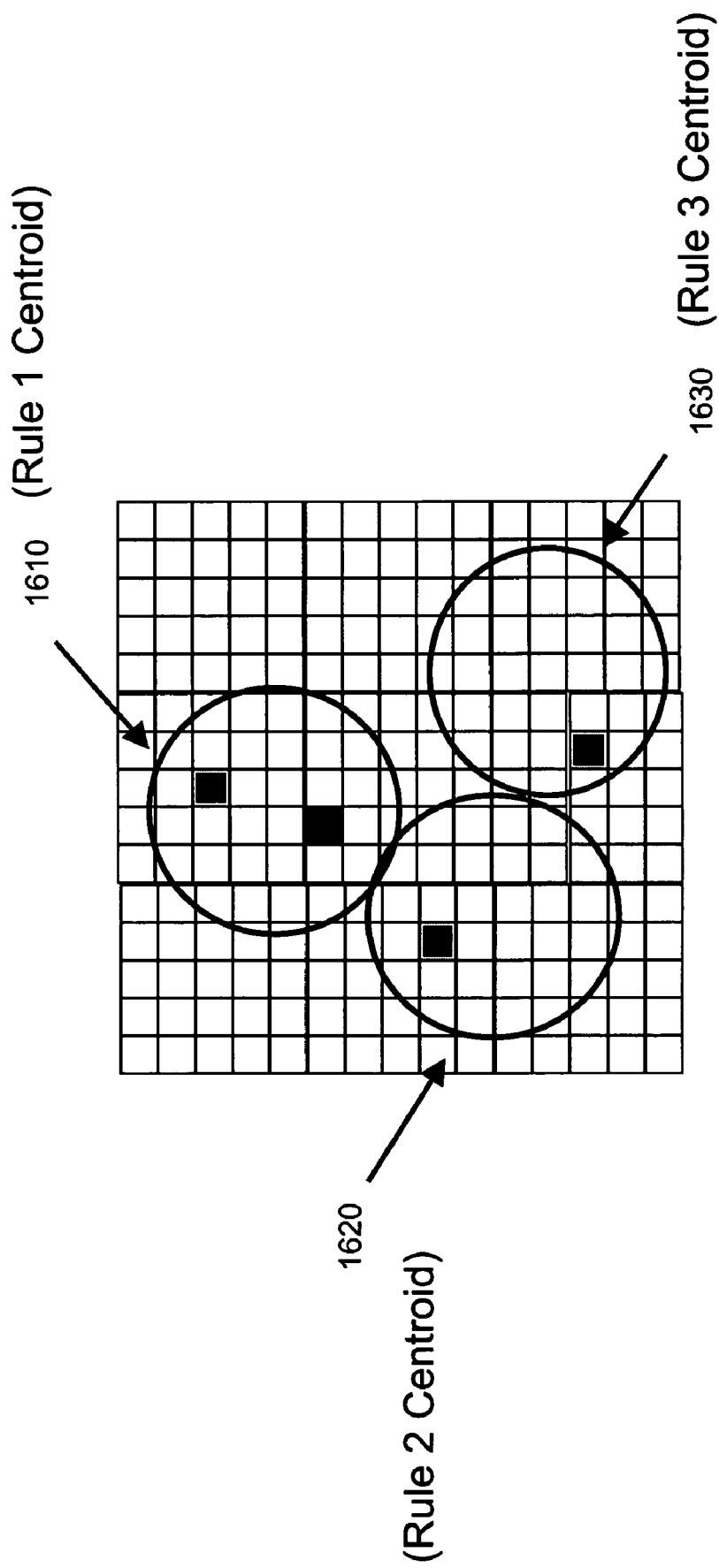
FIG. 19 illustrates an exemplary outcome space for rules as defined by acceptability thresholds.
Figure 25:
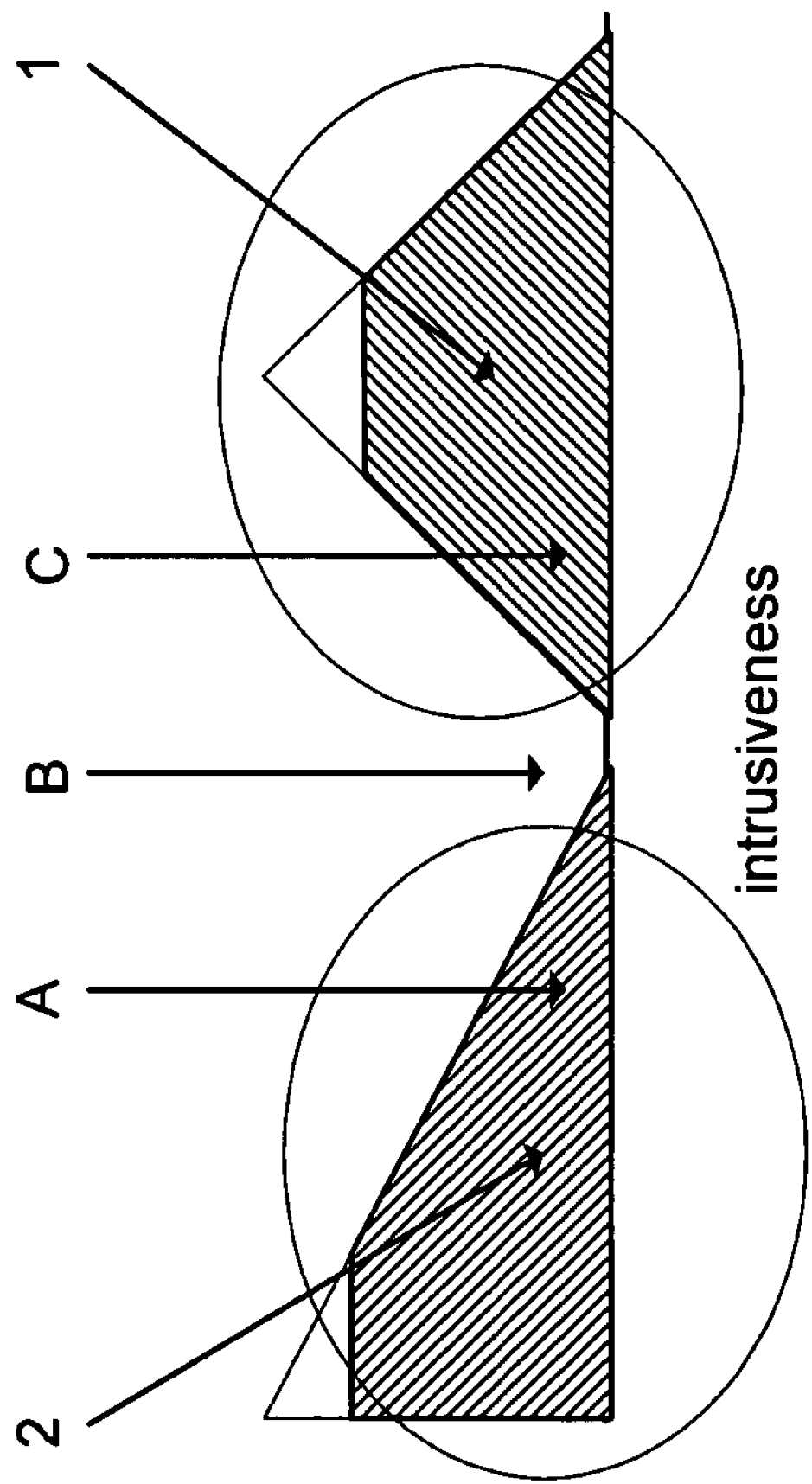
FIG. 25 illustrates an exemplary outcome space for rules as defined by acceptability thresholds.

When a specific message or document is evaluated by the filtering system, a set of rules applied to a set of clusters fire in response to conditions in the rule. This is evaluated using an approximate reasoning system that may be related to fuzzy logic or neural networks. The resulting conclusions are compared to clusters of outcomes. If the distance is too great, the rules involved in this outcome are shown to the user to determine whether some of them may be adjusted or removed. FIGS. 19 and 25 illustrate this distance with circles. Values falling within the circle are within the expected distance of a centroid, the center of gravity of the two-dimensional region. This process can be continued until outcomes are close to one of the outcome clusters.

The method described here is different from other approaches to filtering rules in the way conflicts are removed based on whether conflicts are large or small based on user- or system-specified criteria. The method includes an iterative refinement procedure that adjusts rules until conflicts are within user-specified bounds. A flow chart of this iterative procedure is shown in FIG. 13.

One embodiment of a high level method underlying the WorkSpace system filtering and disposition of communications, messages, and documents is detailed below. The numbered items in this method (numbered 1–7) correspond to the numbered steps shown in FIG. 13. The variables in Step 1 of the method are those that appear within rules. The rules here may be related to filtering and disposition of communications, messages, and documents. The variables are converted to numerical (real number) values that correspond to the degree of membership in a representative set. This can be done using a possibility value as in fuzzy logic that can be derived from a probability value associated with a statistical distribution.

As an example, we may consider a variable that represents the time that a solicitation phone call arrives at a home phone. Most of these phone calls may arrive around 7 p.m., but other calls may arrive as early as 4 p.m. and as late as 10 p.m. There may be a few calls before 4 p.m. and after 10 p.m. In this case, the probability of a phone call at home may be derived from a distribution of the frequency of such calls. It may be pictured as a normal distribution as shown in FIG. 14.

Figure 15:
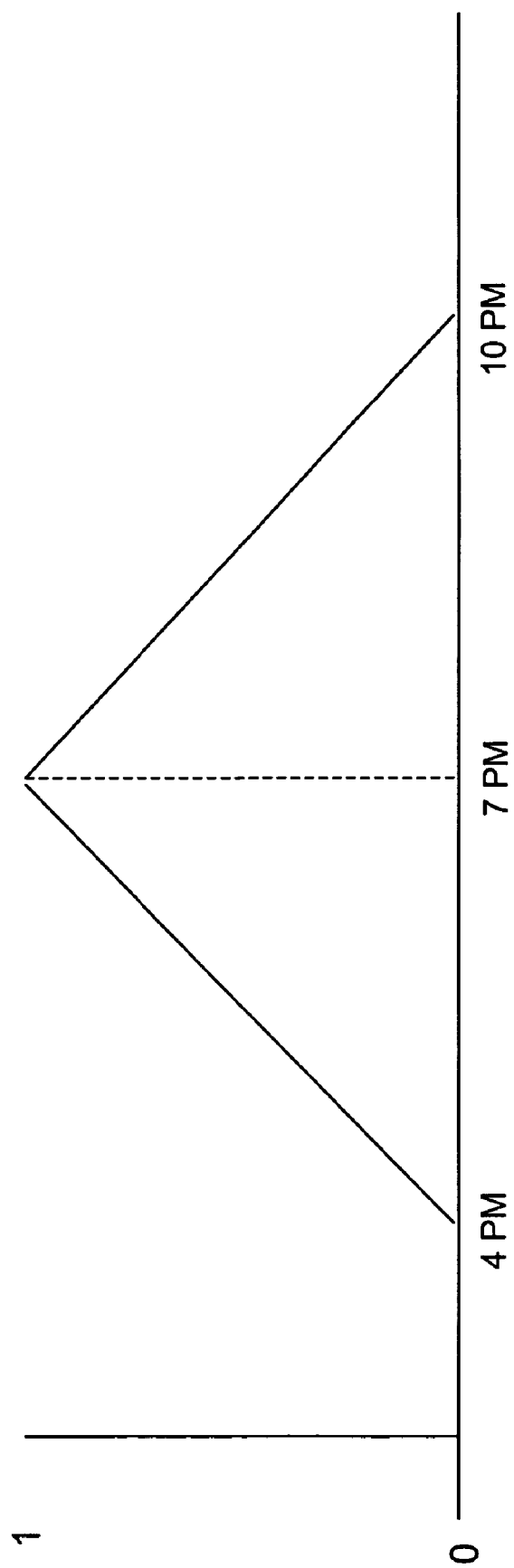
FIG. 15 illustrates a stylized triangular distribution of the evening home calls.

For computational convenience in this method we convert the distribution here into a triangular profile as illustrated in FIG. 15. The method can determine a degree of membership of a variable "solicitation phone call arrives at home" based on this distribution by picking the value of the triangular profile at each point. The values may be set so that the value at 7 p.m. is 1, and the values before 4 p.m. or after 10 p.m. are zero.

As a result, if a rule contains a condition that "if a solicitation phone call arrives at home and (other conditions) then (do the following actions)" then this can be converted into a numerical mapping where the value of the "solicitation phone call" is now converted into a numerical value. Other variables may also be converted, generally based on an estimation of a degree of membership in some set of values. The choices of these conversions are implementation-dependent and are generally guided by distributions of values as indicated here.

In Step 2 of FIG. 13, we consider several of these variables simultaneously. Each of these variables has distributions. Considering these distributions as degrees of membership we can consider the joint distribution of several variables. If we consider only two variables, such a distribution involving two variables may be pictured as a shaded grid as shown in FIG. 16, where the shading is darker in some places and lighter in some other places. The darkest shading represents the region where both variables have the highest possible values.

If a rule has two variables, then each rule says that the darkest region of the grid is mapped to a value for each variable in the action part of the rule. If the values of the variables do not fall within the darkest region, then the rule does not apply according to conventional rule-based procedures. But in approximate reasoning, the rule may still apply when values are outside of the darkest region of the values of the variables. The values may not be distributed near the center of space, but may be centered on another part of the two dimensional space as pictured in FIG. 17.

Before we consider Step 3 of the procedure in FIG. 13, we determine the list of regions of space. In the two dimensional case pictured above, this means we perform steps 3, 4 and 5 for each small square region within the large grid shown above. For Step 3, for each such region, we evaluate rules that may involve the pictured variables. Assuming that the outcomes consist of two variables also, this means that each rule maps regions in the condition space, as pictured above to a similar outcome space. In FIG. 18, the outcomes or consequences are shown on the right side and the conditions are shown on the left side.

In the pictorial representation shown in FIG. 18, a region in the condition space is shown as being mapped to three different regions in a consequence or outcomes space. There is greater or lesser value associated with the conclusion in each mapping, with the darker colors indicating greater certainty. Based on approximate reasoning such as fuzzy logic, we can arrive at an overall value in the outcome space as a resolved value. In the picture above, the black square without an associated arrow ("outcome square") represents the resolved value from all of the different mappings.

Each rule is a mapping; the resolved value is not exactly the value predicted by any of the rules individually. The resolved value is also not necessarily at equal distance from all the outcomes of rules. In FIG. 18, the outcome square is closest to Rule 1 in the outcome space, indicating the greater influence of the rule that fires with the greatest strength.

At Step 4 as shown in FIG. 13, we consider the distance between the outcome value represented by the outcome square and the values predicted by each of the rules. Since the outcome square is not exactly the value predicted by any of the rules, this outcome is in some conflict with each of the rules pictured here.

At Step 5 as shown in FIG. 13, we consider whether conflict between rules is too great. There is a threshold of distance of the outcome from the predicted outcome from the rule that may be set by the user (or the administrator of a system.) This may be considered as a Euclidean distance, i.e., the distance between two points in N-dimensional space. This can be evaluated by means of a simple formula for two-dimensional space: Euclidean Distance from $(x_1, y_1)$ to $(x_2, y_2)$=Square Root of $((x_1-x_2)^2+(y_1-y_2)^2)$. The formula for N dimensions is similar.

Here $(x_1, y_1)$ is a point in two-dimensional space and similarly $(x_2, y_2)$ is also a point in two-dimensional space. In practice, we will consider square regions in space, thus instead of considering specific points, we will consider small square regions centered on these points. The distances are indicated in FIGS. 19 and 25. In FIG. 25, the circle on the left for instance indicates the set of points that are within some distance of the center, marked as "2" in the figure. The point marked as "A" in FIG. 25 is within the threshold distance from the point "2". Any point in two-dimensional space that falls within the circle on the left is within the threshold distance from the point "2".

The regions in FIG. 18 may be considered as points in two-dimensional space. One of the squares within the grid shown may be a square of some size with center at a point such as $(x_2, y_2)$ considered in the formula above. The distance is computed as shown using the centers of the square regions and then compared to the distance from each of the rule outcomes and the outcome square. This distance can be considered as a circle centered at the center of the square representing the outcome for each rule. This is shown in FIG. 18.

There are three circles shown in FIG. 19, all of the same size based on the threshold distance specified by the user or administrator. In this case we can see that the circle representing distance from the outcome of Rule 1 (1610) reaches (in fact contains) the black square. The circle representing Rule 2 (1620) also reaches the outcome square (though barely) within the defined threshold level and the circle for Rule 3 (1630) does not reach the outcome square at all. We consider further actions based on this result at Step 6 as shown in FIG. 13.

At Step 6, we note that Rule 1 and Rule 2 are in conflict but the outcome is not in great conflict with the rules. But at Step 7, we will have to either remove Rule 3, or adjust the conditions in that so that the circle around the outcome of Rule 3 reaches the outcome square (within the defined threshold) computed with the newly formulated rule.

The process of refining rules continues iteratively until the rule set does not produce large conflicts on all regions we consider. This process may be guided by a user, but it also may be automated if we allow for the algorithm to adjust the values of conditions and consequences so that distances found at Step 5 are not too great.

The user may choose to increase or decrease the threshold associated with Step 5. If the threshold is increased in this example, then the circle surrounding the square representing Rule 3 outcome (1630) will increase in diameter—it may increase to touch the black square. If the threshold is decreased, then the circles shown will decrease in diameter and the circle surrounding the square representing Rule 2 (1620) may also not touch the black square. Then the conflict with Rule 2 will also be considered too great and Step 7 will also need to adjust or remove Rule 2.

One embodiment of the method will consider more than two variables in general, hence the squares shown here will be "cubes" in N-dimensional space and the circles will be "spheres" in N-dimensional space. The condition space shown on the left in the previous figure may be N-dimensional while the outcome space may be M-dimensional and N and M may not be the same.

The methods described here can be detailed in terms of an implementation using specific mappings of variables to numerical values and specific approximate reasoning method. One preferred approximate reasoning method is based on fuzzy logic. The application of the method to filtering differs from the application to routing only in terms of the mapping of variables to numerical values; the underlying conflict resolution method is the same in both applications.

4. Example of Rule Conflict Detection and Resolution

Consider the following situation involving message routing. Rules specified by users may involve conflicts. We consider an algorithm to resolve situations involving these conflicts.

Bill is a member of both "Friends" and "Work Colleagues" groups. Jane has specified two rules for call routing.

Rule 1 : If Friends call between 6 p.m. and 8 p.m. send the call to my home phone.

Rule 2 : If Work Colleagues call between 7 p.m. and 9 p.m. send the call to voicemail.

Bill calls at 7:30 p.m. How should the call be routed?

Below is an explanation of the proposed conflict detection and resolution for this example. The example will later clarify the following aspects of our conflict detection and resolution algorithm:

Conflict resolution applies to the time when Jane is specifying rules, the result of conflict resolution is utilized when handling a call as required in this example.

Calls are handled using fuzzy logic algorithms which are well known but have not previously been used in selecting the rules to apply to filtering and routing of messages and documents.

Following is a brief overview of fuzzy logic. The application of fuzzy logic to the specific call routing situation here may be new. In conventional logic, a statement is either considered as completely true or completely false. Fuzzy logic considers a statement in terms of whether something belongs to a set. Then also, using conventional logic we could take the view that an object is either in the set or not in the set. In fuzzy logic, a real-valued function is considered that assigns a value to the membership in a set in terms of the degree of membership of an object in a set.

One usual example is to consider a statement "the outside temperature is pleasant." Depending on the location, the temperatures that are "pleasant" may vary. But let us assume that if the temperature is 70 degrees, nearly everyone considers that to be pleasant. If the temperature is either less than or greater than 70 degrees, it may be considered pleasant by fewer people. As the temperature differs significantly from 70 degrees, fewer people will consider it pleasant. Thus for any temperature, we may assume a value indicating the level of certainty that this temperature is pleasant. Instead of performing deduction based on the absolute certainty that temperatures are either pleasant or non-pleasant, fuzzy logic uses these real number values of certainty in logical deductions involving rules.

In the context of the rules given in the example, we can assign a degree to which conditions of each rule are valid. Considering Rule 1, we could assign a real number to the degree to which conditions of this rule are true. Since there is only one condition, whether a call arrives between 6 p.m. and 8 p.m., we can consider a membership in this set using a simple triangular function. The specific function may be implementation dependent and may be related to data on call distribution, but for now we just pick a simple triangular function that indicates the degree to which a time belongs to the conditional part of Rule 1.

Figure 20:
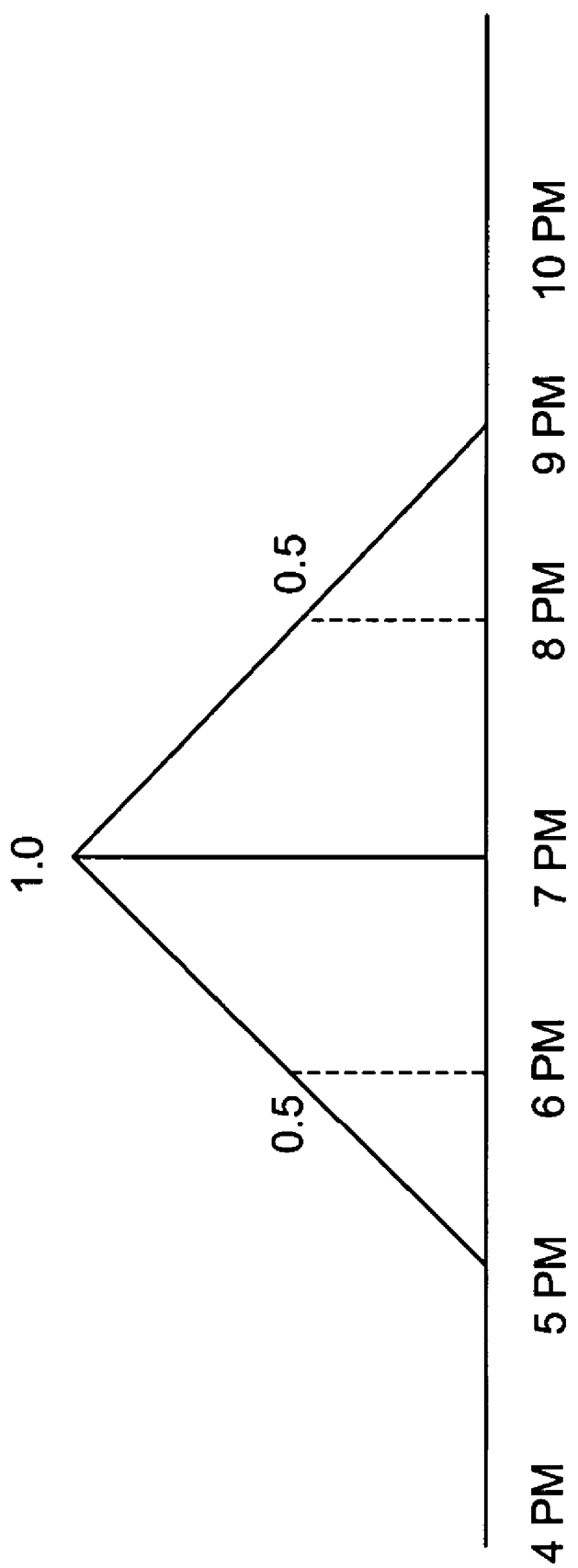
FIG. 20 illustrates an exemplary degree of membership in a rule condition.

Thus as shown in FIG. 20, if a call arrives at 6 p.m., we consider the Rule 1 condition to be true with value 0.5, at 7 p.m., the value is 1.0, at 8 p.m. the value is again 0.5. Earlier than 5 p.m. and later than 9 p.m., the conditions of the rule do not hold. The value then is considered to be zero. This is just one example of interpreting the condition in Rule 1, the shape of the triangular function shown here may be varied by bringing its lower corners closer to 6 p.m. and 8 p.m.

Now let us consider the consequence of Rule 1. This consequence should be either true or false in a specific situation. But before we get to determine whether it should be true or false, we will give it a membership value similar to the membership value for conditions. One way to assign a membership value to the consequence interpreting this the same way we considered the statement "the temperature is pleasant." We will consider the act of ringing the home phone based on whether people consider this intrusive. For the sake of this discussion let us assume that most people consider a ringing home phone to be quite intrusive, while few people consider it extremely intrusive and very few people consider it entirely welcome. Then we may consider "ring the home phone" as a triangular function based on an axis where intrusiveness ranges from very low to very high.

Figure 21:
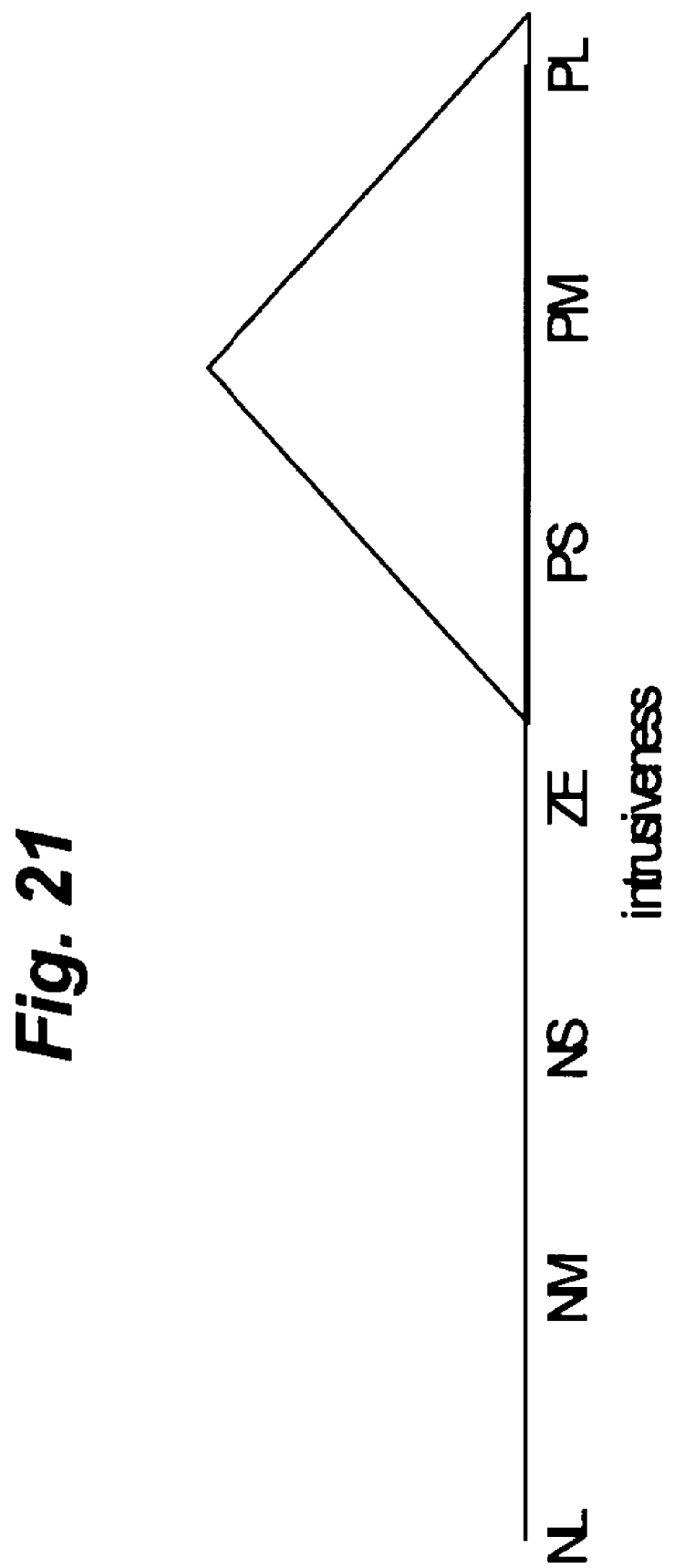
FIG. 21 illustrates an exemplary representation of perceived intrusiveness of calls to home phone.

In fuzzy logic, generally seven discrete values are recognized: very low, medium low, somewhat low, even, somewhat high, medium high and very high. This range is usually shifted so that we consider the low values to be negative, even to be zero and the rest to be positive. We generally label the values NL, NM, NS, ZE, PS, PM, and PL. Based on this scale, we may construct a triangular function as in FIG. 21 that indicates the perception of intrusion of ringing the home phone. This function may be different from the one shown in FIG. 21 based on our knowledge of people's likes and dislikes. In FIG. 21, we are assuming that a ringing home phone is considered intrusive by a medium high proportion of people, while almost no one considers it to be welcome. We can shift this function in various ways depending on adjustments to this assumption.

The standard fuzzy logic deduction step involves two stages. The first stage is a minimization (the second stage is not quite a maximization problem). The first stage involves examining the degree of membership of the variables in the conditional part of a rule, and minimizing over these to take the smallest degree of membership. As part of the first step, we also determine the degree of membership in the consequent variables of each rule. The second step involves combining the degrees of membership of each consequent variable and creating a discrete value by combining contributions from multiple rules. The discrete value can be computed using various methods. The most common method involves finding the x-coordinate of the centroid of the regions of support from all the rules.

Figure 22:
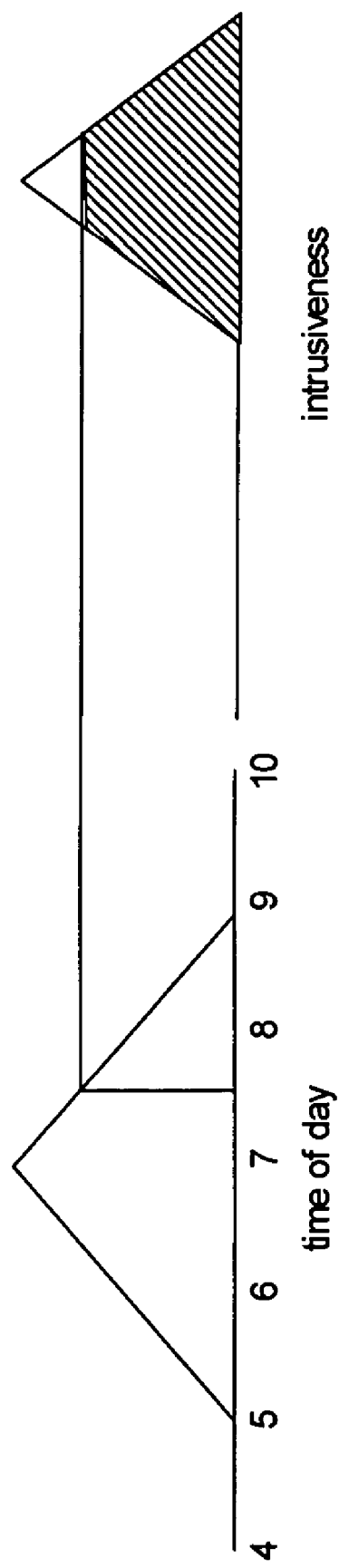
FIG. 22 illustrates an exemplary joint mapping of condition (time of day) and outcome (intrusiveness) associated with calls to home phone.
Figure 23:
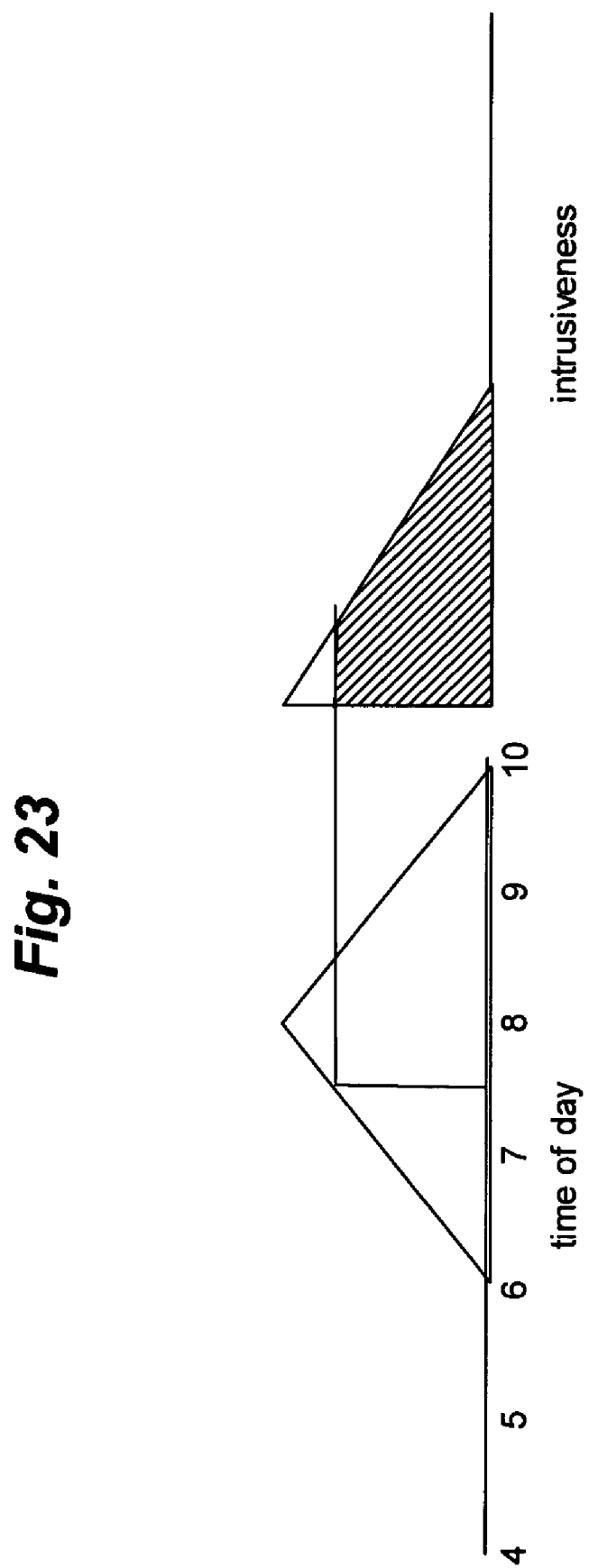
FIG. 23 illustrates an exemplary joint mapping of condition (time of day) and outcome (intrusiveness) associated with voicemail messages.

In the example here, both rules have only one condition each, therefore there is no need to minimize over the degrees of membership of each variable in the conditions. For Rule 1, we combine FIGS. 20 and 21 above to get the degree of membership in the consequence, assuming that the call is coming in at 7:30 p.m. FIG. 22 shows the condition and the consequence together, the x-axes of the two variables have nothing in common, but the y-axes are aligned (we generally normalize the values of the triangular functions so that their maximum values are always 1.0 and minimum values are 0.0.) The shaded region shows the support for the action of Rule 1. The standard procedure here is as follows:

1. Compute the value of the condition variable at the specific location. So here the variable's value is 7:30, so we draw a line from x-axis value 7:30 to the corresponding functional value.

2. Find the minimums of all y-values for all the conditional variables. In this case there is only one variable so the conditional value is just the one value we have for the single variable.

3. Find the corresponding value in the function for the variable in the rule's consequence. (The drawing makes it look higher than it should be here, but the idea is that we cut off the triangular function at the right height.)

4. Consider the shaded region as the support for Rule 1. We have to combine the supports for all rules that apply at a later step.

If this were the only rule, then the centroid of the support region will have x-axis value=PM, therefore we can conclude that Rule 1 sanctions a PM activity, that is to ring the home phone. But we have to consider the effect of Rule 2 also.

Now let us consider Rule 2 in the same way. For simplicity, let us assume that the condition in the rule is treated the same way as in Rule 1 except for a change in the triangular function. The consequence, in this case voicemail, may be placed on the same x-axis as the consequence in Rule 1, by considering the intrusiveness of voicemail (let us assume this voicemail is without notification, so that it is not very intrusive.) The triangular function here may be something that starts high at NL and comes down in value by the time it reaches ZE (this is based on the thinking that most people consider voicemail to be not intrusive at all but nobody considers it even slightly intrusive.)

Figure 24:
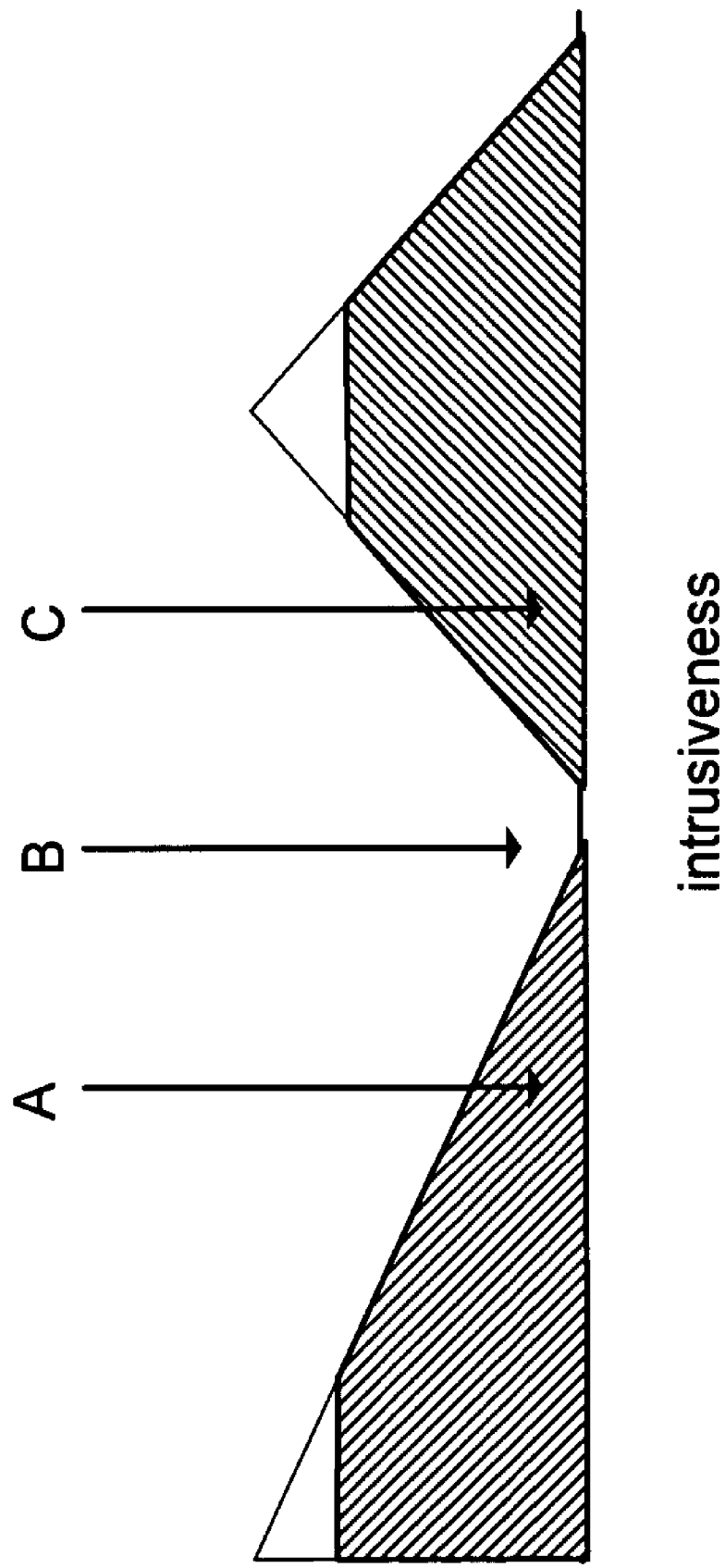
FIG. 24 illustrates an exemplary representation of joint outcomes of two possible actions (call to home and voicemail).

Based on all the assumptions above, the operation of Rule 2 in this situation can be illustrated by a picture as shown in FIG. 18. Here the condition of the rule is shifted so that we think of the rule applying between 6 p.m. and 10 p.m. (condition of Rule 1 applied between 5 p.m. and 9 p.m.) The shaded region shows the support for the conclusion. The next step combines the two rule consequences to determine the appropriate action. FIG. 24 illustrates this combination.

In FIG. 24, each of the lines (A, B, C) indicate points (at the other end of the line as indicated by the arrow head) that are possible values for the centroid of the two regions. The different values may be obtained based on the exact shape of the two triangles, for instance the two triangles may overlap somewhat. Depending on the centroid value obtained, we compute the discrete value of the x-axis of the centroid point. Based on that value we decide on the appropriate action.

1. If the centroid is A, then the x-axis value is reasonably close to the conclusion that voicemail is appropriate. So we send the message to voice mail.

2. If the centroid is C, then similarly the action of sending the call to the home phone is appropriate.

3. If the centroid is B, we really cannot decide what action to use.

All that has been said above is fairly standard fuzzy logic; this is well known except for the fact that we are considering it for rules involving action rules and filtering rules as applied to communications, messages, and documents.

The situation B above is one where the rules cannot reach a conclusion, i.e., the applicable rules are in conflict. We can of course create some fall back rule, such as "if in doubt, send everything to storage." But that is simply an administrator overriding the wishes of the user. There is a way we can avoid such conflicting situations. The method to avoid conflicts should be utilized when rules are created.

The conflict resolution method has a parameter that may be set by the user or the administrator. This parameter is the maximum allowable distance of an obtained solution from the centroids of each of the participating consequent regions. In the example here, there are two participating regions, those corresponding to the consequences of Rules 1 and 2. The distance is simply the distance of the centroid of the combined regions from the centroids of the individual participating regions. FIG. 25 illustrates this situation.

Here the points 1 and 2 indicate the centroids of the consequent regions associated with Rule 1 and Rule 2 respectively. The two circles centered at these points indicate the maximum allowable distance for a solution to be from the points 1 or 2. In this case solution B is not acceptable to either Rule 1 or Rule 2. The other solutions are acceptable according to the designated distance.

Even if situation A or C is obtained, the conflict resolution algorithm will consider whether the centroid that is obtained is too far from the centroid of the region within any of the triangles. If the distance indicated by the circle radius is smaller, either A or C could also indicate a conflict. Distance in this case will be a simple two-dimensional distance. In more complex cases, the N-dimensional regions replace the triangles illustrated here. In this case, the distance may be the N-dimensional Euclidean distance between points.

One embodiment of the conflict resolution method works during the time that rules are created. Consider the interaction where Jane creates rules. Initially there are no rules. Jane creates Rule 1. There is no possible conflict with anything else since this is the first rule.

Now Jane creates Rule 2. At this point, our algorithm computes the consequence for the system of rules using a set of sample values. We may consider several sample x-axis values for each of the variables and compute the result of applying the rules at each of these values.

Since the algorithm computes the result of applying rules, it will find a situation where the centroid found is too far from the centroid of individual regions according to the maximum allowable distance. FIG. 25 illustrates this distance by circles from the two centers "1" and "2", the points within the each of the circles are within the distance of the corresponding centroids. An administrator may set the maximum allowable distance but it can also be a parameter that is adjustable by the user. Thus the method knows that there are conflicting situations. There are a number of possible solutions to this conflict. The user may change the rules in many ways as shown below. If the user adjusts rules using 1, 2, 3 or 4 below, then the conflict detection will be run again. This process continues until all conflicts are resolved.

The following actions summarize possible responses to conflict. The user or administrator may choose only some of these solutions. The algorithm itself is used only to detect conflicts—any mix of the following methods may be used to resolve conflicts.

1. Jane can simply remove one of Rule 1 or Rule 2.

2. Jane can adjust Rule 1 or Rule 2 to be a different range. The conflict detection algorithm then re-computes the samples to check for conflicts. If, for example, Jane moves the time range of Rule 2 to the left, then the support from Rule 2 at, say 7:30 p.m., will be so low that the centroid will get pulled into the region close to the centroid for Rule 1.

3. Jane can be shown different times of conflict and can choose to deactivate Rule 1 or Rule 2 during these times of conflict. In general this means that Jane selects sets of rules to apply at different times based on our report of conflict periods.

4. Jane can adjust the maximum allowable between the centroid and the consequence (assuming that the system allows users to do this). This may make the result close enough.

5. Jane can leave the conflict in place. The system can choose to interpret conflicting situations arbitrarily (for example, we can pick the first rule that applied and use that as the only rule, or it can pick the nearest shaded region to the actual centroid).

In this example, assuming that the user prefers lesser intrusion, and assuming the shapes of distributions given in FIGS. 21 through 25, the call will be sent to voicemail because Rule 2 will have more impact than Rule 1. There are several complications not considered in this example which, in one embodiment, are accommodated within the context of filtering and action rules as applied to communications, messages, and documents:

1. Rules with multiple variables among conditions have not been considered. This changes the fuzzy logic algorithm by minimizing over multiple variables before computing the support in the consequence.

2. The rules and their functional forms may be influenced by data on what sort of calls are likely to occur at what time.

3. Intrusiveness is only one dimension of a possible set of variables we may consider, so that the conflict resolution may be taking place by considering regions in N-dimensional space (as illustrated in the earlier write up about this method).

4. The rules are subject to cultural interpretation, for example the level of intrusiveness of different access methods may vary based on demographic characteristics.

5. Application of Routing and Filtering Rules to All Communications. Message, and Document Management Functions and to All Types of Communications, Messages, and Documents.

One embodiment of the WorkSpace system allows the application of the rule conflict resolution algorithm described above to all communications, message, and document management functions and to all types of communications, messages and documents. In addition, the user may specify their rules online and in a more limited context choose their rule-set over a telephone device. The WorkSpace system, therefore, allows users to specify rules to access, send, forward, delete, save, and otherwise manage communications, messages, and documents. It also permits users to specify rules for notification of messages and documents and the routing of all communications. The WorkSpace system also allows users to specify different rules for all communications and message types that can be into an integrated platform such as the WorkSpace system. Such message types include voicemail, email, text messages and faxes but the functionality of specifying rules is easily extended into all message types that can be integrated into a unified messaging platform. The same is true of the different types of communications as well as documents and databases that can be managed by the WorkSpace system.

Advanced Features of the WorkSpace System

A variety of advanced information management features may be implemented using the foregoing integrated WorkSpace architecture:

1. Multimedia Distribution Lists

Prior art distribution lists are media-specific. For example, email distribution lists are typically comprised of email addresses only whereas fax distribution lists are comprised of fax numbers only. However, these prior systems were not capable of supporting distribution lists comprised of both fax numbers and email addresses to be used for the distribution of a fax.

By contrast, the Workspace architecture described herein allows for the creation of non-media specific distribution lists. For example, using the integrated messaging platform described above, WorkSpace system users may define a fax distribution list to include fax numbers, email addresses, and system generic inboxes. Voicemail messages may also be distributed across multiple types of media using a single distribution list. For example, the user may speak a message and distribute the message to system users and individuals outside the system. System users may receive the voice message either directly or as an email attachment while those outside the system would receive the voice file as an email attachment. Various other multi-media distribution lists may be created for the distribution of various message types while still complying with the underlying principles of the invention.

The use of distribution lists in messaging systems within a common medium is commonplace. For example, there are voicemail distribution lists and email distribution lists enabled by voicemail platforms and email servers respectively. Such distributions lists may be defined by users or pre-defined for users. Such distribution lists, however, do not take into account the messaging preferences of message recipients. Some individuals rely primarily on voicemail while others rely primarily on email. Yet others constantly engage in text messaging or two-way paging. For example, a user may know that their boss checks their voicemail often but seldom checks their email. By contrast, the boss's secretary may check email frequently but voicemail infrequently. If that user wants to send a voice message to both parties reflecting the two recipients' preferred messaging media, the user may create a distribution list that contains their boss's voicemail box number and his/her secretary's email address. The user may record a voice message and send the message to both of these destinations at the same time with a single user instruction. The voicemail would then be sent directly to the boss's voicemail box and to the secretary in the form of a sound file attached to an email.

One embodiment of the WorkSpace system allows users to create cross-media distribution lists. Given different messaging habits, the ability to create a single message but send it to different device types in different formats through the use of a single multimedia distribution list increases the probability that the recipient will actually receive and listen to messages sent by a user.

2. Accessing Messages over Different Media

Figure 27:
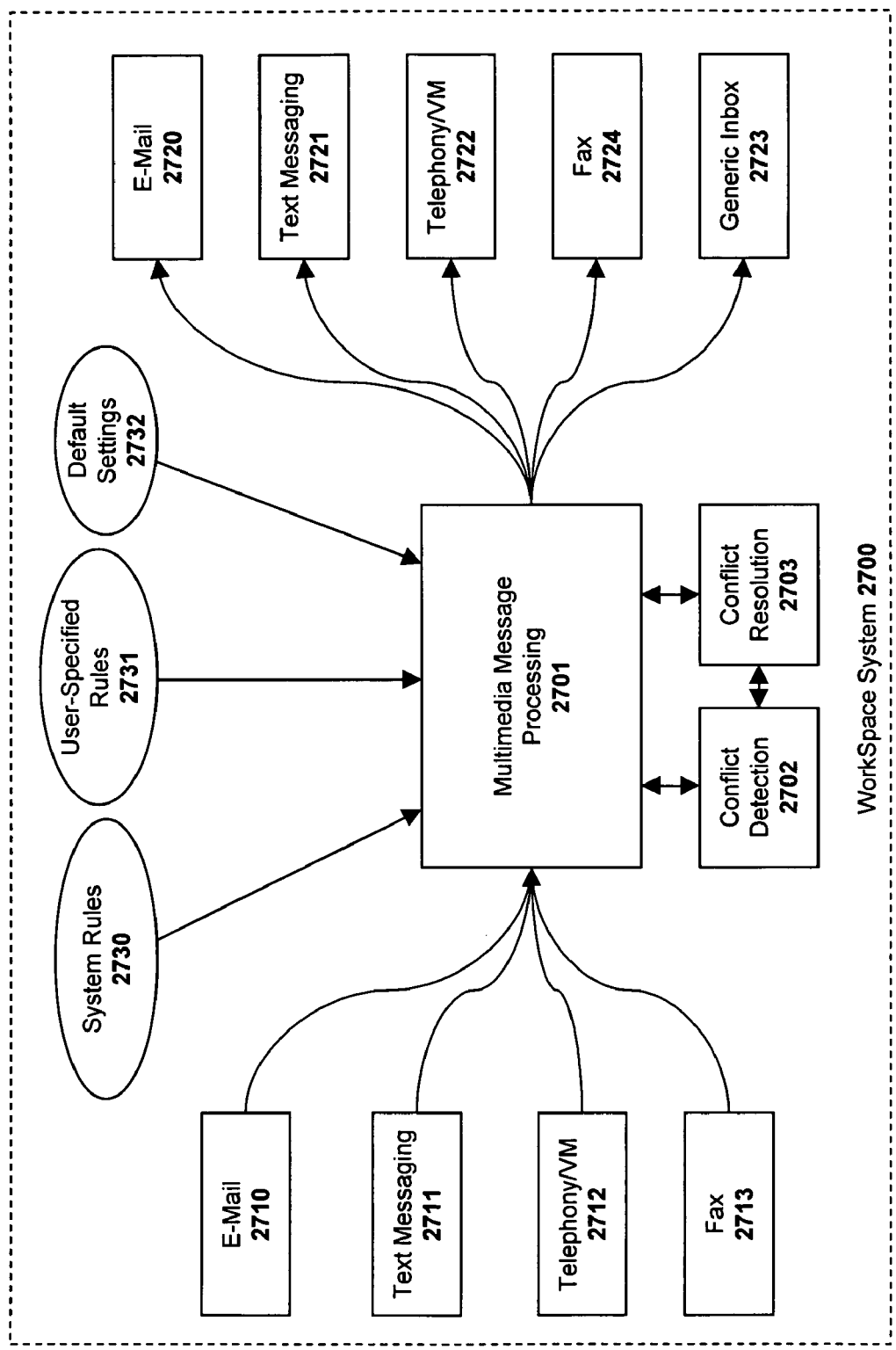
FIG. 27 illustrates multimedia message processing logic implemented in one embodiment of the invention.

As indicated in FIG. 27, in one embodiment of the invention, users may specify rules 2731 to define different sets of messages arranged differently when accessed over different media. Such rules may be applied to messages accessed by telephone as well as those accessed through a data network connection. For example, when a user calls in to check email and voicemail messages, he/she will typically prefer a different set of options for reviewing messages than when he/she checks messages from a computer.

Thus, in one embodiment of the invention, the user may specify different criteria for reviewing messages by telephone. For example, the user may not want to review certain types of messages via telephone such as faxes or text messages. Similarly, the user may only want to review email messages from certain designated message senders when the user calls in via telephone (e.g., his/her boss, spouse, or children).

The user may also specify rules to cluster and/or sequence new email and or voicemail messages. For example, the user may specify that he/she wants to review messages from co-workers first, followed by friends and family. In addition, the user may specify an order within each cluster. For example, within the "Work" cluster, the user may want to review messages first from his/her boss and administrative assistant prior to any other coworkers. Similarly, within the "Friends and Family" cluster, the user may want to review messages from his/her spouse before reviewing any other messages.

Figure 26:
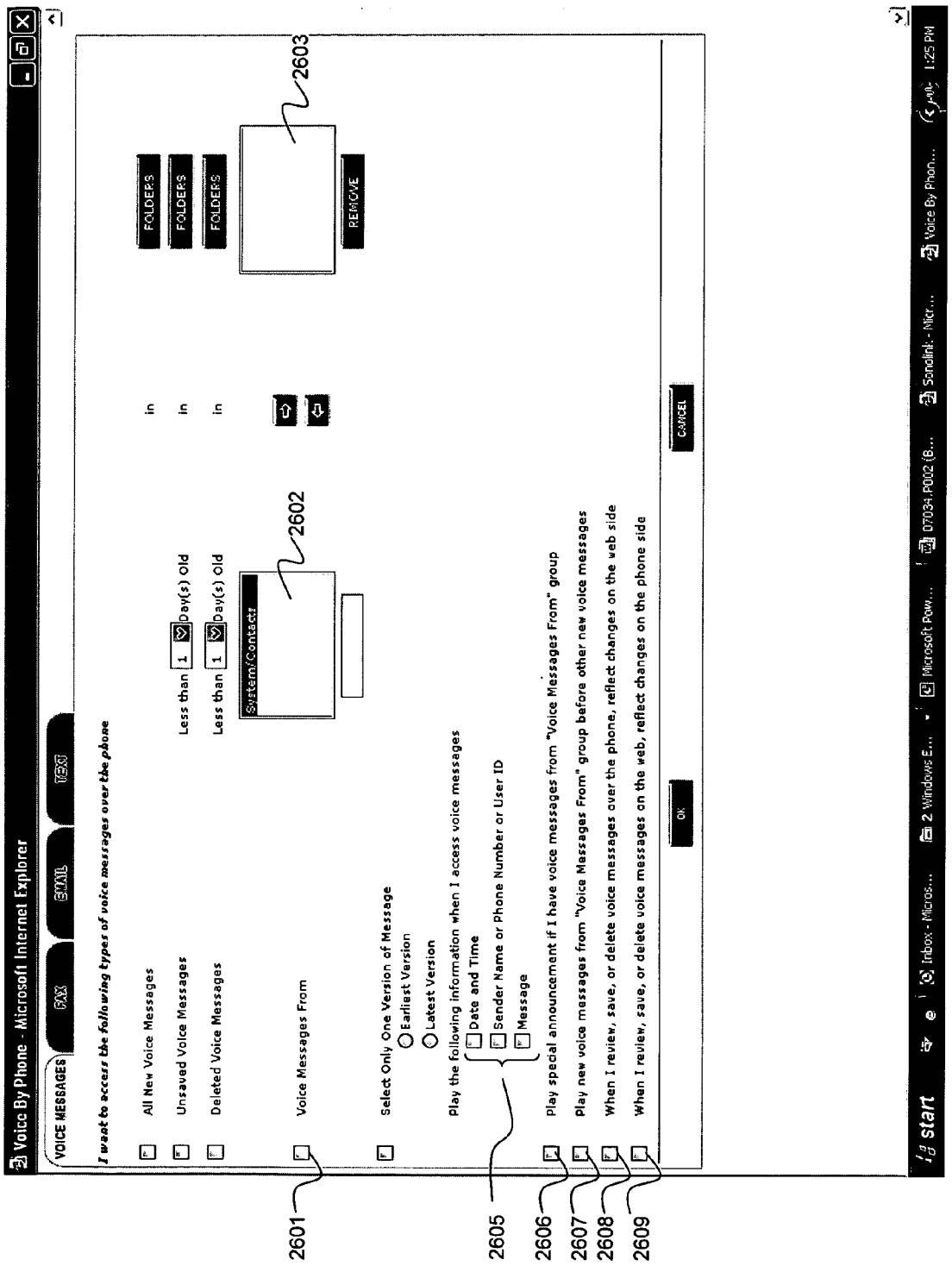
FIG. 26 illustrates an exemplary user interface for specifying user preference to cluster and listen first to messages from a set of message senders defined by the user.

FIG. 26 illustrates one embodiment of a graphical user interface for configuring various voicemail parameters. For example, by selecting element 2607 the user may define a set of potential voicemail senders whose voicemail the user wishes to listen to first. In one embodiment, the user may select voicemail senders via a system/contacts selection list 2602. Once selected, the voicemail senders (or sender groups) appear in selection list 2603. By selecting one or more of selection elements 2605, the user may specify various information to be played back with each message including, by way of example, the date/time of the message, the sender name phone number and/or user ID, and the message itself.

By selecting element 2608, the user may specify that message management functions performed via the telephone (e.g., review, save, delete) are to be synchronized when the user connects via a computing device (e.g., a computer with a Web browser). Conversely, by selecting element 2609, the user may specify that online management functions performed online are to be synchronized when the user connects via a telephone.

In addition, in one embodiment, different forwarding features are made available when the user checks messages over different media. For example, when the user checks email messages via a telephone, the user may be provided with forwarding options suitable to the medium such as voice recognition. Thus, the user may forward messages by stating the name of the user to whom the message(s) should be forwarded.

In one embodiment, to simplify message sending and forwarding by phone to Internet-format addresses (e.g., jsmith@xyz.com) that are either difficult for voice recognition schemes to recognize accurately or cumbersome for users to verbalize, the address book maintained on the WorkSpace system will allow the user to enter an X-digit "forwarding" number for each contact. To forward a message, the user may then simply enter the X-digit number via the telephone keypad. This mechanism may be used in addition to or in lieu of voice recognition (which may not be accurate under certain conditions). In one embodiment, the user may enter multiple X-digit numbers to forward the email message (or other type of message) to multiple recipients. Similarly, distribution lists containing Internet-format addresses can also be assigned an X-digit numerical identifier for purposes of sending and forwarding messages by phone.

It should be noted that the foregoing examples are meant to merely illustrate the flexibility of the WorkSpace system described above. The underlying principles of the invention are not limited to any particular set of rules for reviewing and/or managing messages.

3. Advanced Attachment Processing

In one embodiment, the user may provide specific rules defining how the multimedia message processing logic 2701 processes message attachments. For example, in one embodiment the user may specify certain local folders into which certain attachments should be automatically stored. For example, a user may create a folder in which any attachments from his/her boss or administrative assistant are stored. Similarly, the user may filter message attachments based on the attachment type. For example, the user may specify that any spreadsheet attachments from his/her administrative assistant are stored within a "Spreadsheet" folder. Various additional attachment types may be identified for folder-selection purposes (e.g., word processing documents, music files, picture files).

One embodiment of the invention will automatically decode (e.g., unzip/uncompress) encoded attachments prior to storing the attachments to a designated folder. Thus, in this embodiment, multiple files encoded within a single file may be automatically sent to different destinations following decoding and analysis.

Rather than physically detaching attachments and storing them in a local folder, the multimedia message processing logic 2701 may generate different user-specified views of the attachments. For example, the user may create a general view of all attachments contained within the generic inbox 2723 and/or an email platform 2720. The user may then filter the general view and create temporary or virtual attachment folders using any of the variables described herein as filtering criteria (e.g., message sender, attachment type, attachment size, data and time). This feature would be particularly useful to users who use their emails as storage and filing systems. Once again, the underlying principles of the invention are not limited to any particular set of view filtering criteria.

4. Multi-Tier Rule Execution

FIG. 27 shows that multiple layers of rules may be implemented by multimedia message processing logic 2701 including system rules 2730, user-specified advanced rules 2731 and default setting rules 2732 examples of which are described throughout this detailed description. As such, one embodiment of the invention includes conflict detection logic 2702 and conflict resolution logic 2703 for detecting and resolving conflicts, respectively, between rules. The conflicts may exist within the same layer (e.g., the user-specified rule layer 2731) or across multiple layers (e.g., a user-specified rule 2731 may conflict with a system rule 2730). The conflict detection logic 2702 and resolution logic 2703 may implement any of the various detection and resolution techniques described herein.

Figure 28:
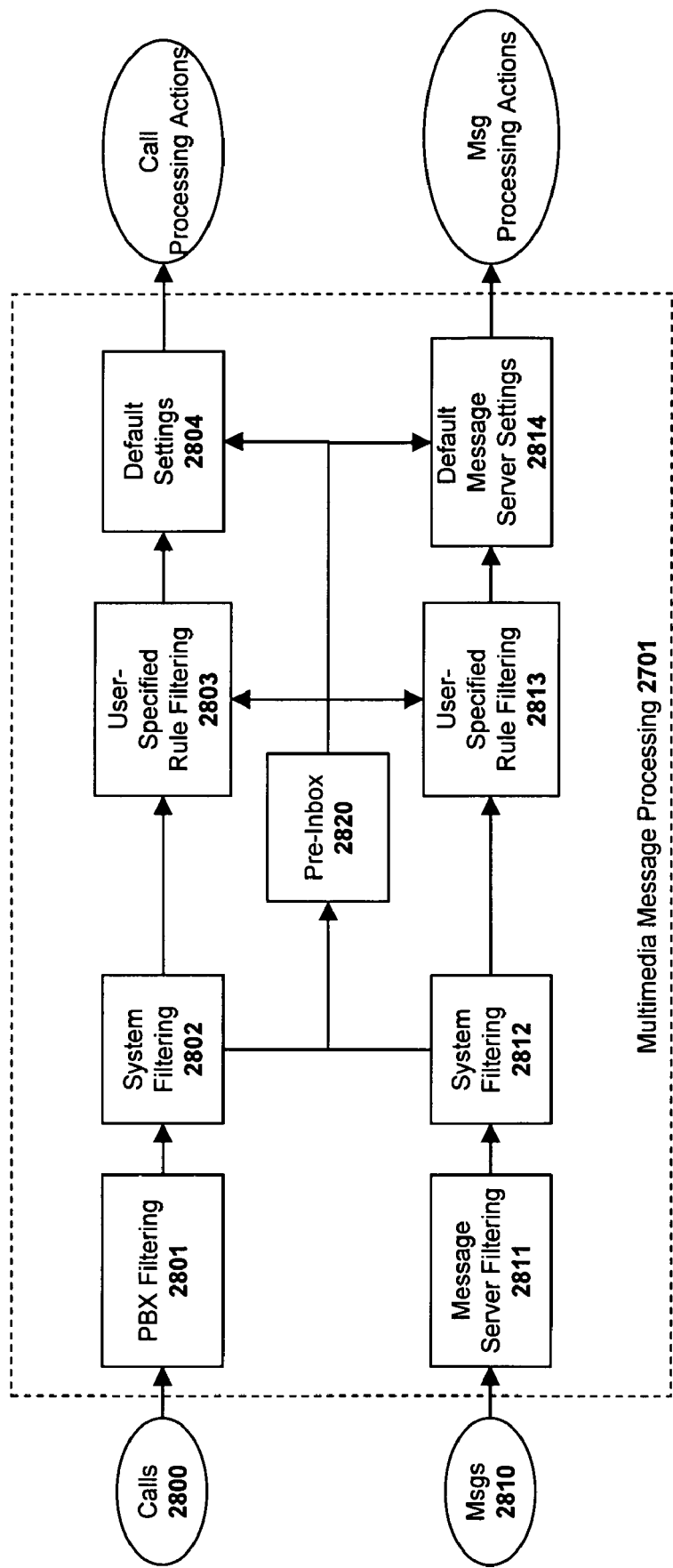
FIG. 28 illustrates a pre-inbox and multiple layers of rule processing implemented in one embodiment of the invention.

FIG. 28 illustrates one embodiment of the invention that employs a "pre-Inbox" 2820 to store incoming messages until all rules within each layer have been applied and any conflicts between rules have been resolved. The pre-inbox may be implemented in a variety of ways. For example, in one embodiment the pre-inbox is maintained as a first-in-first out ("FIFO") queue or buffer allocated in volatile memory (e.g., RAM) and/or non-volatile memory (e.g., a hard drive). In one embodiment, the pre-inbox is managed by a file system such as the virtual file system described above. However, the underlying principles of the invention are not limited to any particular mechanism for managing the pre-inbox 2820.

Message filtering in this embodiment may occur at both the system level and the client level. In FIG. 28, system-level filtering of incoming calls/voicemails and/or faxes (hereinafter "calls") is performed by WorkSpace system PBX 2801 and system filtering module 2802, and system-level filtering of electronic messages such as email, text messages, and instant messages (hereinafter "electronic messages") is performed by message server filtering module 2811 and system filtering module 2812 (i.e., based on the system rules 2730 illustrated in FIG. 27). By way of example, the WorkSpace system PBX 2801 may be configured to route all calls to a particular number to a company's branch office. Similarly, incoming messages such as email and instant messages may be initially filtered by an external server 2811, such as a system-level firewall, prior to arriving at the pre-inbox 2820. For example, the external server filtering module 2811 may implement virus and spam filtering at the system level.

System filtering modules 2802 and 2812 provide an additional layer of system-level filtering which may be configured by a system administrator. For example, an administrator may configure system filtering module 2812 to forward all incoming email messages addressed to custservice@xyz.com to a specified group of individuals. Similarly, the administrator may configure system filtering module 2812 to block all calls from certain designated numbers (e.g., via a caller "blacklist"). Time of day routing of nighttime calls to an answering service is yet another example.

In one embodiment of the WorkSpace system, highly complex rules may also be specified at the system level. For example, the administrator may specify that messages containing the word "billing" anywhere in the message should be sent to a group of specific individuals in the accounting department. Another example is a rule according to which any emails to a "trouble reports" group received after 5 p.m. should be sent to the email address of the specific person who is on call for the night. Once again, however, the underlying principles of the invention are not limited to any particular set of rules.

"Client-level" rule filtering is performed by user-specified rule filtering module 2803 and default settings module 2804 for calls; and by user-specified rule filtering module 2813 and default message server rules module 2814 for electronic messages. The user-specified rule filtering modules 2803 and 2813 apply both user-specified mode rules and user-specified management rules. In one embodiment, the user-specified mode rules are applied first, followed by the user-specified management rules, although they may be applied in the reverse order or simultaneously while still complying with the underlying principles of the invention. In one embodiment, mode filtering rules cause the filtering modules 2803 and 2813 to filter calls and electronic messages, respectively, based on the particular "mode" in which the system is operating (e.g., vacation mode, work mode, etc). User-specified management rules cause the user-specified rule filtering modules 2803 and 2813 to filter calls and electronic messages, respectively, as specified by the end user (e.g., via the various GUIs set forth herein).

Default settings 2732 are applied by default settings module 2804 for calls and default message server settings module 2814 for electronic messages. For example, with respect to calls, the default settings 2804 may specify that all voicemails are automatically to be deleted once listened to by the user. With respect to electronic messages, for example, each time a user sends an email message, the message may be stored in the user's "sent mail" folder. It should be noted, of course, that the underlying principles of the invention are not limited to any particular set of system, user-specified or default rules.

It should be noted that the "client-level" filtering described above does not necessarily require filtering on a client computer. Rather, "client-level" is used broadly herein to refer to any type of filtering other than system-level filtering that is unique to a user or account. For example, the user-specified rule filtering module 2813 and default message server settings module 2814 may be implemented on a server (e.g., an email server) rather than on a client workstation. Moreover, the particular order in which filtering is implemented in FIG. 28 is not necessary for complying with the underlying principles of the invention.

While prior systems may contain examples of system-level message and call management (e.g., forwarding instructions), they generally do not permit multiple criteria specification for such rules (e.g., forward all email from "Friends" (sender criteria) that contain a music file attachment (attachment criteria)). They also do not typically permit a set of criteria to apply to a particular group of users or accounts (e.g., forward incoming email with the word "billing" in the subject line to certain individuals in accounting). Furthermore, advanced criteria specification for rules does not exist nor does the ability to forward a particular type of message (e.g., fax) to destinations of different media types (e.g., fax machine, email). Finally, virtually no prior art system-level management platforms allow for different actions to be taken for different criteria, as described herein.

As mentioned above, in one embodiment, as each set of rules are applied by filtering modules 2802–2804 and 2812–2814, to the incoming call or electronic message, respectively, the call/message may be temporarily stored within the pre-inbox 2820. Once each layer of rules has been applied, if a conflict is detected by the conflict detection logic 2702, the conflict resolution logic 2703 attempts to resolve the conflict (e.g., using one or more of the conflict detection and resolution techniques, respectively, described herein).

In one embodiment, a conflict may be as simple as two rules that cause the same message to be copied twice to the same folder or to multiple folders. For example, a user-specified rule may state that if an email is received from "User X" between 4 p.m. and 6 p.m., it should be sent to a folder designated for User X messages. However, another rule may exist that states that all messages from "Friends" (User X is a member of "Friends") are to be copied to the "Friends" folder. Between 4 p.m. and 6 p.m., all messages from User X would be copied twice to two different folders. This may be the intended effect but unlikely because message management rules that multiply messages are rarely useful to most users. In one embodiment, where rules are applied sequentially to messages based on the order of the rules, the user may specify that if a message was "disposed of" by a previous rule, then the message processing logic 2701 should not apply the current rule.

FIG. 29 illustrates one embodiment in which the user may specify a variety of email rule options. By selecting either 2901 or 2902, the user may specify whether the criteria of a rule is to be checked against the original version of the message (i.e., as it existed prior to the application of any other rules) or the most recent version of the message (i.e., inclusive of the changes resulting from other rules). In addition, by selecting either 2905 or 2906, the user may specify whether actions associated with the current rule should be applied to the original version of the message or the most recent version of the message, respectively. A basic repository of messages would not enable such nuanced applications of message management rules. Storing the message in the pre-inbox 2820 until all rules are applied allows for this criteria check against a message as it first arrived in the WorkSpace system or as it was changed by previous rules.

By selecting 2903 the user may specify that the current rule should not be applied if certain actions associated with previous rules were applied to the message (e.g., the message was moved to a particular folder as described above). The user can further specify any or all actions which effectively "dispose of" the message such as delete, copy, move, and forward. On the other hand, the user may in fact want to have the two copies of the message in two different folders. The pre-inbox 2820 enables the execution of such a "meta rule" that gives the user the choice.

By selecting 2904, the user may specify that the current rule should not be applied if a markup action associated with the current rule conflicts with previous markup actions. By way of example, the first rule may specify that a message (meeting certain criteria) be marked urgent. If a second rule specifies that the same message be marked normal, a conflict arises that is not easily resolved. The choices are clear: execute the first rule, execute the second rule, or execute no rule. Thus, the pre-inbox again allows the user to specify a "meta rule" that the second rule should not be applied if a previous rule had marked a message as "urgent."

5. Integration with Third Party Applications

Document management is perhaps the most critical application that is tied to communications and message management. However, other third-applications that work on or with generally used computer operating systems may also be easily integrated with the WorkSpace system through its Web server functionality. This capability also facilitates integration with third-party data management applications.

In one embodiment, integration of third-party applications within a WorkSpace system takes the form of a "platform" 150 within the WorkSpace portal. Users may determine the choice of applications to be integrated in the WorkSpace portal. Such integration is possible in WorkSpace enterprise environments 270 and carrier environments 370. Examples of third-party applications that may be integrated within a WorkSpace system and incorporated in a WorkSpace portal include (a) Web-based applications such as a sales force management application; (b) content sites that provide real-time stock quotes for a brokerage firm or breaking news information (online wire service) for a media company; (c) content sites from which transactions such as the purchase of goods or the downloading of content is possible; and (d) other messaging locations. Other examples include integration with a company's accounting or time-keeper systems. As part of such integration, scripts may be easily developed so that a user does not have to reenter security passcode information to access such systems when successfully logged into a WorkSpace system. Thus, in one embodiment, the WorkSpace system acts as a gatekeeper application that monitors security to external applications in addition to itself.

6. Management of Messages Accessed Over Different Media

One problem that is common to many unified communications solutions today is the need to manage messages at least twice when different access methods to messages are permitted or when messages are routed to non-system locations. The cause of this problem is the fact that equivalent messages are produced in various devices and locations. Consider, for example, a messaging system that allows users to retrieve voicemail by telephone and over the Internet. If the user reviews a particular voicemail over the Internet and deletes it, the same voicemail is typically retained as "new" in the telephone accessible area. The user is forced to manage the voicemail the next time he/she accesses voicemail by telephone even though he/she had disposed of the voicemail earlier.

Alternatively, a few systems automatically mirror the status of messages in one area in other areas. For example, a message accessed over the Web and deleted would no longer be available over the telephone. This too is an extreme outcome not desired by all users. Some users may actually prefer to have voicemails accessible over the telephone even though the voicemails have been reviewed over the Internet. For example, a secretary may routinely review voicemail over the Internet for their boss to alert the boss if urgent messages arrive, but the boss (who may seldom use a computer) may want to have all voicemail available by telephone.

One embodiment of the WorkSpace system allows users to specify whether they want to manage only once their voicemails and other messages. For example, a user may specify that he/she does not want to double manage their voicemail messages. As a result, the WorkSpace system would not make available to the user a voicemail that was previously accessed over the Internet and deleted. Conversely, the user may want to double-manage their messages for reasons unique to the user. In one embodiment, the WorkSpace system allows the user to narrow the set of messages they want to subject to single management (e.g., by characteristics such as the identity of the message sender). Thus, in this embodiment, the user's preferences dictate single and multiple message management and the set of messages subject to either rule. The user preferences may be embodied in a set of instructions within Workspace message management software.

In one embodiment, the method described above is accomplished in the following manner. Each message is given a unique identifier based on the recipient, type of message and time of arrival of the initial message. In various file directories, the message identifiers are retained, though the locations may be different. When the user asks to delete, save, or otherwise dispose of a message, the action is carried out by a centralized message storage manager 802 (see FIG. 8). This message may be relayed by the centralized storage manager 802 to user-selected subsidiary storage areas to appropriately dispose of the uniquely-identified message. Each manager of a storage area then identifies the message within its storage area and performs (or not) the requested task.

The WorkSpace system, therefore, provides a method for users to handle either identically or differently equivalent messages that are stored in or sent to different locations. In one embodiment, this is accomplished by a distributed federated system of task agents that are distributed autonomous communicating processes such as that illustrated in FIG. 8.

In general, the sets of messages that are accessible by telephone, over the Internet, or through other means need not be identical, and these sets can be specified by a user to reflect their preferences or habits. This is accomplished either by maintaining separate message locations corresponding to each access method or marking each message to be made accessible over particular access methods. For example, a user may only want to access voicemail from work colleagues and friends over the telephone but may want to have all voicemail available over the Internet. When messages are made available in different access areas, the status of the messages may be mirrored in each of these areas through the techniques described above. Thus, a voicemail that has been deleted over the telephone may also be among deleted voicemails in the message storage area accessible over the Internet. As illustrated earlier, some users may not wish to have such equivalence. If so, the central storage manager 802 would not issue instructions to maintain equivalence. Alternatively, a user may want equivalence in only two locations but not in a third location. In this case, only a subset of instructions may be executed.

Figure 30:
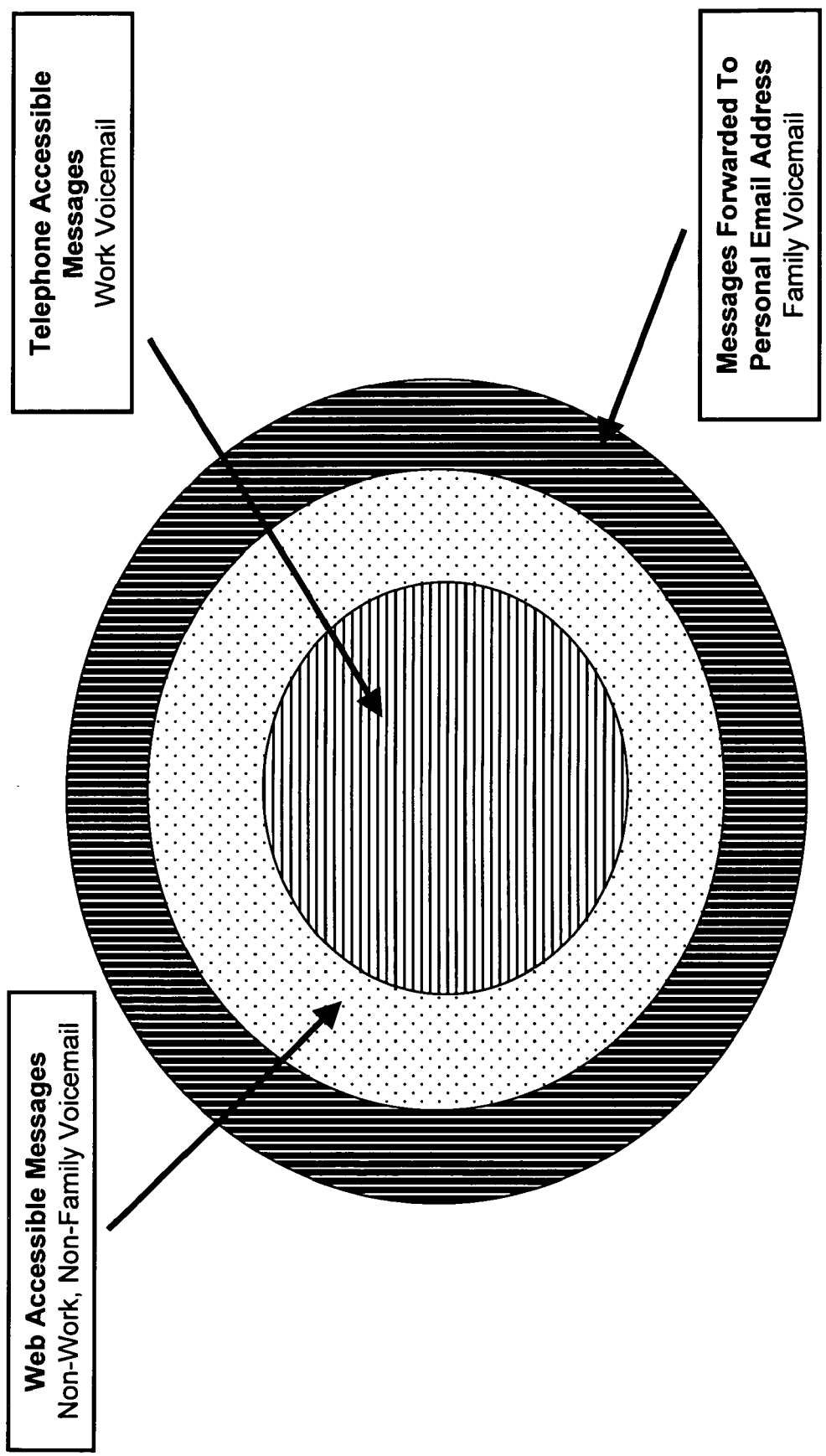
FIG. 30 illustrates an example of user preferences related to message access/retrieval and corresponding message sets according to one embodiment of the invention.

The problem of multiple message management is more difficult to resolve in a context where the message itself has been forwarded or otherwise sent to a device or location outside the message management system. One example is where voicemail is forwarded as an email attachment to an email address. In this case, the user may access the voicemail through their email and even delete it. The same voicemail, however, remains in the telephone accessible area of most unified communications systems. The WorkSpace system addresses this issue by allowing users to specify whether to retain messages that have been forwarded to non-system destinations (outside fax numbers or email addresses) and if so, what status to use for such messages (e.g., new or saved or old or deleted). By way of example, FIG. 30 provides a graphical representation of a set of voicemail messages for a user who wants to access only work voicemail by telephone, has all voicemail from family forwarded to their personal email, and requests that only non-work, non-family voicemail be accessible over the Internet.

7. Online Specification of Personal Preferences

One embodiment of the invention provides for online specification of preferences for multiple and different message and document types as well as for multiple and different communication methods. This embodiment of the Work-Space system allows users and administrators to specify online preferences with respect to all message and document types as well for real-time communications.

As mentioned above, users may specify the set of messages as well as how much or how little of the message or document characteristics they wish to access over the telephone or view online. For example, a user may not want to know over the telephone whether they have received faxes. Alternatively, they may want to know over the telephone whether they have received email from work colleagues or a text message from a particular individual. They may only want summary information about faxes such as the originating fax number but not the time of receipt. Users may also want to start at a particular point in the IVR menu tree (e.g., new voicemail) rather than the main menu.

Users may also specify not only what messages and documents they access but also how they access them. They may want a particular form of clustering and sequencing. For example, a user may want to listen to voicemail from family first and the remaining voicemails chronologically. In one embodiment of the WorkSpace system, users may specify online virtually all preferences typically associated with accessing voicemails over the telephone. The specification of these preferences is not unlike the specification of account preferences for Internet accounts. The WorkSpace system described herein goes further by allowing users to specify online access and management preferences for all types of messages and documents managed through its integrated platform as well as for real-time communications. A user's specific set of preferences comprise a subset of the user's profile that determines the particular set of feature/functionalities that are activated for the user.

8. Heuristic IVR Menu Options

Most Interactive Voice Response ("IVR") systems have a limitation that can be a significant nuisance for many users. The announcements and prompts employed in these systems are generally fixed and do not take into account the underlying information that is to be conveyed or the user's usage patterns. This is especially true of announcements and prompts in the course of retrieving messages and information about documents over a telephone.

One embodiment of the WorkSpace system implements a heuristic learning approach to this problem. For example, this embodiment of the WorkSpace system will not provide users with prompts that apply to faxes if they do not have faxes. This saves time and the absence of fax prompts is itself informative. In addition, similar to online menus that incorporate heuristic learning, IVR menus that have not been used for a specified period of time may be automatically hidden (i.e., IVR menu announcements not played) from the user while still available for use. It is the usage of menus and choices within menus along with the presence or absence of relevant information that will passively activate the "hiding" of menus and choices. In one embodiment, different "hiding" rules are specified for different menus and even for choices within menus. Rather than hiding, menu choices used infrequently may be placed further towards the bottom of each IVR list relative to choices which are used frequently.

By way of example, consider a message retrieval menu that states the following: "Press 1 for Voicemail, Press 2 for Fax, Press 3 for Email." In one variation of heuristic IVR menus, if the user did not have any faxes to be retrieved, the menu would now be "Press 1 for Voicemail, Press 3 for Email" or alternatively "Press 1 for Voicemail, Press 2 for Email." Either version of the truncated menu could also be activated if the user never used the "Press 2" key during a specified period of time (e.g., one month) that is specified as a system parameter or user preference.

In one embodiment, IVR choices may be managed online rather than merely over the telephone. For example, different greetings and announcements may be recorded and associated with different mailboxes via the GUI 900 described above.

9. Messages to Direct Reports from Superiors

In one embodiment, managers in an enterprise can send messages to their direct reports with relative ease. Assigning users to particular departments and locations together with defining the departments and locations within the jurisdiction of a "manager" makes this possible. Users who are "managers" can send email, text, or voice messages to their direct reports without having to define and update distribution lists. The list of direct reports varies as personnel and management responsibilities change. In one embodiment, important messages from superiors are visible to users in the "Main" section of a user's personal WorkSpace.

10. Advanced Contacts Management

To facilitate the ease with which various filtering and actions may be specified, the WorkSpace system embodies the notion of a "group" that is distinct from a distribution list. A distribution list requires the user to assign particular destinations (i.e., email addresses, voicemail boxes) to it. By contrast, a group consists of members within a user's contacts. For example, a "Friends" group may consist of Bob, Tom, and Jane. A voicemail distribution list of these three "Friends" would consist of their email addresses and system voicemail boxes that a user included as part of the distribution list. This distribution list is irrelevant in the context of email messages and must be updated if the email address of one of the three changed or if one of the three has a new email address. By contrast, the group "Friends" can be used in the context of all message types. Thus, a user may specify one rule that states "Send all calls from 'Friends' to voicemail" and another that states "Forward all email from 'Friends' to my personal email address." The WorkSpace system knows that all phone numbers and all email addresses of the three friends are to be included in the criteria. Furthermore, if phone numbers of email addresses of the three change, there is no need to redefine the rules.

In one embodiment of the invention, the WorkSpace system updates contacts information automatically. This may be accomplished in a variety of ways. The first and most straightforward way is for a user to link a system contact to their personal contacts. Alternatively, a user could link their personal contact to a system member identifier. Once the linkage has been registered on the WorkSpace system, when a contact updates their information, the information about that contact is automatically updated in the user's contact list. Conversely, updates to their personal information by a user are automatically sent to other linked contacts. The second and more complicated way to "create" linkages is to generate a scoring scheme to determine whether a contact in a user's list is a member of the system. There are numerous ways to generate such scoring and create linkages including, for example, a score based on how many contact fields are identical. Regardless of the linkage method employed, in one embodiment, users are provided with the option to specify whether they want to send and/or receive contact update information.

Since the WorkSpace system may incorporate real-time communications functionality, in one embodiment, calls may be generated directly from a user's contact list. To ensure the success of such calls, it is important that the information be entered correctly. Some prior systems validate phone and fax number entries but only check to see if the entries are comprised of numbers and/or a few select non-number characters. One embodiment of the WorkSpace system prevents free-form entry and requires the user to enter all of the sub fields of a number including: toll code (e.g. 011 or 1); country code if not the user's default country; area or regional code; and finally the local number itself. Such strict enforcement of data entry minimizes the possibility of error when calls are placed directly from a user's contact list.

11. Advanced Call Management

The WorkSpace system allows for the definition of basic and advanced specifications for filtering and routing phone calls. Through the GUI interface (certain aspects of which are described herein, users may define complex filtering criteria based on the identity of the caller, the called number, time of day, schedule, and other call characteristics. Audio and video conference parameters may also be defined in the same manner. Calls and conferences may also be controlled and managed through GUI interface commands even as they are happening.

In addition, both Web and client application GUI interfaces may allow users to define IVR and Auto Attendant scripts (including time-of-day and other criteria based routing). Various administrative functions such as setting up a Centrex group and all moves, adds, and changes could be conducted via the same interfaces rather than direct programming of a WorkSpace system's real-time communication module. Both users and administrators manage prerecorded greetings and announcements in the form of sound files from a network-connected computer device. One embodiment of the invention treats voice and video calls/conferences as movable objects so that functions like relocating entire calls/conferences to a different server could be implemented. Conceptually, this is no different than forwarding an email that is also an object. The difference is that the former is a dynamic object while the latter is a static object.

12. Management of Text and Instant Messaging

If voice communications is considered "real-time" communication and if regular mail and email is considered "non-real-time" communication, both instant messaging ("IM") and text messaging (such as over wireless phones and pagers) may be considered "near-real-time" communication. Users may wish to limit the individuals with whom they communicate through these methods because of the invasive and pervasive nature of such communications. They are invasive because they intrude into an individual's privacy in a written and recorded form. They are pervasive because one can easily guess what another's text address is and certainly one's online presence is easily detected by others. While ignoring text messages and blocking instant messages are possible ways of controlling "near-real-time" communications, a more polite technique that limits such communications to a set of users may be preferred by many. This may be accomplished through the use of "double-blind" or "pseudo-address" method.

Figure 31:
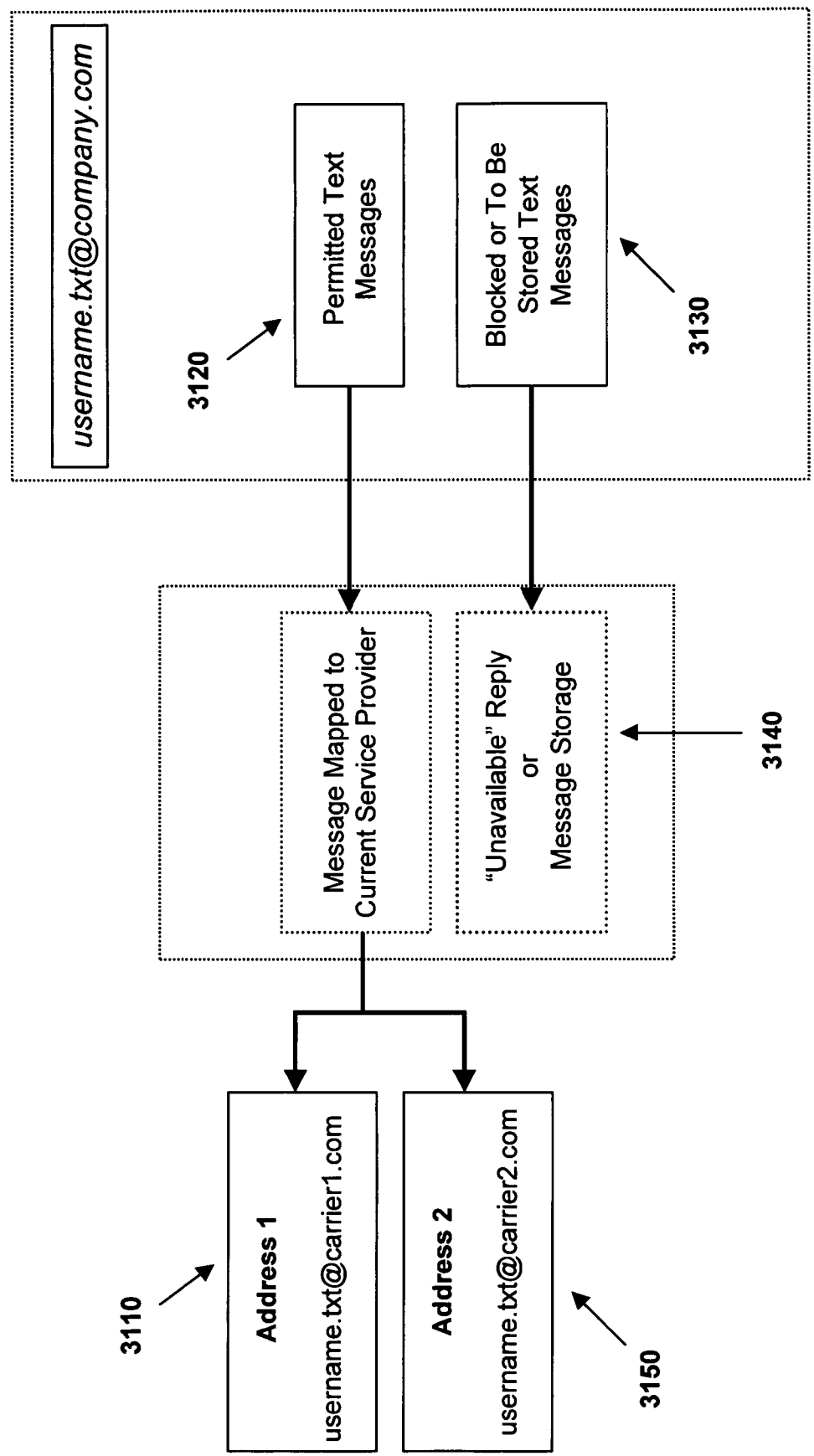
FIG. 31 illustrates a pseudo-address method for text messaging according to one embodiment of the invention.

Through the use of a pseudo Internet address for text messaging, all text messages that are sent to a user arrive in a WorkSpace system and the message is then sent to the specified true text messaging Internet address. Thus, as illustrated in FIG. 31, a user could publish the text messaging address of username.txt@company.com while the true address is username.txt@carrier1.com 3110. The user could specify their preferences to allow text messages from only certain individuals or numbers, or groups of individuals 3120 to reach their true text messaging address. With respect to text messages from all others 3130, users may create a polite personalized response such as "User Name Is Not Able to Receive Text Messages at This Time" or alternatively direct all "unwanted" text messages to a message storage area 3140. The approach simultaneously allows blocking of unwanted text messages, storing of non-critical but valuable text messages, and the receipt of wanted/critical text messages based on the characteristics of the messages themselves (beyond just the sender or the sender's group). Only text messages as defined by the user (e.g., from people at work and marked urgent) reach the user's actual text messaging device. A secondary benefit of this approach is the ability of users to switch to another text messaging provider with a new text messaging address username.txt@carrier2.com 3150 without having to republish their previously published text messaging address. The text message could also be easily forwarded to multiple devices and addresses very easily. This approach is particularly useful for enterprises who wish to change service providers with minimal disruption (e.g., avoid republishing business cards).

Figure 32:
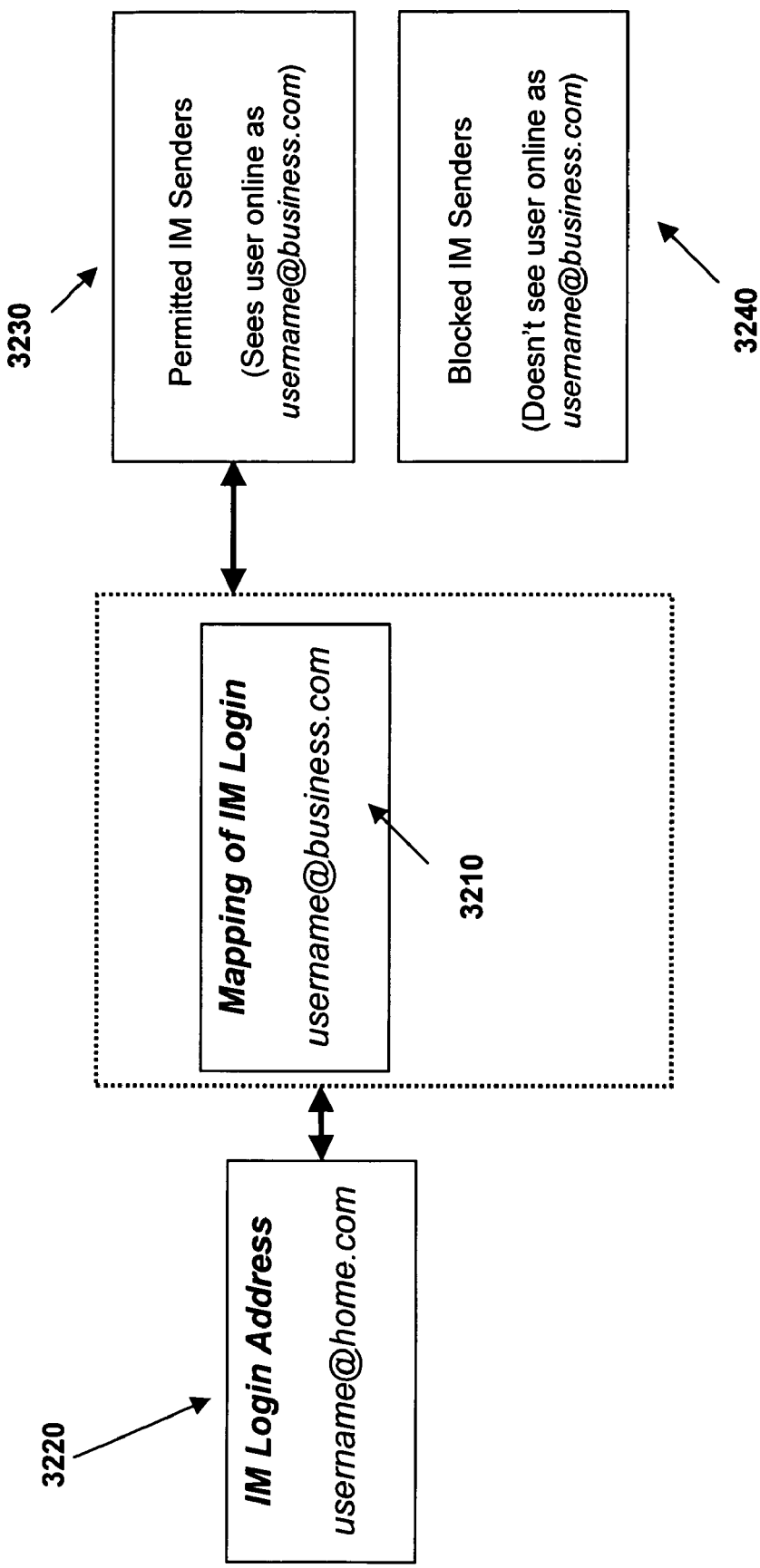
FIG. 32 illustrates an exemplary pseudo-address method for instant messaging according to one embodiment of the invention.

A similar approach may be used for purposes of instant messaging, as illustrated in FIG. 32. The invasive nature of instant messaging combined with the psychological discomfort to block senders affirmatively makes the "double-blind" approach extremely well-suited for instant messaging. For example, users may publish their business or primary email address username@business.com 3210 but login under a different screen name username@home.com 3220 to go online. Similar to most IM filters today, only those users 3230 whom the user permits would know that the user is online and available for instant messaging. Unlike most IM filters today, however, the user appears to these individuals as if they were online with their published email address username@business.com, as opposed to their login screen name. Furthermore, no affirmative blocking of other individuals 3240 is required.

The instant messaging module of the WorkSpace system enables a multiplicity of "presence options" of which the double-blind scheme is but one option. The ability to make one self available to some but not others and through different schemes (double-blind scheme and text forwarding) is essentially filtered routing of instant messages. Different filtering criteria may also be specified to log certain IM sessions but not others. This, of course, depends on whether there is a system rule that enforces logging of all IM sessions.

Additional WorkSpace Graphical User Interface Features and Functional Modules

Figure 33A:
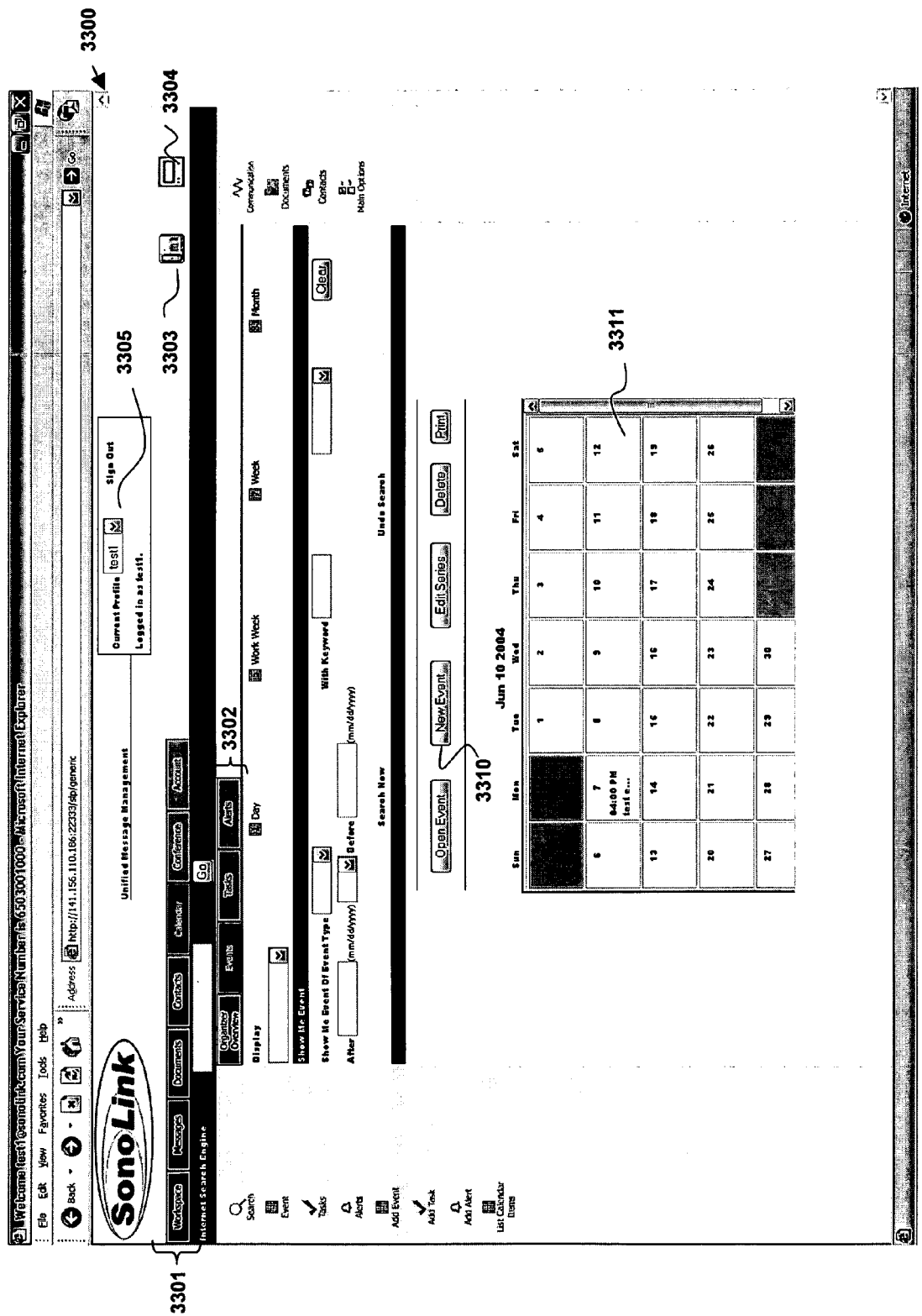
FIGS. 33a–o illustrate an exemplary graphical user interface employed to access and configure the WorkSpace system.
Figure 33B:
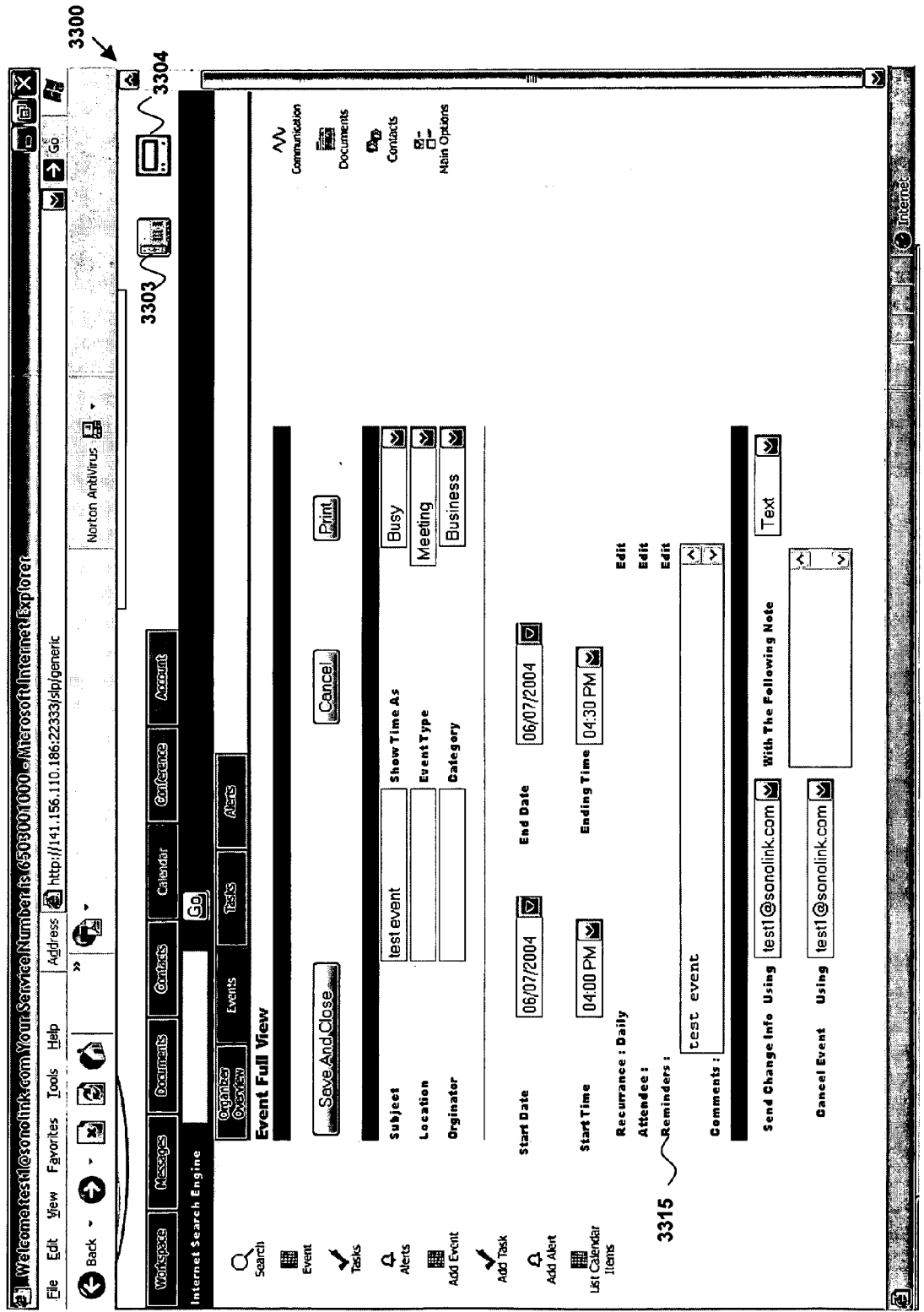
Figure 33C:
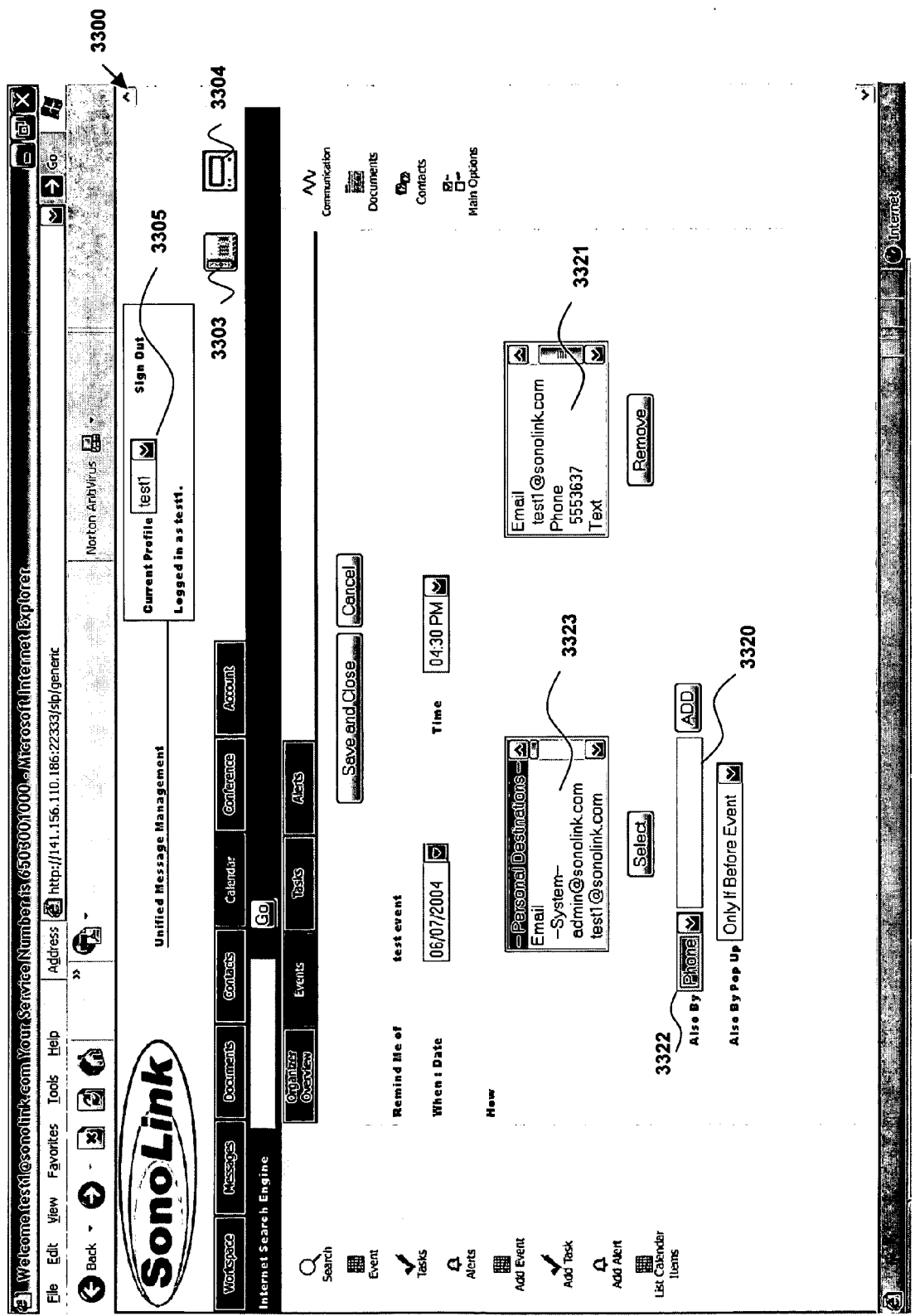
Figure 33D:
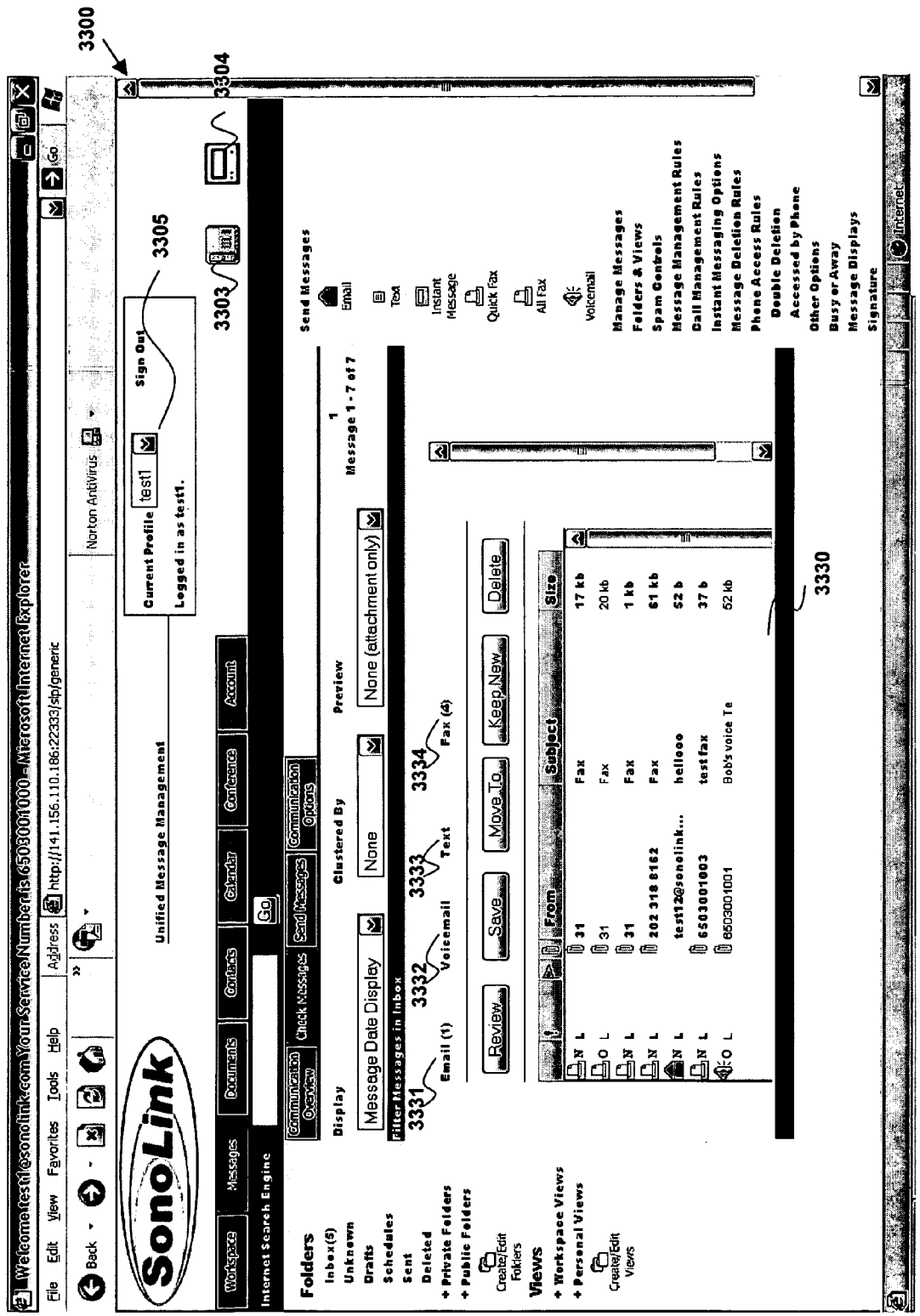
Figure 33E:
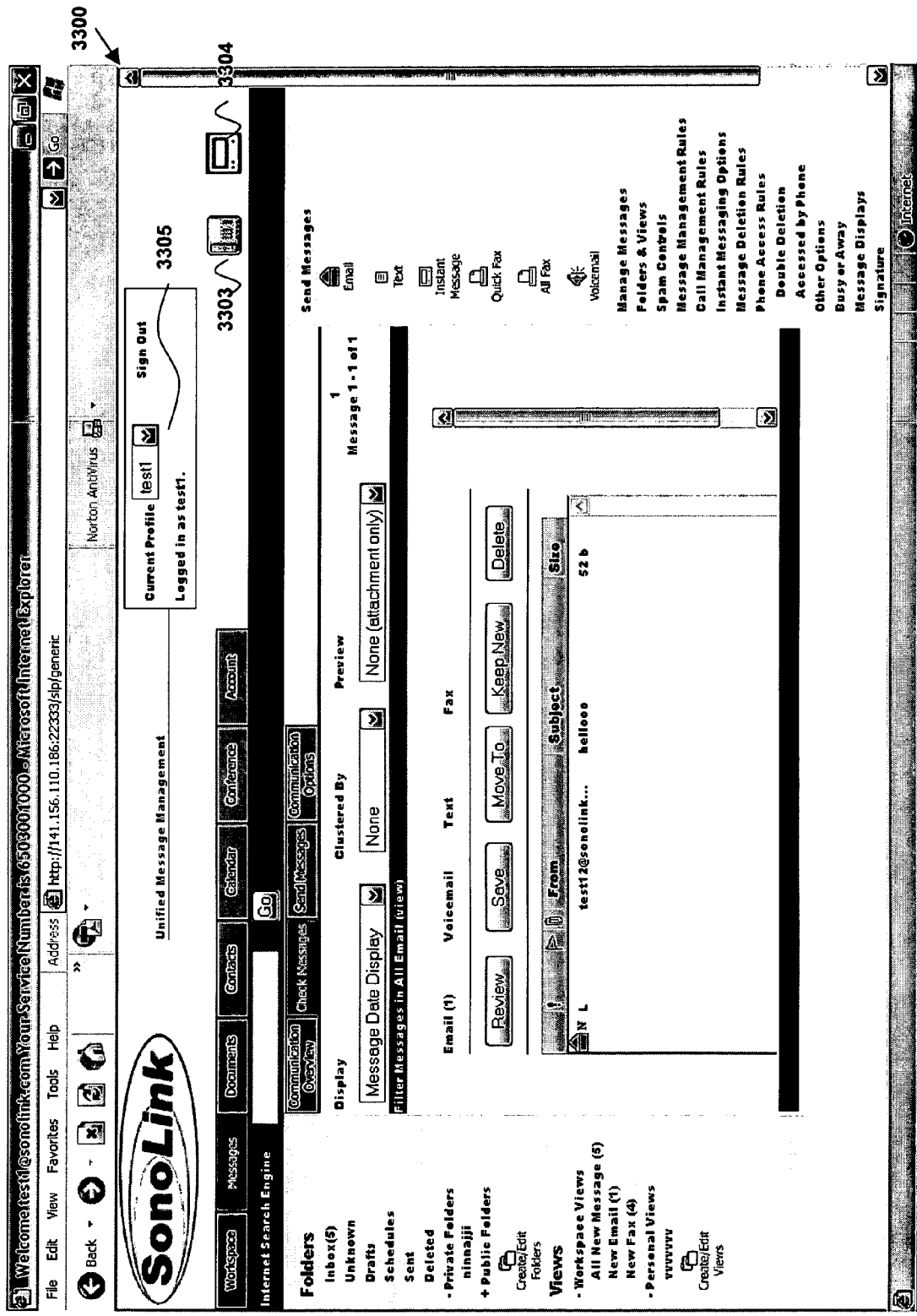
Figure 33F:
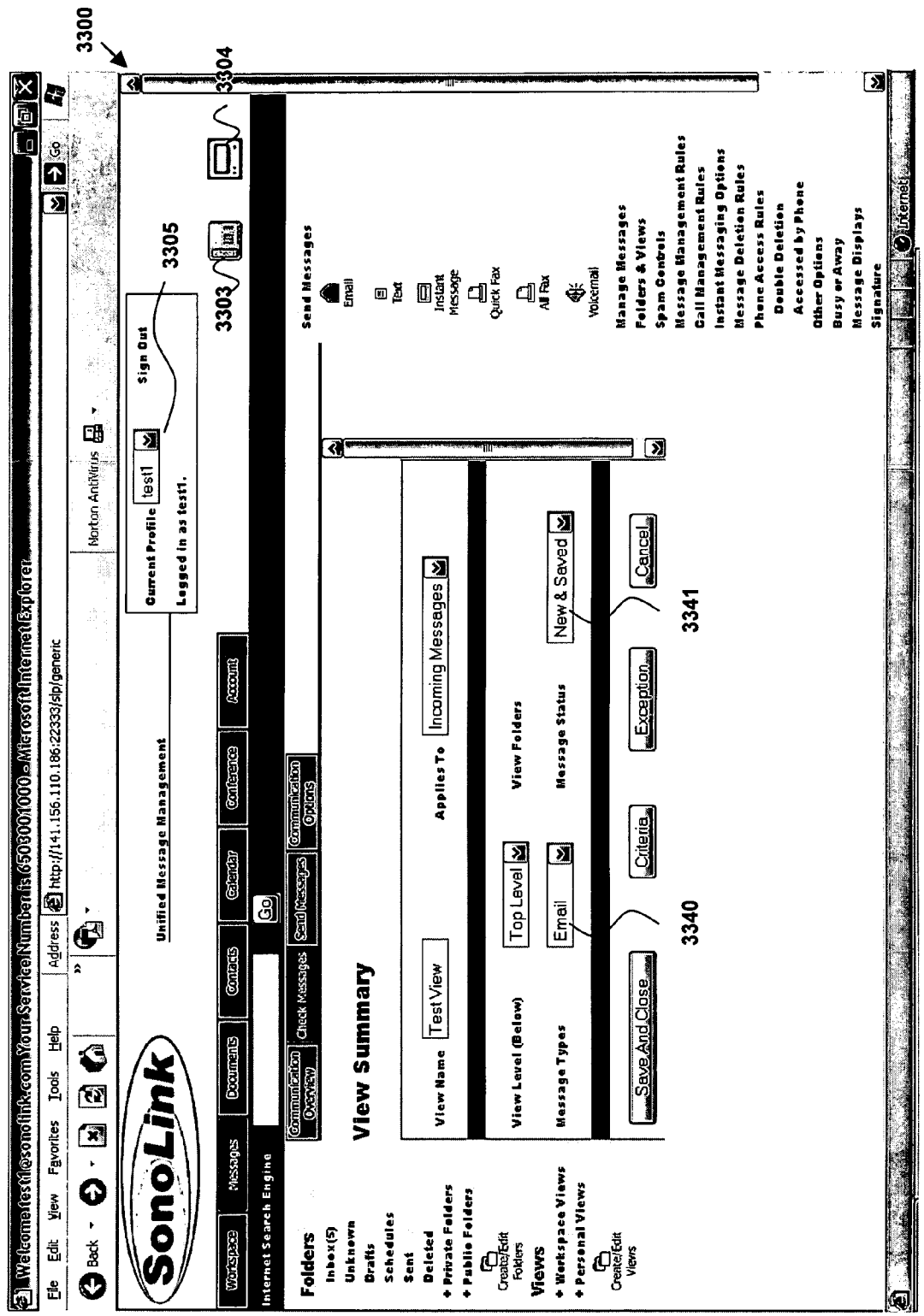
Figure 33G:
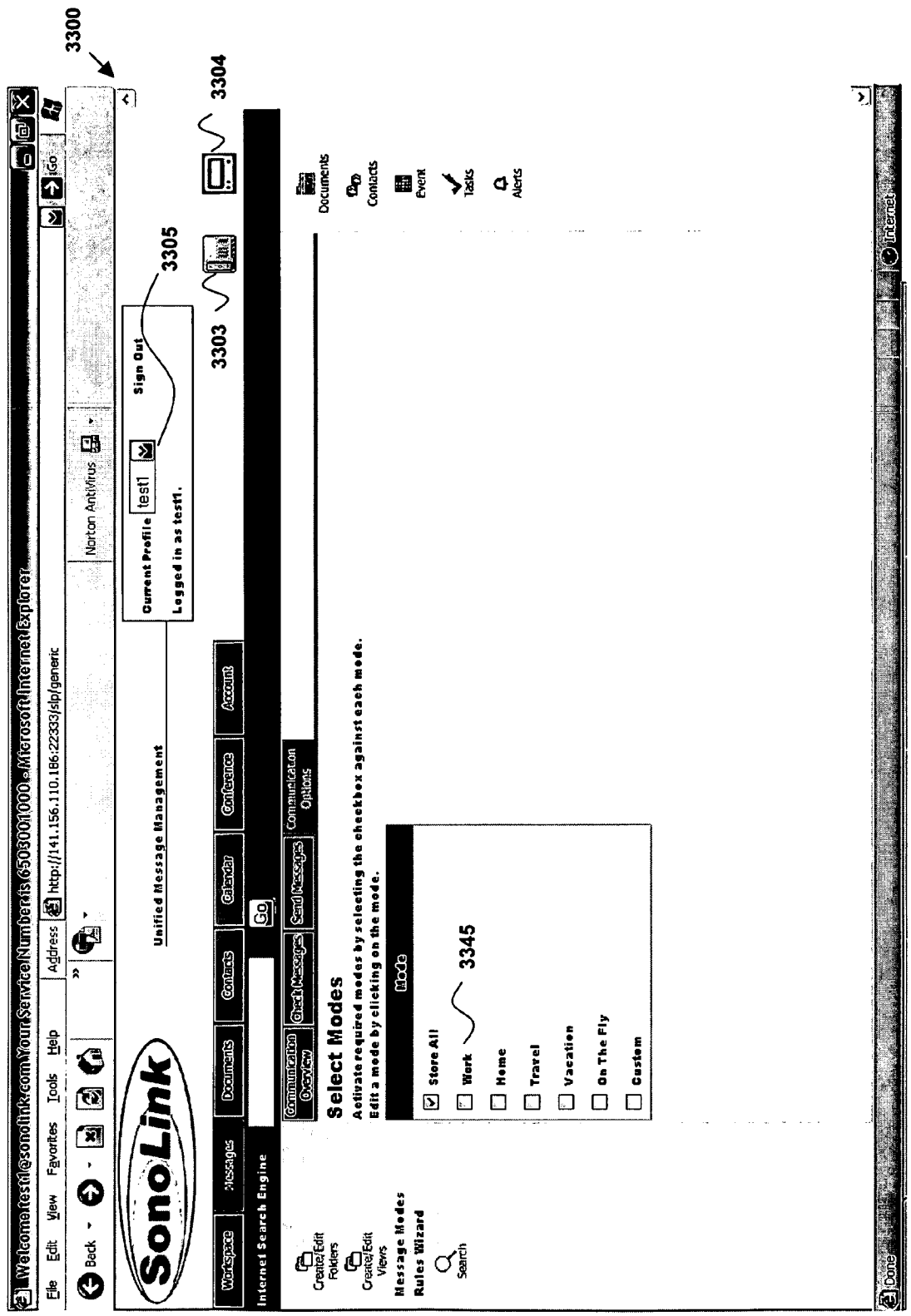
Figure 33H:
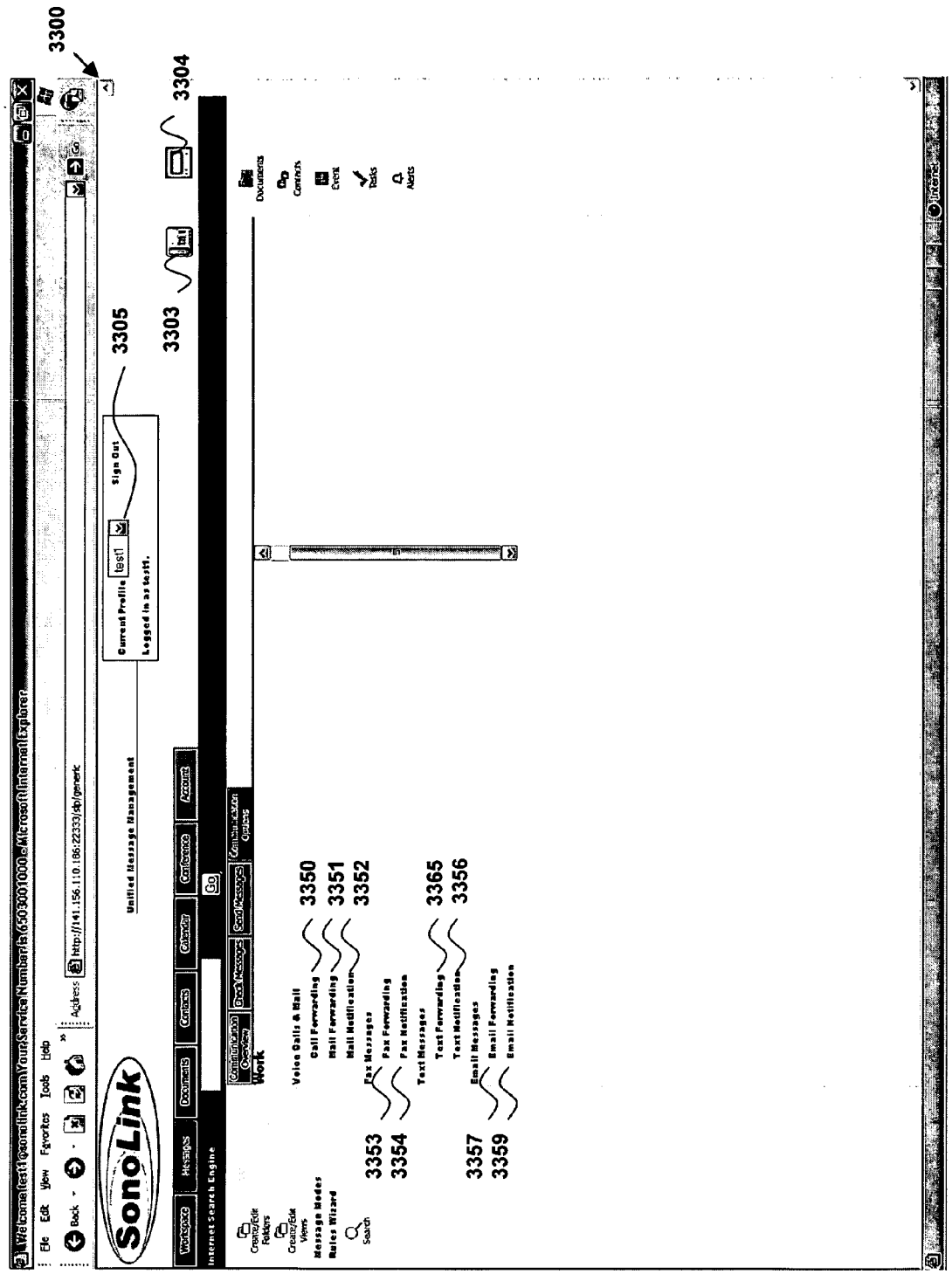
Figure 33I:
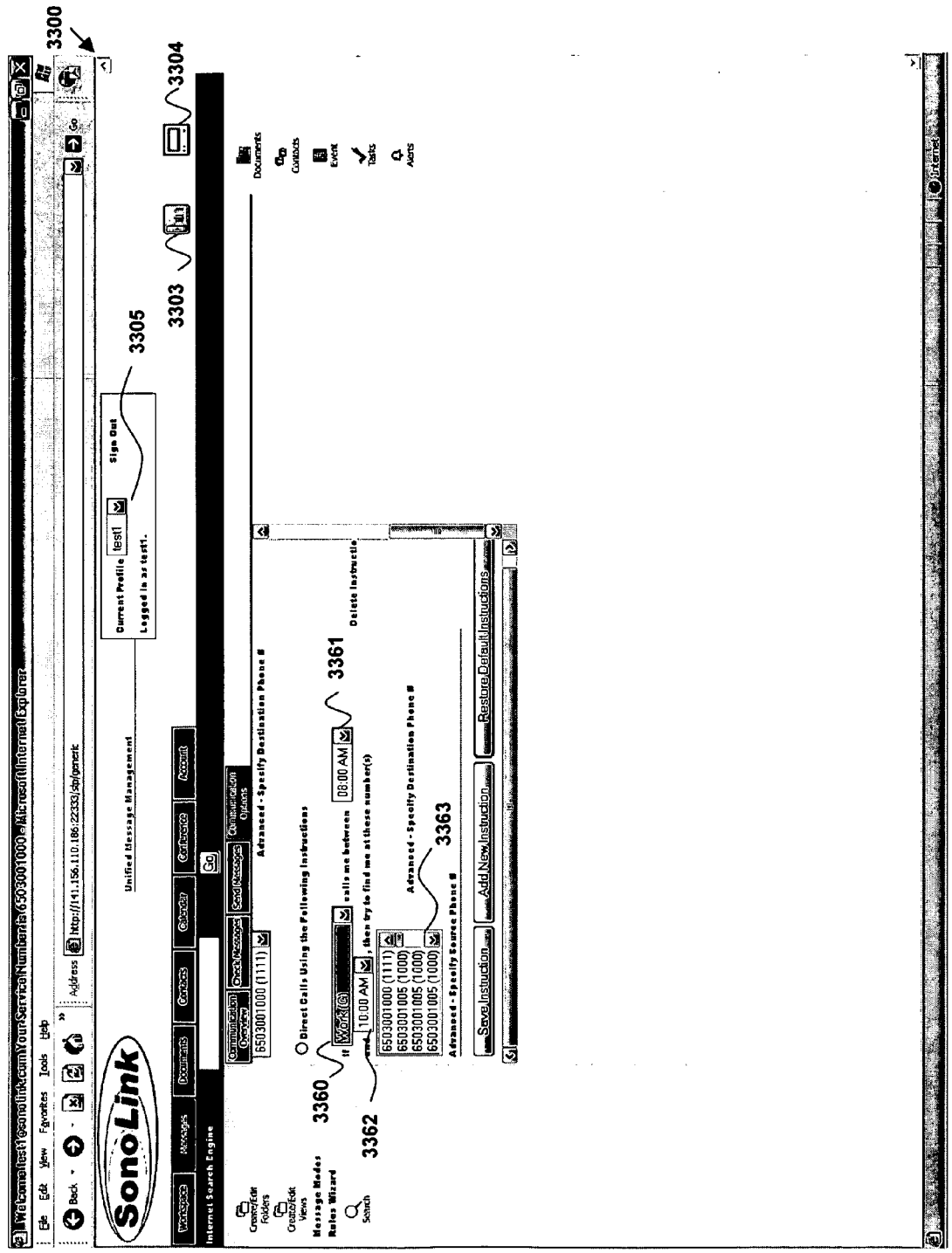
Figure 33J:
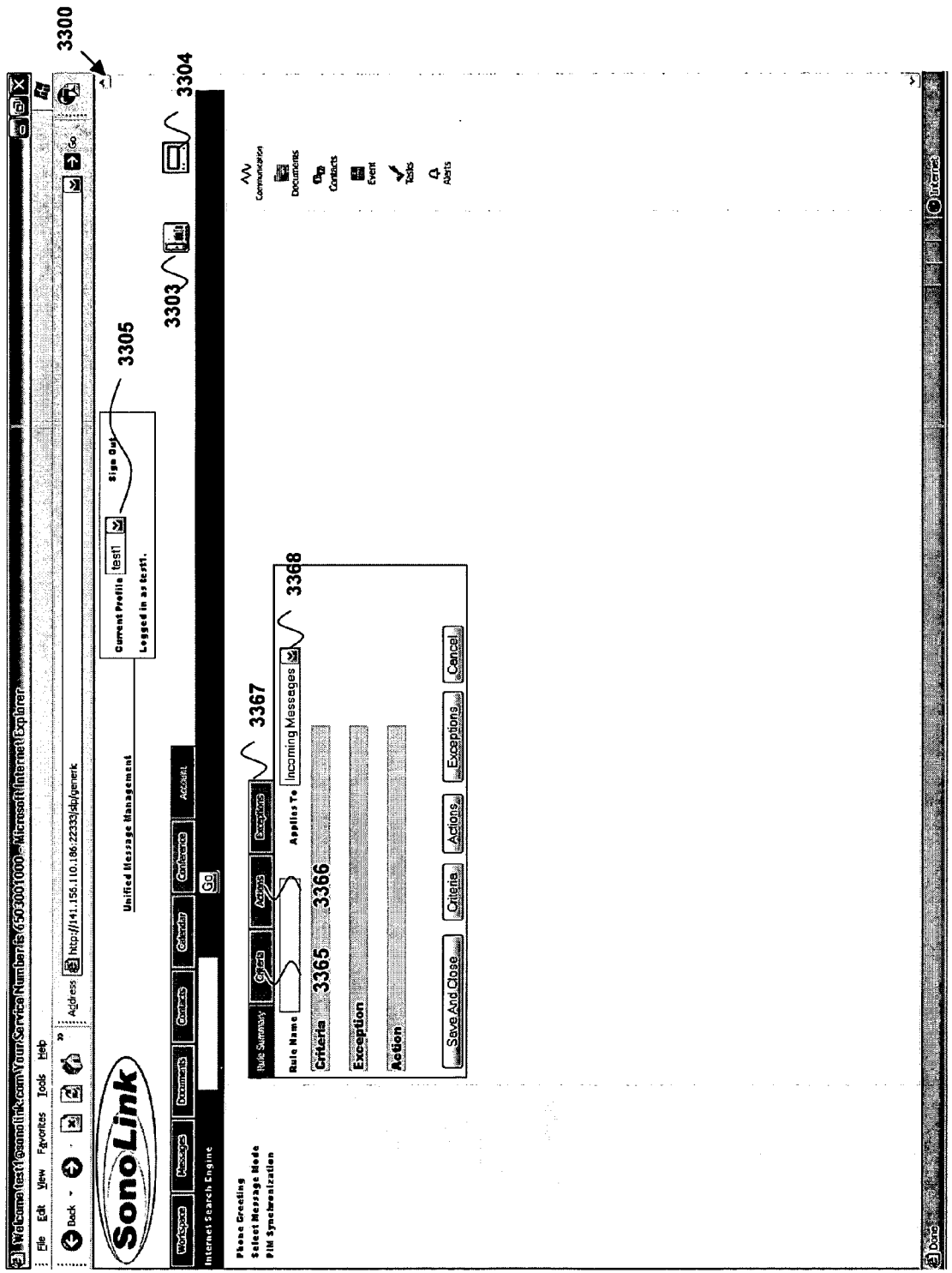
Figure 33K:
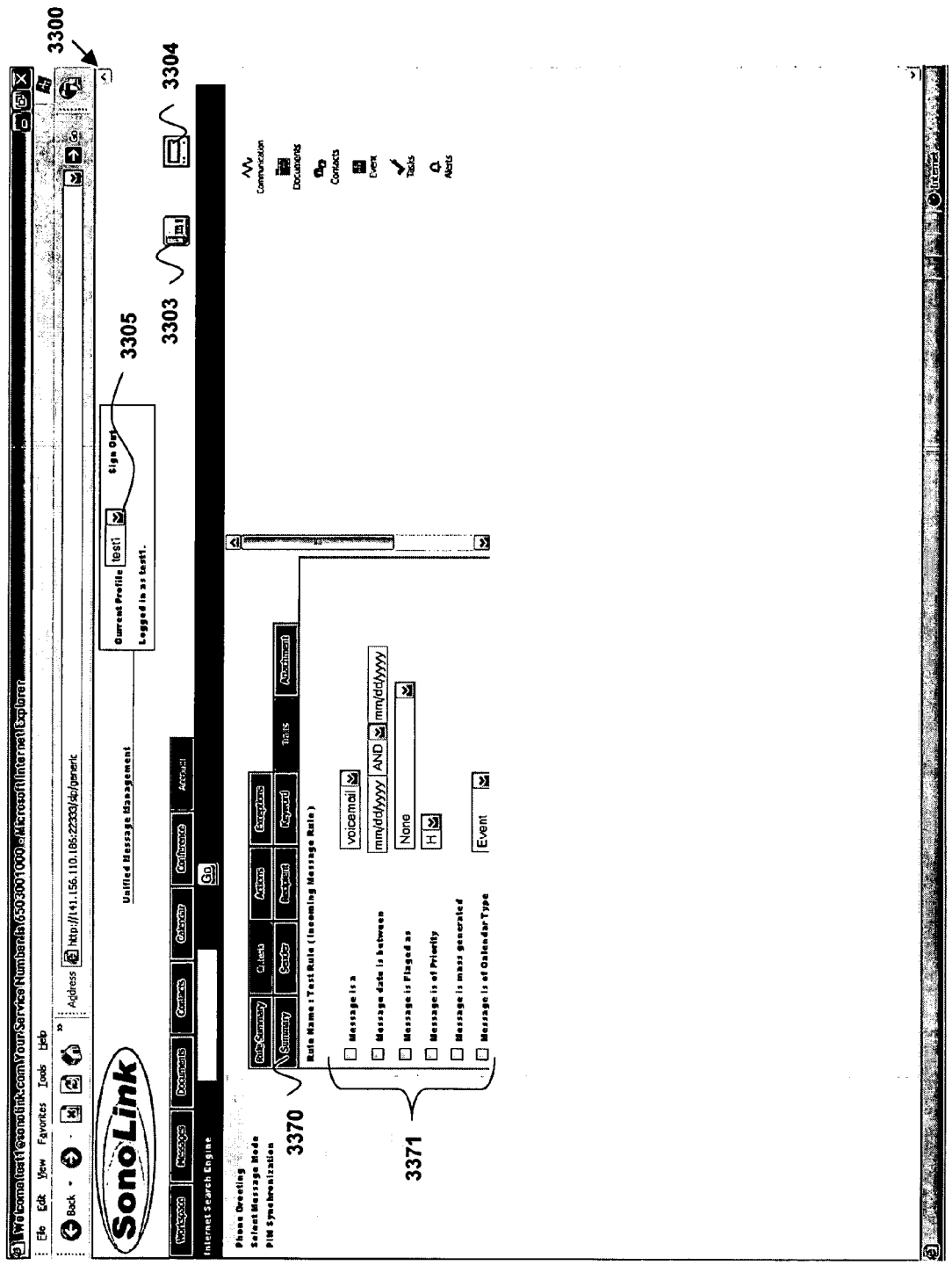
Figure 33I:
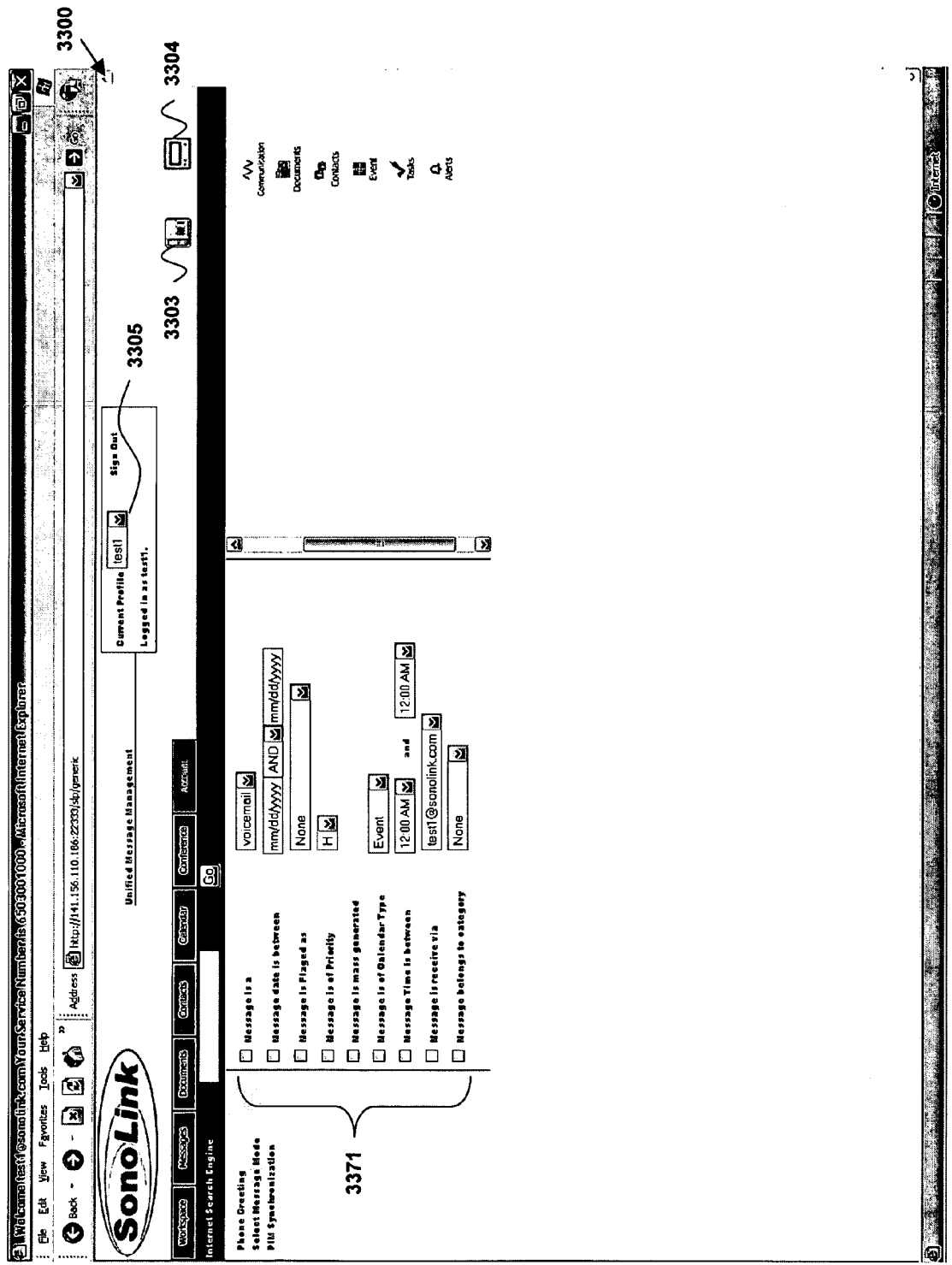
Figure 33M:
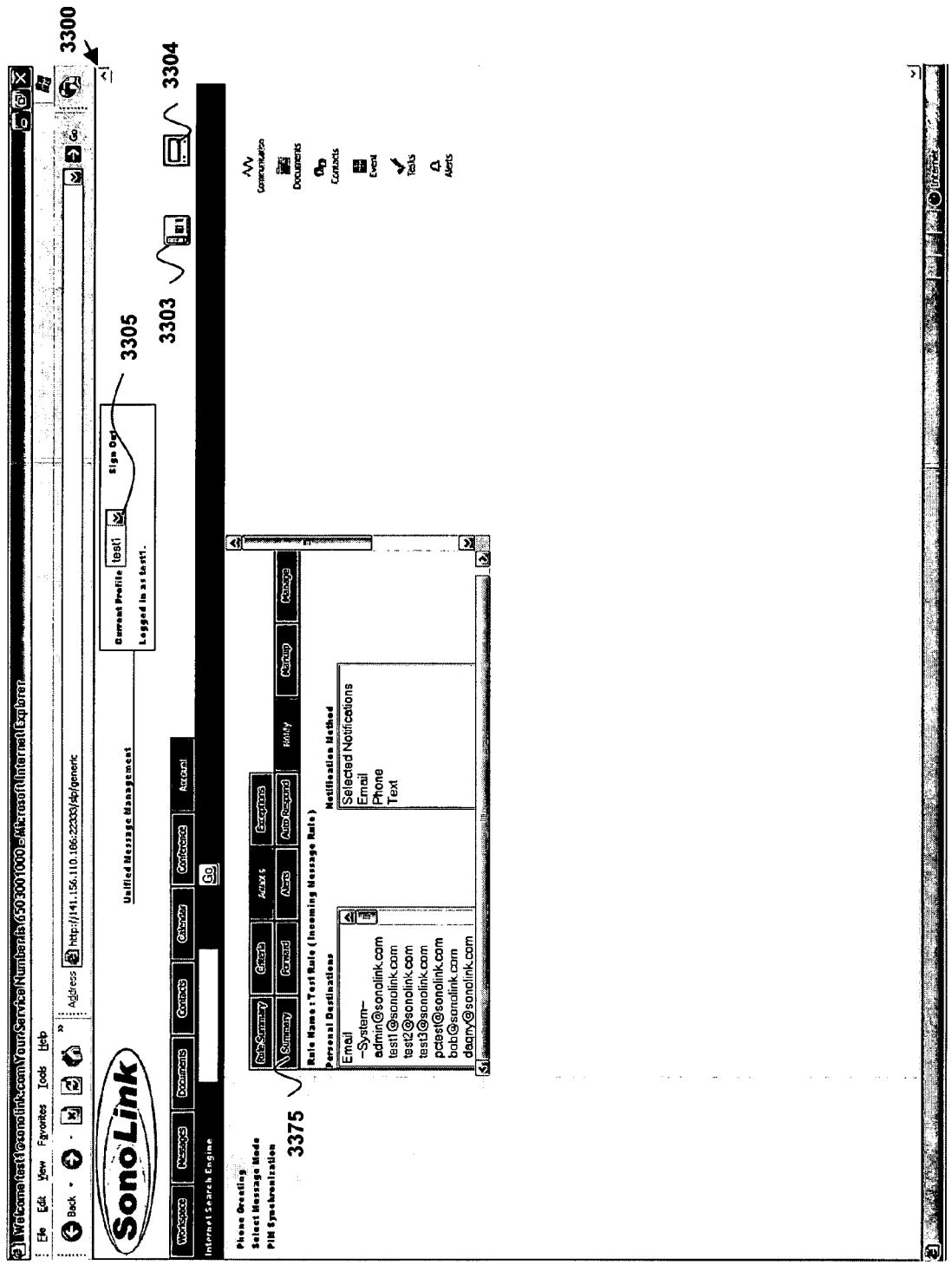
Figure 33N:
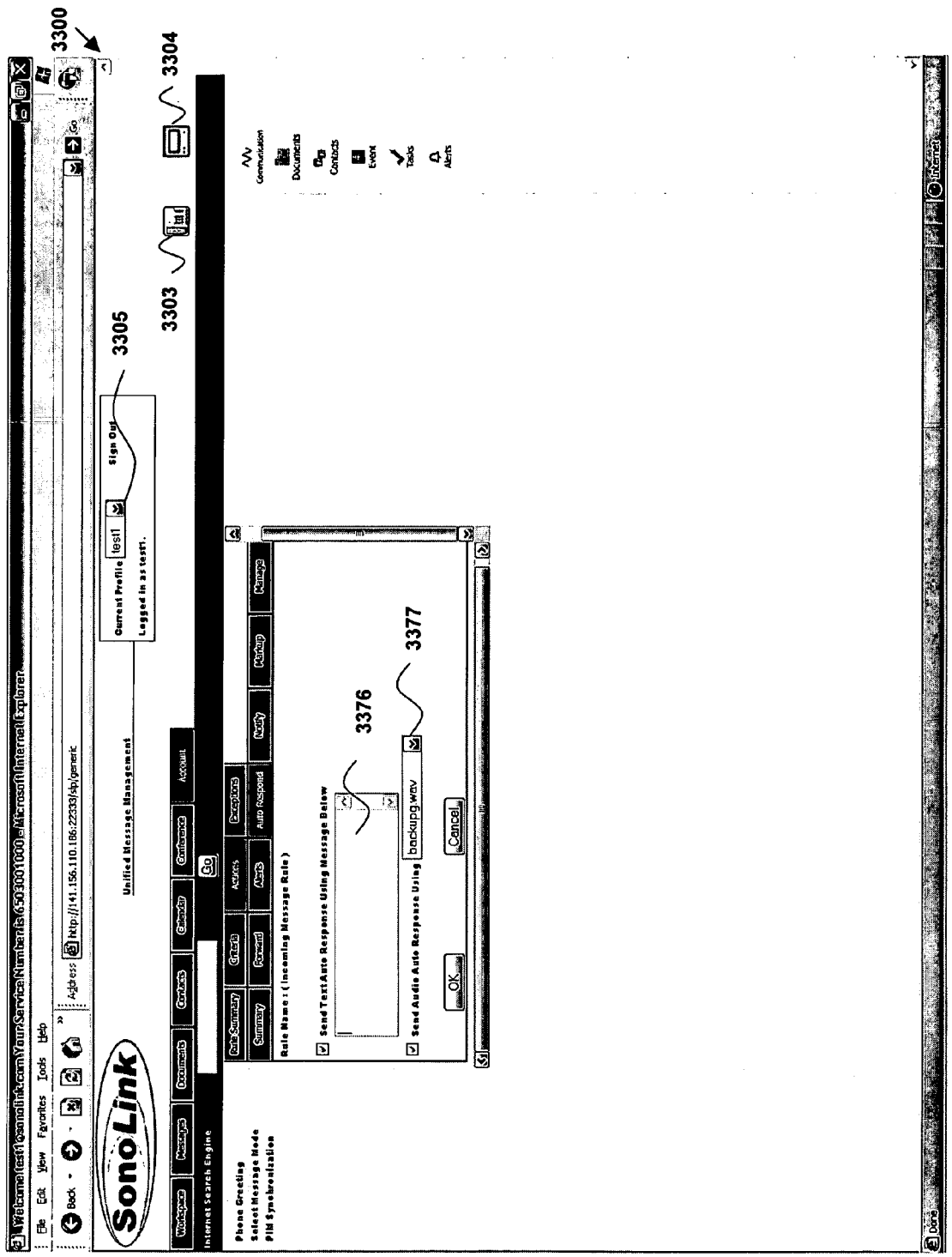
Figure 33O:
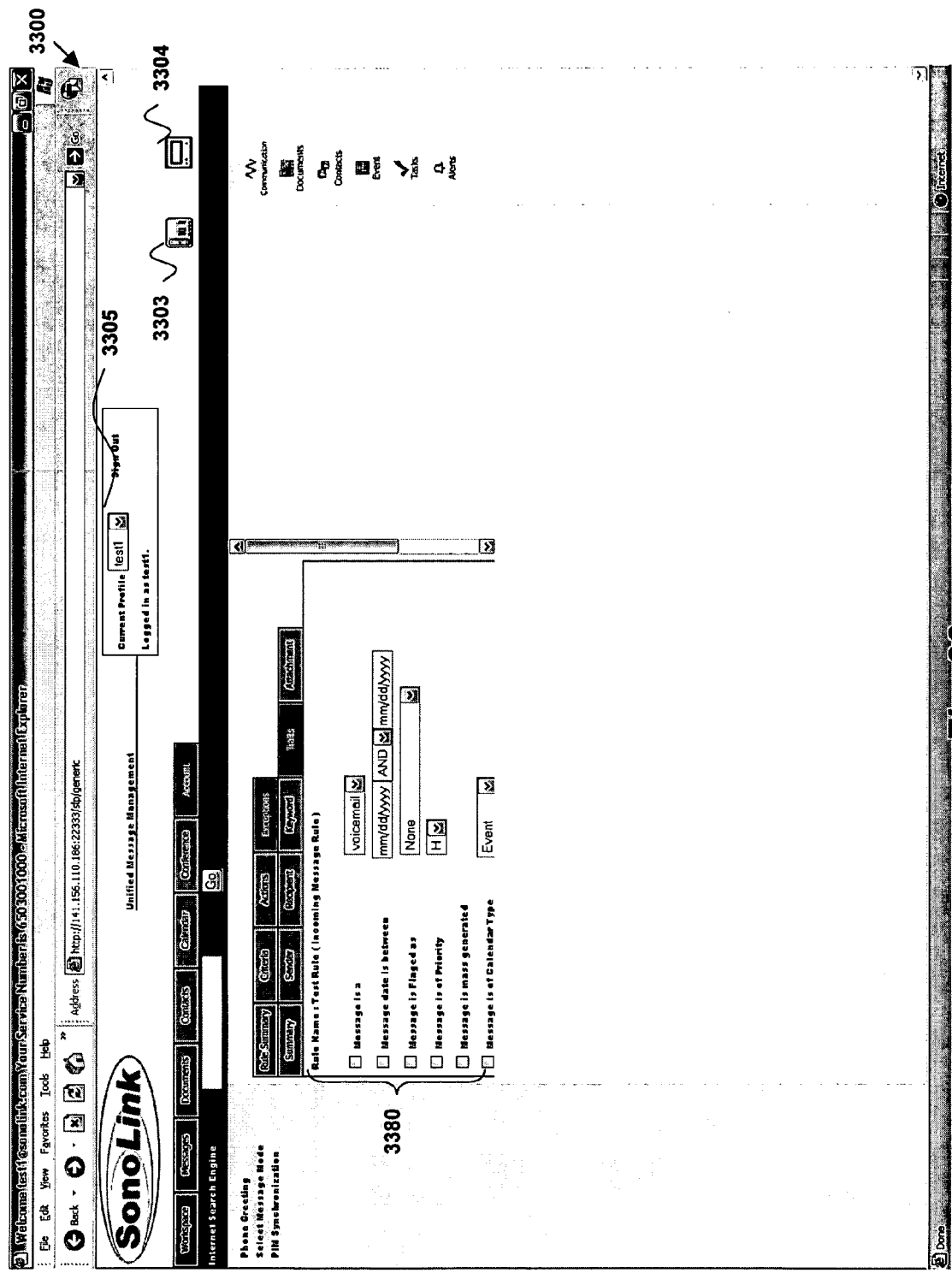

FIGS. 33*a–o* illustrate a graphical user interface ("GUI") 3300 employed in one embodiment of the invention. As in prior message management platforms, the GUI provides access to a variety of information management and messaging applications including, by way of example and not limitation, email, an electronic calendar, and an electronic address book. In one embodiment, the GUI also includes a telephony icon 3303 to provide access to real time telephone connections (e.g., VoIP connections) and an instant messaging icon 3304 to provide access to instant messaging functions. To streamline access to real time communication, in one embodiment, the telephony icon and instant messaging icon are provided within the same location of the GUI at all times (i.e., regardless the section of the GUI that the user is navigating).

As illustrated, one embodiment of the GUI 3300 includes a primary row of graphical tabs 3301 to provide access to the various WorkSpace applications. In the example illustrated in FIG. 33*a*, the "calendar" tab is selected, thereby generating calendar GUI which includes a secondary row of tabs 3302 related to calendar functions. An "events" tab is selected in the secondary row, thereby generating a monthly event view 3311.

In one embodiment, users create new events by selecting a "new event" button 3310. FIG. 33*b* illustrates an exemplary event creation window which includes a variety of data fields for specifying a new event (e.g., subject, location, event type, start time, end time, etc). In addition, a "reminder" element 3315 is provided which, when selected, allows the user to specify different mechanisms for reminding the user of the new event.

FIG. 33*c* illustrates an exemplary reminder GUI (generated in response to selection of the reminder element) which includes a drop-down selection menu 3322 comprised of different communication channels which may be used to provide event notification. In one embodiment of the invention, the notification types include any messaging types supported by the WorkSpace system including, for example, email, text messaging (e.g., instant messaging and/or standard text messaging), fax, and telephony. A data entry field 3320 is provided in which the event notification destination associated with the selected notification type may be entered. For example, if "phone" is selected, the user may enter different telephone numbers which will be called to remind the user of the event. Similarly, if email or instant messaging is selected, then the user may enter one or more email or instant messaging addresses in the data entry field 3320. Each event notification type selected by the user is displayed in a notification list 3321. In addition, a list 3323 containing different notification addresses/numbers is provided to aid the user in selecting notification destinations. In one embodiment, the list is comprised of the user's personal contact information (e.g., the user's email address, telephone numbers, instant messaging address, etc).

Figure 34:
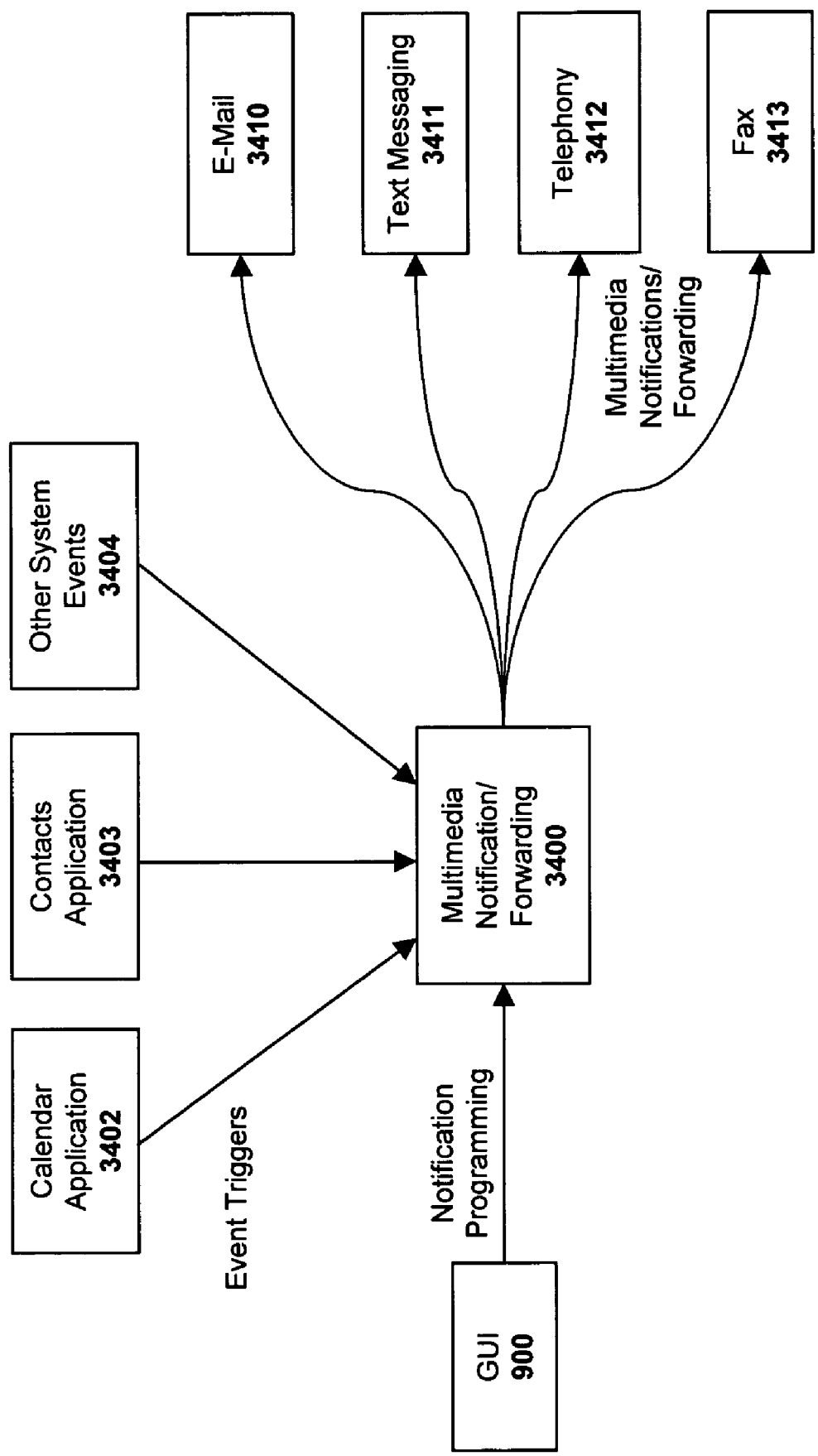
FIG. 34 illustrates multimedia notification and forwarding logic employed in one embodiment of the invention.

FIG. 34 illustrates one embodiment of software architecture for implementing the foregoing features. This embodiment includes a multimedia notification/forwarding module 3400 for generating notifications and/or forwarding messages using a variety of different communication channels including, but not limited to, email 3410, text messaging 3411, telephony 3412 and/or fax 3413. In one embodiment, the notification module 3400 is integrated as part of the calendar application 3402. In another embodiment, it is integrated as part of the contacts application 3403. However, as illustrated in FIG. 34, the notification logic 3400 may be implemented as a separate, independent program or agent and generate notifications and/or forward messages in response to a variety of multi-media triggers including calendar 3402 events, contact application 3403 events, and/or various other types of system events 3404 (e.g., incoming calls and electronic messages). For example, calendar event triggers may include scheduled calendar events, tasks and alerts. Contact event triggers may include, for example, the addition of a new contact (e.g., by the user's administrative assistant). Other system event triggers may include the receipt of messages, data and/or calls as well as system threshold triggers such as, for example, a voicemail or email storage space being exceeded. Various other/additional event triggers may be employed while still complying with the underling principles of the invention.

As mentioned above, the user may configure the multimedia notification module 3400 by specifying different notification addresses and telephony numbers via the GUI 900. For example, when a telephony notification is selected, the notification module 3400 will call one or more designated telephone numbers prior to (or at) the designated time of the event. In addition, in one embodiment, the notification logic 3400 or the telephony module 3412 utilizes a text-to-speech engine to read the user selected text associated with the event. For example, after automatically calling the user, the text-to-speech engine may read the subject line or other designated data associated with the event entry. If a fax notification is selected, then, in one embodiment, the fax module 3413 will fax the user a printout of text associated with the event. If email or text message notification is selected, then the email module 3410 and/or text messaging module 3411 will automatically generate event notifications directed to the user's email address and/or text messaging address, respectively.

FIG. 33*d* illustrates one embodiment of the GUI 3300 in which the "messages" tab is selected from the primary row 3301 and the "check messages" tab is selected from the secondary row of tabs 3302. In FIG. 33*d*, a single, unified view 3330 of all pending messages is generated, including electronic messages, voice messages, and faxes. In one embodiment, to retrieve an email, voicemail or fax the user may simply select the corresponding message from the unified view. In addition, a plurality of message filtering elements 3331–3334 is provided to filter the unified view 3330 in a variety of different ways. For example, if the user only wants to review email messages, the user may select the email 3331 filtering element. In response, the unified view 3330 will only display email messages, as illustrated in FIG. 33*e*. Similarly, in response to user selection of the voicemail element 3332, the unified view 3330 will display only voicemail messages.

Various additional types of message filtering may be specified by the user. For example, in one embodiment the user may specify a view containing only new messages (i.e., only messages that the user has not viewed/accessed). FIG. 33*f* illustrates a GUI for specifying different message views which includes a first drop down menu 3340 for specifying each of the different message types supported by the WorkSpace system and a second drop down menu 3341 for specifying the statuses of messages to be displayed in the view. Message statuses may include, for example, all messages, old messages, new & old messages, old & saved messages, new and saved messages, and saved messages. Of course, a variety of additional message view specifications may be provided while still complying with the underlying principles of the invention.

Figure 35:
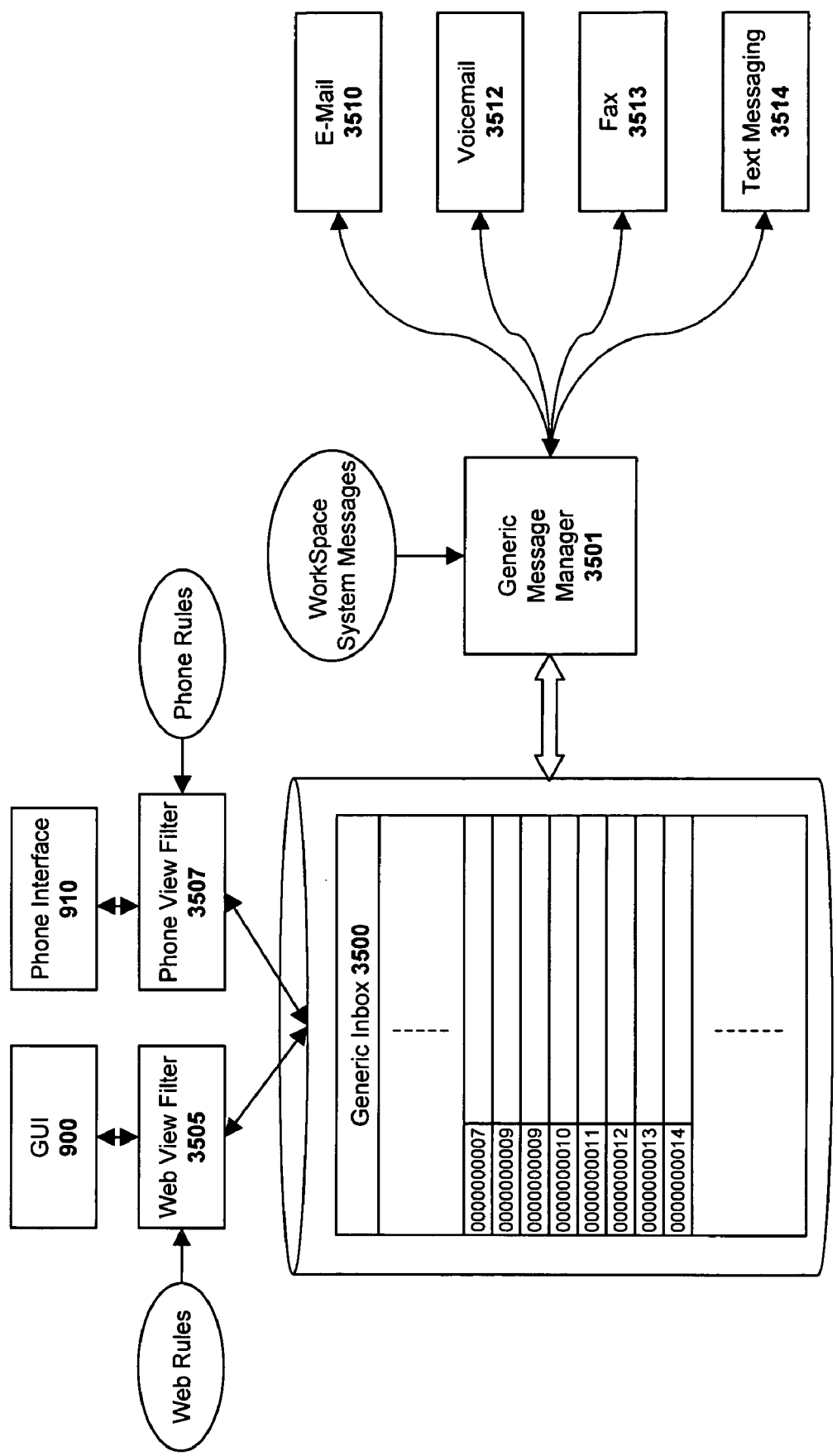
FIG. 35 illustrates a generic inbox and a generic inbox manager employed in one embodiment of the invention.

FIG. 35 illustrates one embodiment of a generic inbox 3500 architecture from which the various unified messaging views are generated. In this embodiment, email messages, text messages, voicemail messages, faxes, and other types of messages are managed by a generic message manager 3501 which stores and processes messages from a variety of different messaging platforms including multiple email accounts 3510, voicemail accounts 3512, fax numbers 3513 and test messaging accounts 3514. In one embodiment, upon receiving a new message, the generic message manager 3501 generates a unique identification code which it uses to identify the message within the generic inbox 3500. In one embodiment, each message is stored as a separate file within the generic inbox 3500. Message view filters 3505 and 3507 provide a view of the generic inbox 3500 as specified via user-selectable view rules, examples of which are provided above. The generic inbox is identified by a unique identifier which, in one embodiment, is associated with an individual user. Because the unique identifier is not tied to any message type or to any message address (i.e., email address), it may therefore be easily associated with multiple message addresses and multiple message types. Since different message types are sent and received through different messaging platforms (i.e., email servers, fax machines, voicemail systems), commands within the WorkSpace system periodically polls the different messaging platforms that are either part of or tied to it. These messages are then sorted by the recipient address (i.e., fax number, system extension, email address) and then placed in the recipient's generic inbox.

As indicated in FIG. 35, in one embodiment, other WorkSpace system users may send messages directly to the user's generic inbox 3500 via the generic message manager 3501. That is, the generic inbox 3500 is a separate, independent message repository from the user's email 3510, voicemail 3512, fax 3513 and text messaging 3514 accounts. In fact, the user may not even be assigned a separate email account and may communicate with other WorkSpace system users exclusively via the generic inbox 3500. The unified generic inbox 3500 provides for greater flexibility than in prior systems because it allows a single point of management and coordination for multiple email accounts, text messaging accounts, voicemail accounts and telephone/fax numbers. Moreover, using the generic inbox 3500, WorkSpace system users may send messages directly to the user, rather than to one of the user's many email or voicemail accounts. For example, a fax that one user received may be sent directly to another user's generic inbox as a fax even though the other user does not have a dedicated fax number. This is significantly differently that forwarding a fax to a person's email address either as an email attachment or an embedded message. The difference is illustrated by the fact that the user without a dedicated fax number could forward the fax to the fax machine at their hotel. This simply cannot be done with systems that incorporate fax-to-email functionality.

The generic message manager 3501 may also synchronize the state of the messages viewed over the GUI interface 900 and those accessed over the telephony interface 910. For example, if a user deletes a particular voicemail message accessed over the telephone, the generic message manager 3501 may alter the view rules for the GUI view and delete the message (making it no longer accessible over the Web). Alternatively, the instructions may be to leave untouched the status as viewed over the Web, thus leaving the message available for viewing over the GUI even though it was deleted over the telephone interface. Conversely, the instructions could flow in the opposite direction so that a message whose status is changed over the Web may or may not (depending on the specific instructions) change the status when accessed over the telephone interface. One embodiment of the WorkSpace system allows users to specify virtually any type of synchronization parameters to synchronize messages (or not) as viewed over the two different interfaces 900 and 910.

FIG. 27 illustrates multimedia message processing logic 2701 employed in one embodiment of the invention which operates in response to multiple sets of rules including system-specified rules 2730, user-specified rules 2731 and default rule settings 2732. Depending on the particular sets of specified rules, the multimedia message processing logic 2701 may filter, store and/or forward messages received over a variety of source media channels 2710–2713 to any one of a plurality of destination media channels 2720–2723 (including the generic inbox 2723 described above). In one embodiment, the multimedia processing logic 2701 is a manager agent which manages the activities of a plurality of subordinate message processing agents including, for example, the multimedia notification/forwarding module 3400 illustrated in FIG. 34 and the generic message manager agent 3501 illustrated in FIG. 35. However, an agent architecture is not required for complying with the underlying principles of the invention.

In one embodiment, user-specified rules 2731 include mode rules that specify how messages are to be processed when the user places the WorkSpace system in a particular operational "mode." Modes are groups of rules which reflect how the multimedia message processing logic 2701 should process messages based on the current status of the user. For example, when the user is on vacation he/she may select the "Vacation" mode of operation to cause incoming messages to be forwarded to the user's administrative assistant and/or to be sent to the user's portable data processing device.

FIG. 33g illustrates a variety of operational modes including: "Work" containing rules for when the user is at work, "Home" containing rules for when the user is at home, "Travel" containing rules for when the user is working on the road, "vacation" containing rules for when the user is on vacation, "On-the-Fly" containing simple (all or nothing) rules that a user can specify over the telephone, and "Custom" which may include any combination of rules as specified by the end user. The notion of modes allows a user to define contextual rules for all types of messages and all accounts for each message type. Within each mode, the user selects the appropriate auto reply and the appropriate voicemail greeting to be applied to each of the user's accounts while in that mode. The user also specifies forwarding and notification actions within each mode that are based on either simple or advanced criteria.

FIG. 33h illustrates an exemplary GUI generated when the user chooses to edit a particular mode from FIG. 33g (e.g., the "Work" mode rule in the example). Call forwarding element 3350 may be selected for forward incoming calls to any one of a variety of multimedia destinations (e.g., telephone numbers, email messages, faxes, instant messages); voicemail forwarding element 3351 may be used to forward voicemail to any multimedia destination; and mail notification element 3352 may be selected to notify the user of a new call over any of the communication channels supported by the workspace system. The user may configure the multimedia message processing logic 2701 to forward messages and/or generate notifications in a similar manner for fax messages (via elements 3410 and 3413), text messages (via elements 3410 and 3412); voice or telephone messages (via element 3410 and 3412); and email messages (via element 3410).

In addition to system-specified rules 2730, a virtually unlimited number of user-specified rules 2731 may be created and implemented by the end user. Such user-specified rules may or may not be associated with a particular mode of operation and may be implemented at all times. FIG. 33*i* illustrates one embodiment of a GUI for specifying a call-forwarding rule which includes a drop-down list 3360 of other users and groups of users (e.g., from the user's contact list) and two additional drop-down menus 3361–3362 for designating a time period when the rule is to be implemented. To cause incoming calls to be forwarded during the specified time period, the user may enter one or more telephone numbers within a forwarding number list 3363. When the user receives a telephone call from a specified user (or a user from a specified group) during the designated period of time, the call will be forwarded to one or more of the telephone numbers provided in the list 3363. In one embodiment, the multimedia message processing logic 2701 will initially attempt to reach the user at the numbers relatively higher up on the list.

In one embodiment, similar data entry features are provided for email, fax and instant messaging. For example, the user may select various email accounts or instant messaging accounts which will receive forwarded messages (voicemails, faxes, emails or instant messages) sent from specified users during a specified period of time.

A variety of advanced rule definition features are illustrated in FIGS. 33*j–o*. In this embodiment, the user may generate a new rule by providing a rule name and specifying criteria for triggering the rule (via criteria tab 3365), actions to take upon triggering the rule (via actions tab 3366) and exceptions to the rule (via exceptions tab 3367). A drop down menu 3368 allows the user to specify whether the rule applies to incoming messages or outgoing messages.

As illustrated in FIG. 33*k*, upon selecting the criteria tab 3365, a second row of tabs 3370 is provided including a summary tab to provide a quick summary of the rule; a sender tab to allow the user to enter senders or groups of senders to whom the rule applies; a recipient tab to specify recipients to whom the rule applies; a traits tab to allow the user to enter specific message traits; and an attachment tab to allow the user to specify different attachment features to which the rule will apply.

FIGS. 33*k–l* illustrate various traits 3371 that may be specified when the traits tab is selected. The traits include but are not limited to the type of message sent/received (e.g., voicemail, email, fax); a date and time range within which the message is sent/received; particular flags associated with the message; a priority level associated with the message; whether the message is mass generated (e.g., as identified by spam detection software); whether the message is of a particular calendar type (e.g., task, reminder/alert, event); the particular email/instant messaging account and/or the telephone/fax number to which the message was directed (e.g., the user may specify a variety of different email accounts, fax numbers and telephone numbers managed by the WorkSpace system); and the particular category of the message. It should be noted that the specific criteria above are provided for the purpose of illustration only. The underlying principles of the invention may be implemented using a variety of additional and/or different message criteria.

In FIG. 33*m*, the actions tab is selected, thereby generating a second row of tabs 3375 which the user may select to specify different actions associated with the rule. In response to detecting a new message to which the rule applies, the multimedia message processing logic 2701 will then perform the specified actions. These actions may include, for example, forwarding the message to any of the messaging channels 3410–3413 supported by the workspace system (e.g., forwarding a voicemail as an email attachment).

In addition, the user may provide options for generating an "auto-response" to the message. As with message forwarding and notification, the multimedia message processing logic 2701 may automatically generate a response via any of the messaging types supported by the system. For example, in response to an email from an important client, the multimedia message processing logic 2701 may automatically generate a call to the client and play back a recording indicating that the user is out of the office. As illustrated in FIG. 33*n*, in one embodiment, the user may specify a text message to be used for the automatic response in data field 3376 and may also specify an audio auto-response (e.g., a .WAV or .MP3 file) in drop down menu 3377. In general, however, a text-based or image-based response is sent in response to a text-based or image-based message and an audio response is played in response to a phone call.

As illustrated in FIG. 33*o*, the user may also specify a plurality of exception traits 3380 identifying exceptions to the rule. In one embodiment, the exception traits mirror the criteria traits described above with respect to FIGS. 33*k–l*. Thus, after determining that a particular rule should be triggered based on the specified criteria traits, the multimedia message processing logic 2701 will determine whether the message within one or more of the defined exceptions before executing the action associated with the rule.

In one embodiment, a drop down menu 3305 is provided within each window of the GUI 3300, allowing the user to easily select and switch between different profiles. Unlike most prior messaging systems in which a 1:1 correspondence exists between a profile and an email account, in one embodiment of the invention, multiple email accounts may be associated with a user and a user may have multiple profiles. A "Work" profile may include multiple business email accounts for which the user is responsible. For example, if the user works in both the customer service department and the billing department, them both of these email accounts (e.g., customerservice@xyz.com and billing@xyz.com) may be mapped to the "Work" profile. The user may also create a "Personal" user profile for receiving messages from any of the user's personal accounts. Similarly, multiple different address books, calendar entries, instant messaging accounts, voicemail accounts, and fax numbers may be associated with a user who has multiple profiles.

In one embodiment, the user may choose to either share or enter separate information between profiles. For example, the user may wish to use the same address book and calendar for each profile, but use different email addresses and telephone numbers/voicemail boxes.

In addition, in one embodiment, a drop down menu that contains "projects" to which the user belongs is provided. In response to selecting a particular project from within the menu, a filtered project view will be provided to the user, containing only those messages, documents and/or other information associated with the selected project. A "project" can be thought of as a type of "user" whose unique and dedicated WorkSpace is accessed by different users (both within and outside an enterprise) with different sets of privileges. This, of course, is the definition of collaboration. Through a simple drop down, system members can easily toggle between their personal WorkSpace and the WorkSpace of "projects" to which they belong. In one embodiment, a "project" can be integrated with third-party applications or Web locations and could also serve as the master security with respect to such applications and locations.

The default settings 2732 illustrated in FIG. 27 provide default rules employed by the WorkSpace system. These include certain basic rules for managing messages which the vast majority of users will want to use. For example, each time a user sends an email message, the message will be stored in the user's "sent mail" folder. Of course, one embodiment of the multimedia message processing logic 2701 will allow the user to change or supplement any of the default settings 2732 if granted permission to do so.

While the foregoing has described what are considered to be the best mode and/or other preferred embodiments, it is understood that various modifications may be made therein and that the concepts disclosed herein may be implemented in various forms and embodiments, and that they may be applied in numerous applications, only some of which have been described herein.

At different times, all or portions of the executable code or database for any or all of these software elements may reside in physical media or be carried by electromagnetic media. The various data components as well as WorkSpace system files relating to the performance of the WorkSpace software developed by the processing also may reside in or be transported via a variety of different media. Physical media include the memory of the computer system 651, such as various semiconductor memories, tape drives, disc drives and the like of general-purpose computer systems. All or portions of the software may at times be communicated through the Internet or various other telecommunications networks. Such communications, for example, may be to load the software from another computer (not shown) into the Web server or into another network element. Thus, other type of media that may bear the software elements includes optical, electrical and electromagnetic waves, such as used across physical interfaces between local devices, through wired and optical landline networks and over various airlinks.

The term "computer-readable medium" as used herein refers to any medium that participates in providing instructions to a processor for execution. Such a medium may take many forms, including but not limited to, non-volatile media, volatile media, and transmission media. Non-volatile media include, for example, optical or magnetic disks, such as any of the storage devices in the system of FIG. 6. Volatile media include dynamic memory, such as main memory. Transmission media include coaxial cables, copper wire, fiber optics, and also the wires that comprise a bus within a computer system. Transmission media can also take the form of electric or electromagnetic signals, or acoustic or light waves such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, or any other medium from which a computer can read. Various forms of computer-readable media may be involved in carrying one or more sequences of one or more instructions to a processor for execution. Additionally, code for implementing the described operations may be in the form of computer instructions in any form (e.g., source code, object code, interpreted code) stored in or carried by any computer- or machine-readable medium. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments of the invention described above focus on the use of Fuzzy Logic techniques for conflict detection/resolution, various alternate/additional techniques may also be employed (e.g., neural networks, probabilistic reasoning, belief networks). Accordingly, the scope and spirit of the invention should be judged in terms of the claims which follow.

What is claimed is:

1. A system for processing messages and calls comprising:
   a plurality of filtering modules to apply a corresponding plurality of rule sets in succession to filter incoming and/or outgoing electronic messages and/or to apply the highest priority rule from among a plurality of rule sets to calls;
   a pre-inbox to temporarily store the calls and/or electronic messages as each of the plurality of rule sets are applied, the calls and/or electronic messages being removed from the pre-inbox and disposed of only after each of the plurality of rule sets have been applied to the calls and/or electronic messages and
   a graphical user interface ("GUI") to provide an option for the end user to specify whether a first rule of one of the filtering modules which conflicts with a second rule of another of the filtering modules should be applied, wherein the conflict between the first rule and the second rule comprises the same action to be applied to the message.

2. The system as in claim 1 wherein a first of the filtering modules for filtering calls and/or electronic messages comprises a system-level filtering module to filter calls and/or electronic messages based on settings provided by a network administrator at the system level.

3. The system as in claim 2 wherein a second of the filtering modules for filtering calls and/or electronic messages comprises a user-specified rule filtering module to filter calls and/or electronic messages based on criteria specified by an end user.

4. The system as in claim 3 wherein a third of the filtering modules for filtering calls and/or electronic messages comprises a default rule filtering module to filter calls and/or electronic messages based on default settings applied to the system.

5. The system as in claim 4 wherein the mode-based filtering module comprises a separate system-level filtering module for calls and for electronic messages, wherein the user-specified filtering module comprises a separate user-specified filtering module for calls and for electronic messages and wherein the default rule filtering module comprises a separate default rule filtering module for calls and for electronic messages.

6. The system as in claim 1 wherein electronic messages include email messages, instant messages, voice messages, faxes, and text messages.

7. The system as in claim 1 wherein calls comprise PSTN telephone calls, voice-over-IP telephone calls, and faxes.

8. The system as in claim 1 further comprising:
an external server to apply an initial set of filtering rules prior to storage or routing of the calls and/or electronic messages in the pre-inbox.

9. The system as in claim 8 wherein the external server comprises a firewall for filtering electronic messages.

10. The system as in claim 9 wherein the firewall implements anti-spam and/or anti-virus filters to incoming electronic messages.

11. The system as in claim 8 wherein the external server comprises a private branch exchange ("PBX") for filtering calls.

12. The system as in claim 1 wherein the GUI comprises additional options allowing the end user to specify whether the first rule should be applied to the original version of the message, or to the version of the message as affected by the second rule.

13. The system as in claim 1 wherein the GUI comprises one or more check boxes for specifying whether the first rule of one of the filtering modules which conflicts with the second rule of another of the filtering modules should be applied.

14. A method for messages and calls comprising:
temporarily storing incoming and/or outgoing calls and/or electronic messages within a pre-inbox;
applying a plurality of rule sets in succession to perform a corresponding plurality of filtering operations on the electronic messages;
applying the highest priority rule from among a plurality of rule sets to calls;
removing the calls and/or electronic messages from the pre-inbox and disposing of the calls and/or electronic messages based on the results of the rule sets only after the last of the rule sets have been applied to electronic messages and after the highest priority rule set has been applied to calls and
wherein the conflict between the first rule and the second rule comprises the same action to be applied to the message, further comprising additional options allowing the end user to specify whether the first rule should be applied to the original version of the message, or to the version of the message as affected by the second rule.

15. The method as in claim 14 wherein a first of the rule sets for filtering calls and/or electronic messages comprises a system-level rule set to filter calls and/or electronic messages based on settings provided by a network administrator at the system level.

16. The method as in claim 15 wherein a second of the rule sets for filtering calls and/or electronic messages comprises a user-specified rule set to filter calls and/or electronic messages based on criteria specified by an end user.

17. The method as in claim 16 wherein a third of the rule sets for filtering calls and/or electronic messages comprises a default rule set to filter calls and/or electronic messages based on default settings applied to the system.

18. The method as in claim 17 wherein the mode-based rule set comprises a separate system-level rule set for calls and for electronic messages, wherein the user-specified rule set comprises a separate user-specified rule set for calls and for electronic messages and wherein the default rule set comprises a separate default rule set for calls and for electronic messages.

19. The method as in claim 14 wherein electronic messages include email messages, instant messages, voice messages, faxes, and text messages.

20. The method as in claim 14 wherein calls comprise PSTN telephone calls, voice-over-IP telephone calls, and faxes.

21. The method as in claim 14 further comprising applying an initial set of filtering rules within an initial rule set prior to routing of the calls and/or storage of electronic messages in the pre-inbox.

22. The method as in claim 21 wherein the initial rule set comprises anti-spam and/or anti-virus rules to filter incoming electronic messages.

23. The method as in claim 21 wherein the initial rule set comprises a private branch exchange ("PBX") for filtering calls.

24. The method as in claim 14 comprising providing an option for the end user to specify whether a first rule of one of the rule sets which conflicts with a second rule of another of the rule sets should be applied.

25. An article of manufacture including program code which, when executed by a machine, causes the machine to perform the operations of:
temporarily storing incoming and/or outgoing calls and/or electronic messages within a pre-inbox;
applying a plurality of rule sets in succession to perform a corresponding plurality of filtering operations on electronic messages or applying the highest priority rule from among a plurality of rule sets to calls;
removing the calls and/or electronic messages from the pre-inbox and disposing of the calls and/or electronic messages based on the results of the rule sets only after the last of the message rule sets and the highest-priority call rule set have been applied and
wherein the conflict between the first rule and the second rule comprises the same action to be applied to the message, comprising providing the end user with additional options allowing the end user to specify whether the first rule should be applied to the original version of the message, or to the version of the message as affected by the second rule.

26. The article of manufacture as in claim 25 wherein a first of the rule sets for filtering calls and/or electronic messages comprises a system-level rule set to filter calls and/or electronic messages based on settings provided by a network administrator at the system level.

27. The article of manufacture as in claim 26 wherein a second of the rule sets for filtering calls and/or electronic messages comprises a user-specified rule set to filter calls and/or electronic messages based on criteria specified by an end user.

28. The article of manufacture as in claim 27 wherein a third of the rule sets for filtering calls and/or electronic messages comprises a default rule set to filter calls and/or electronic messages based on default settings applied to the system.

29. The article of manufacture as in claim 28 wherein the mode-based rule set comprises a separate system-level rule set for calls and for electronic messages, wherein the user-specified rule set comprises a separate user-specified rule set for calls and for electronic messages and wherein the default rule set comprises a separate default rule set for calls and for electronic messages.

30. The article of manufacture as in claim 25 wherein electronic messages include email messages, instant messages, voice messages, faxes, and text messages.

31. The article of manufacture as in claim 25 wherein calls comprise PSTN telephone calls, voice-over-IP telephone calls, and faxes.

32. The article of manufacture as in claim 25 comprising additional program code to apply an initial set of filtering rules within an initial rule set prior to routing of the calls and/or storage of electronic messages in the pre-inbox.

33. The article of manufacture as in claim 32 wherein the initial rule set comprises anti-spam and/or anti-virus rules to filter incoming electronic messages.

34. The article of manufacture as in claim 32 wherein the initial rule set comprises a private branch exchange ("PBX") for filtering calls.

35. The article of manufacture as in claim 34 comprising additional program code to provide an option for the end user to specify whether a first rule of one of the rule sets which conflicts with a second rule of another of the rule sets should be applied.

36. A system for processing messages and calls comprising:
- a system-level filtering module to apply a system-level rule set to filter incoming and/or outgoing electronic messages and/or calls, the system-level rule set configurable by a network administrator; and
- a client-level filtering module to apply a client-level rule set to filter incoming and/or outgoing electronic messages and/or calls, the client-level rule set configurable by an end user;
- a temporary storage area to temporarily store the calls and/or electronic messages as each of the plurality of rule sets are applied certain specified rules of the system-level rule set and the client-level rule set and
- a message server filtering module to perform a first set of filtering operations on electronic messages prior to filtering by the system-level filtering module, wherein the client-level filtering module comprises a mode-based filtering module to filter calls and/or electronic messages based on a current mode in which the system is operating, wherein the client-level filtering module comprises a user-specified rule filtering module to filter calls and/or electronic messages based on advanced criteria specified by an end user.

37. The system as in claim 36 further comprising:
- a private branch exchange (PBX) filtering module to perform a first set of filtering operations on calls prior to filtering by the system-level filtering module.

38. The system as in claim 36 further comprising:
- a default rule filtering module to filter calls and/or electronic messages based on default settings applied to the system.

39. The system as in claim 36 wherein the client-level filtering module comprises a separate client-level filtering module for calls and for electronic messages.

* * * * *